(12) United States Patent
Fong

(10) Patent No.: US 6,704,747 B1
(45) Date of Patent: Mar. 9, 2004

(54) METHOD AND SYSTEM FOR PROVIDING INTERNET-BASED DATABASE INTEROPERABILITY USING A FRAME MODEL FOR UNIVERSAL DATABASE

(75) Inventor: Joseph Shi-Piu Fong, 6E Seahorse Lane, Discovery Bay, Lantau Island (HK)

(73) Assignee: Joseph Shi-Piu Fong, Lantau Island (HK)

( * ) Notice: Subject to any disclaimer, the term of this patent is extended or adjusted under 35 U.S.C. 154(b) by 234 days.

(21) Appl. No.: 09/687,222

(22) Filed: Oct. 13, 2000

(51) Int. Cl.⁷ .............................................. G06F 17/30
(52) U.S. Cl. ...................... 707/104; 707/103; 707/100; 707/3
(58) Field of Search ................ 707/103, 104, 707/100, 3

(56) References Cited

U.S. PATENT DOCUMENTS

| 5,426,780 A | * | 6/1995 | Gerull et al. | ............... 707/101 |
|---|---|---|---|---|
| 5,471,629 A | * | 11/1995 | Risch | ........................ 707/201 |
| 5,761,493 A | * | 6/1998 | Blakeley et al. | ............ 707/200 |
| 5,937,402 A | * | 8/1999 | Pandit | ....................... 707/100 |
| 5,949,371 A | * | 9/1999 | Nichols | .................. 342/357.01 |
| 5,970,490 A | * | 10/1999 | Morgenstern | ................ 707/10 |
| 6,374,252 B1 | * | 4/2002 | Althoff et al. | .............. 707/100 |

* cited by examiner

Primary Examiner—Jean M. Corrielus
(74) Attorney, Agent, or Firm—Darby & Darby

(57) ABSTRACT

A system for providing access to a relational database using object-oriented structural query language ("OSQL") includes: a relational database management system ("RDBMS") providing access to the relational database via structural query language ("SQL"); an open object database connectivity ("OODBC") system connected to the RDBMS and configured to receive input from a user, the OODBC system having a frame model representation of the relational database; and an object frame model agent ("OFMA"). The OFMA is configured to receive an OSQL query from a user, convert the received OSQL query into an SQL query with reference to the frame model, and forward the SQL query to the RDBMS. The frame model has: static frameworks including a header class framework and an attribute class framework; and active frameworks including a method class framework and a constraint class framework.

6 Claims, 99 Drawing Sheets

HDB embedded-DL/1 Database program emulated by embedded-SQL cursors

Frame model logical schema

11 Header Class

| Class_Name | Primary_key | Parents | Operation | Class_type |
|---|---|---|---|---|
|  |  |  |  |  |

12 Attribute Class

| Class_name | Attribute name | Method name | Attribute type | Associate Attribute | Default value | Cardinality | Description |
|---|---|---|---|---|---|---|---|
|  |  |  |  |  |  |  |  |

13 Method Class

| Class_name | Method name | Parameters | Sequence no | Method type | Condition | Action | Next_sequence_no |
|---|---|---|---|---|---|---|---|
|  |  |  |  |  |  |  |  |

14 Constraint Class

| Class_name | Constraint name | Method name | Parameter | Ownership | Event | Sequence | Timing |
|---|---|---|---|---|---|---|---|
|  |  |  |  |  |  |  |  |

Fig 1b The architecture of Frame model schema

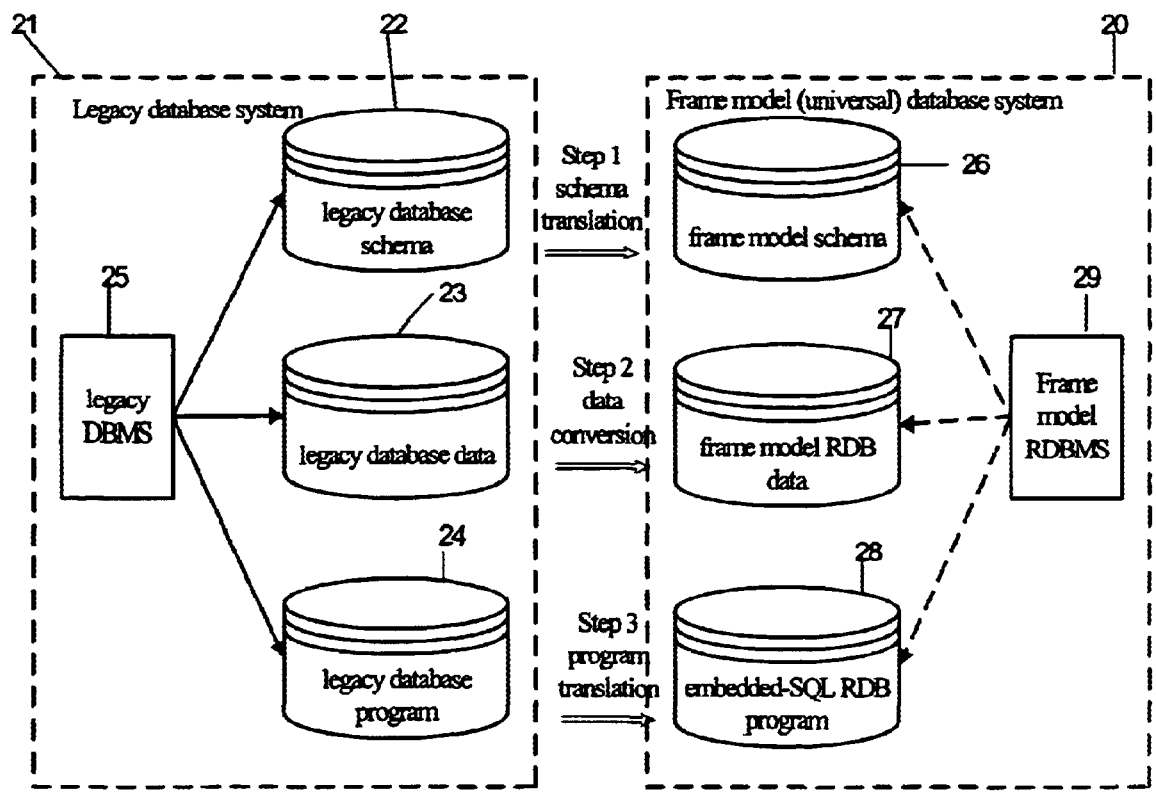
Fig 2 Architecture of universal database for database reengineering

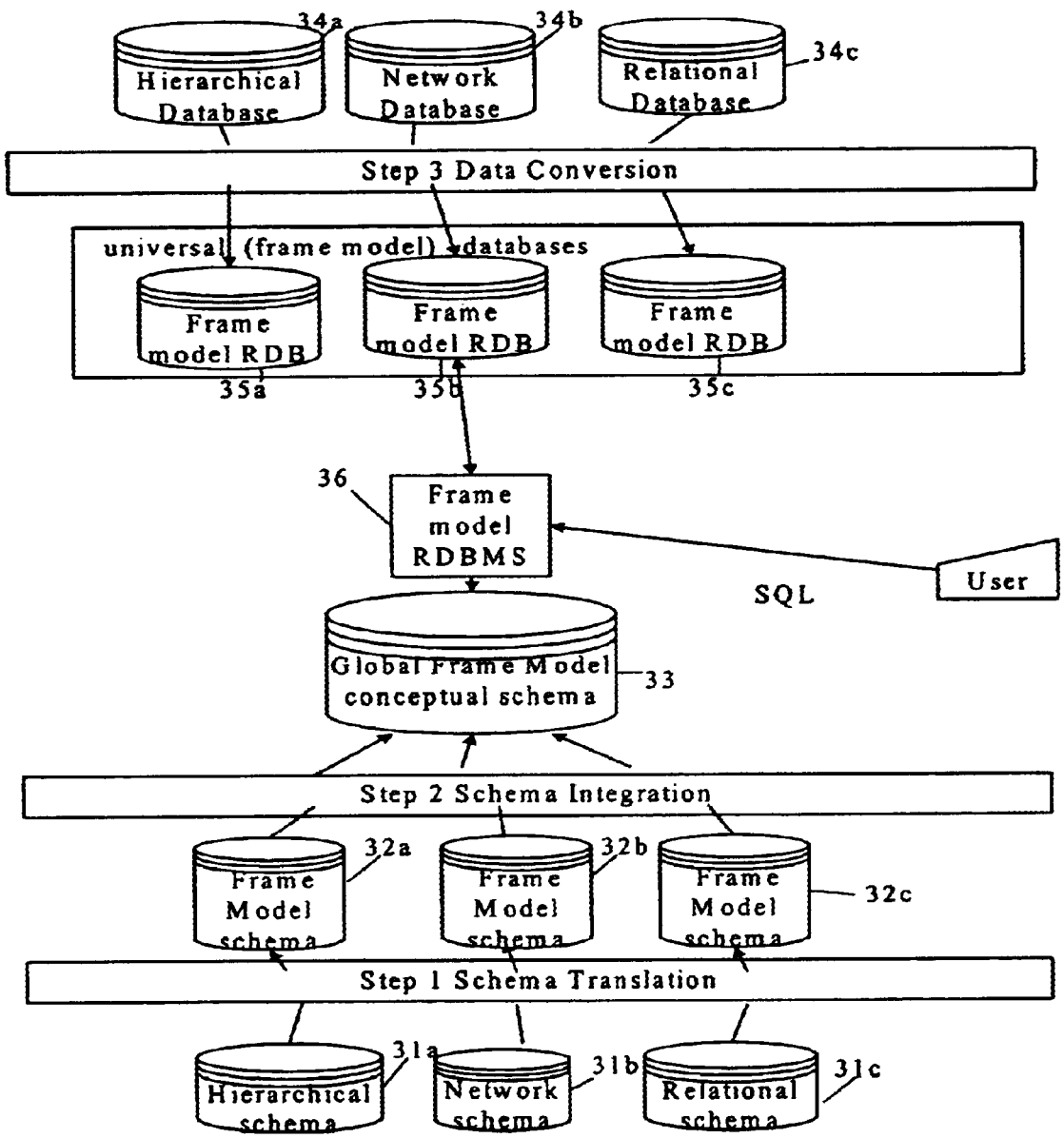
Fig 3 Architecture of universal databases for databases integration

Frame model logical schema

Header Class

| Class_Name | Primary_key | Parents | Operation | Class_type |
|---|---|---|---|---|
| Patient | HKID | 0 | Call Create_patient | Static |

Attribute Class

| Class_name | Attribute_name | Method_name | Attribute_type | Associate Attribute | Default_value | Cardinality | Description |
|---|---|---|---|---|---|---|---|
| Patient | Birthday | | date | | | | Patient's birthday |
| Patient | Age | Seek_age | | | | | Patient's age |
| Patient | HKID | | integer | | | | Patient's Hong Kong ID |

Constraint class

| Constraint name | Method name | Class_Name | Parameters | Ownership | Event | Sequence | Timing |
|---|---|---|---|---|---|---|---|
| Create_patient | Create_patient | Patient | HKID | self | Create | before | repeat |

Method class

| Method name | Class name | Parameter | Seq no | Method type | Condition | Action | Next_seq_no |
|---|---|---|---|---|---|---|---|
| Insert_patient | Patient | @Birthday @HKID @Age | | record | | Insert Patient values (@HKID, @birthday, @Age) | |
| Seek_age | Patient | @Birthday | | integer | If @Birthday≠ null | Update Patient set Age = Today - @Birthday Where Patient.HKID= @HKID | |

Fig 4b A sample frame model in three levels schema

STEP 1: Map Legacy Entities

Step 1.1: Discover primary keys. Given a relation R and its attributes $A_1, \ldots A_n$, its primary key PK(R) is located as:
For i = 1 to n do
begin   Select Count($A_i$)=C1, Count(Distinct $A_i$)=C2 from R;
       IF C1=C2
       THEN PK(R) = $A_i$;
End Step 1.2 Discover Compound key. Given a relation R with its attribute $A_1 \ldots A_s$ in a relational schema S, its compound key is located as:
For i = 1 to s do
begin For j = 1 to s do
    begin IF i ≠ j
        THEN begin Let k = 1;
            While not at end of attribute $A_{jk}$ in $R_j$ do
            begin Select Count(*)=C1, Count(Distinct ($A_{jk}, A_{j(k+1)}$))=C2 from $R_j$;
              IF C1=C2
              THEN CK(R)=($A_{jk}, A_{j(k+1)}$);    /*CK(R)=compound key of R*/
              Let k = k + 1;
            end;
        end;
    end;
end;

Step 1.3 Discover Foreign key. Given relations and their primary keys $R_1, PK(R_1), \ldots R_s, PK(R_s)$, its foreign key can be located as:
Select PK(R) from R;
For j = 1 to s do
begin Let k = 1;
    While not at end of attribute $A_{jk}$ in $R_j$ do
    begin Select Count($A_{jk}$)=C1, $A_{jk}$ from $R_j$;
       IF PK($R_j$) ≠ $A_{jk}$
       THEN begin Select Count(*)=C2 from PK(R) where PK(R) is in $A_{jk}$;
           IF C1=C2
           THEN FK(R) = $A_{jk}$ /*$A_{jk}$ is child relation $R_j$ foreign key refers to parent relation R */
       end;
    Let k = k + 1;
    end;
end;

Fig 4c

Frame model logical schema

Header Class (11)

| Class_Name | Primary key | Parents | Operation | Class_Type |
|---|---|---|---|---|
| $C_R$ | $A_1$ | 0 | | Static |
| $C_{Rj}$ | $A_1$ | $C_R$ | | Static |

50 — $C_R$ row
51 — $C_{Rj}$ row

Attribute class (12)

| Attribute_name | Class_name | Method_name | Attribute_type | Associate Attribute | Defaut_value | Cardinality | Description |
|---|---|---|---|---|---|---|---|
| $A_1$ | $C_R$ | | integer | | | | Superclass key |
| $A_2$ | $C_R$ | | date | | | | Superclass non-key attribute |
| $A_1$ | $C_{Rj}$ | | integer | | | | Subclass key |
| $A_3$ | $C_{Rj}$ | | date | | | | Subclass non-key attribute |

Fig 5b Frame model with isa relationship

Step 2 Map isa relationships. Given relations $R_i$ and $R_j$ and their primary keys $PK(R_i),...,$ $PK(R_j)$, their isa relationships are identified as:

/* Select primary keys of R1 into $PK(R_{sub})$, count the number of tuples in R1 and store value in $R_{sub}$ */

Select $PK(R_{sub})$, Count(*)=$C_{sub}$ from R1;   /* $R_{sub}$ = subclass relation */

/* Obtain the primary key attribute from relation R2 into $PK(R_s)$ */

Select $PK(R_s)$ from R2;   /* $R_s$ = superclass relation */

/* Check to see whether all $PK(R_s)$ is in the $PK(R_{sub})$. If so, then R2 is a superclass to $R_{sub}$ */

Select Count(*)=Cs from $PK(R_s)$ where $PK(R_s)$ isin $PK(R_{sub})$;

IF $C_{sub}=C_s$   /* Subclass relation primary key all appear in superclass relation primary key */
THEN ISA($R_{sub}$)=$R_s$;

Fig 5c

Superclass relation Ri

| $A_1$ | $A_2$ |
|---|---|
| $a_{11}$ | $a_{21}$ |
| $a_{12}$ | $a_{22}$ |

Subclass Relation Rj

| $A_1$ | $A_3$ |
|---|---|
| $a_{11}$ | $a_3$ |

Fig 6a data for isa relationship

Superclass Relation R

| $A_1$ | $A_2$ |
|---|---|
| $a_{11}$ | $a_{21}$ |
| $a_{12}$ | $a_{22}$ |

Subclass Relation Rj1

| *$A_1$ | $A_3$ |
|---|---|
| $a_{11}$ | $a_3$ |

Subclass Relation Rj2

| *$A_1$ | $A_4$ |
|---|---|
| $a_{12}$ | $a_4$ |

Fig 6b data for generalization

Subclass Relation R

| *A₁ | A₂ |
|---|---|
| $a_{11}$ | $a_{21}$ |
| $a_{12}$ | $a_{22}$ |

Superclass Relation Rj1

| A₁ | A₃ |
|---|---|
| $a_{11}$ | $a_{31}$ |
| $a_{13}$ | $a_{32}$ |

Superclass Relation Rj2

| A₁ | A₄ |
|---|---|
| $a_{12}$ | $a_{41}$ |
| $a_{14}$ | $a_{42}$ |

Fig 6c data for categorization

Parent Relation R

| A₁ | A₂ |
|---|---|
| $a_1$ | $a_2$ |

Child Relation Rj

| A_{j1} | *A₁ |
|---|---|
| $a_{j1}$ | null |

Fig 6d data for partial participation

Parent Relation R

| $A_1$ | $A_2$ |
|---|---|
| $a_1$ | $a_2$ |

Child Relation Rj

| $A_{j1}$ | *$A_1$ |
|---|---|
| $a_{j1}$ | $a_1$ |
| $a_{j2}$ | $a_1$ |

Fig 6e data for 1:n cardinality

Relation R1

| $A_{11}$ | $A_{12}$ |
|---|---|
| $a_{11}$ | $a_{12}$ |

Relation R2

| $A_{21}$ | $A_{22}$ |
|---|---|
| $a_{21}$ | $a_{22}$ |

Relation RC

| *$A_{11}$ | *$A_{21}$ |
|---|---|
| $a_{11}$ | $a_{21}$ |

Relation RD

| A | *$A_{11}$ | *$A_{21}$ |
|---|---|---|
| a | $a_{11}$ | $a_{21}$ |

Fig 6f data for aggregation
(R1+R2+RC=aggregation Class)

Frame model logical schema

11. Header Class

| Class Name | Primary key | Parents | Operation | Class Type |
|---|---|---|---|---|
| $C_R$ | A1 | 0 | | Static |
| $C_{Rj}$ | A1. Aj1 | 0 | | Static |

(70 = $C_R$ row, 71 = $C_{Rj}$ row)

12. Attribute class

| Attribute name | Class_ name | Method name | Attribute type | Associate Attribute | Default value | Cardinality | Description |
|---|---|---|---|---|---|---|---|
| $A_1$ | $C_R$ | | integer | $C_{Rj}$ | | n | Class association attribute |
| $A_2$ | $C_R$ | | string | | | | Class attribute |
| $A_1$ | $C_{Rj}$ | | Integer | $C_R$ | | 1 | Class association attribute |
| $A_{j1}$ | $C_{Rj}$ | | integer | | | | Associated class attribute |
| $A_3$ | $C_{Rj}$ | | String | | | | Class attribute |

(72, 73 labels on left)

Fig 7b Frame model with associated classes

STEP 3: Map Cardinality Relationships. Given a parent relation with its primary key R. Child relation Rj foreign key FK(Rj) refers to parent relation R primary key PK(R), after capturing the instances of cardinality semantic from relations R and $R_j$, the cardinality is mapped into a frame model as;

Select PK(R ) from R;

Let i = 1;

While not at end of Instance($PK_i$(R)) do begin Select Count(FK($R_j$))=$C_i$ from $R_j$ where FK($R_j$) = Instance($PK_i$(R));

Let i = i + 1;

end;

Let Minimum($R_j$) = minimum($C_1$,.... $C_n$);

Let Maximum($R_j$) = maximum($C_1$,.... $C_n$);

IF Minimum($R_j$) = 0

THEN cardinality(R, $R_j$) = 1 : (0, n)

ELSE IF Maximum($R_j$) = 1

THEN cardinality(R, $R_j$) = 1 : 1 /*default value which needs user confirmation */

ELSE cardinality(R, $R_j$) = 1 : n;

IF cardinality (R, $R_j$) = n:1 and cardinality (R, $R_h$) = n:1 /*$R_h$ is derived in same way as Rj*/

THEN cardinality ($R_j$, $R_h$) = m:n;

Fig 7c

Frame model logical schema

Header Class

| Class_Name | Primary_key | Parents | Operation | Class Type |
|---|---|---|---|---|
| $C_R$ | $A_1$ | 0 | Call Delete_$C_R$ | Static |
| $C_{Rj}$ | $A_1, A_{j1}$ | 0 | Call Create_$C_{Rj}$ | Static |

Attribute class

| Attribute name | Class_name | Method name | Attribute type | Associate attribute | Default value | Cardinality | Description |
|---|---|---|---|---|---|---|---|
| $A_1$ | $C_R$ | | integer | $C_{RJ}$ | | n | Association attribute |
| $A_2$ | $C_R$ | | integer | | | | class attribute |
| $A_1$ | $C_{RJ}$ | | integer | $C_R$ | | 1 | Associate attribute |
| $A_{j1}$ | $C_{RJ}$ | | string | | | | Weak class attribute |
| $A_j$ | $C_{RJ}$ | | string | | | | Weak class attribute |

Constraint class

| Constraint_name | Method_name | Class_Name | Parameters | Ownership | Event | Sequence | Timing |
|---|---|---|---|---|---|---|---|
| Delete $C_R$ | Delete $C_{RJ}$ | $C_R$ | $A_1$ | self | delete | after | repeat |
| Create $C_{RJ}$ | Create $C_R$ | $C_{RJ}$ | $A_1$ | self | create | before | repeat |

Method class

| Method name | Class_name | Parameter | Seq no | Method type | Condition | Action | Next_seq_no |
|---|---|---|---|---|---|---|---|
| delete_$C_R$ | $C_R$ | @$A_1$ | | boolean | If (Select * from $C_{RJ}$ where $A_1$ = @$A_1$) ≠ null | delete $C_R$ where $A_1$=@$A_1$ | |
| Create_$C_{RJ}$ | $C_{RJ}$ | @$A_1$ | | boolean | If (Select * from $C_R$ where $A_1$ = @$A_1$) ≠ null | insert $C_{RJ}$ value (@$A_1$) | |

Fig 8b Frame model with weak entity

Step 4 Map weak entity of legacy database schema into frame model, Given a relation and its primary key: R, PK(R), referring to its child relation and its foreign key: $R_j$, $FK(R_j)$, their participation is mapped into a frame model as:

Let participation (R, $R_j$) = total;

Select count (*)=C from $R_j$ where $FK(R_j)$ = null;

IF C > 0

THEN participation (R, $R_j$) = partial;

Fig. 8c

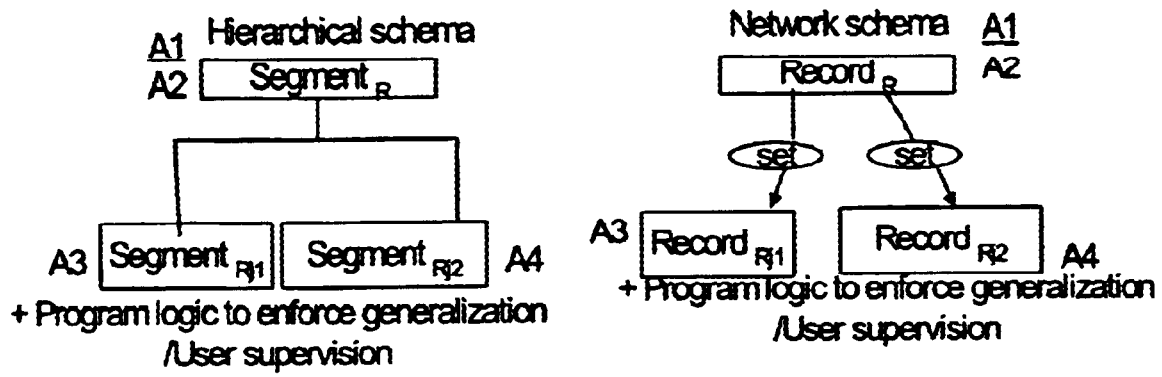
Relational Schema
Relation R (A1, A2)
Relation Rj1 (*A1, A3)
Relation Rj2 (*A1, A4)
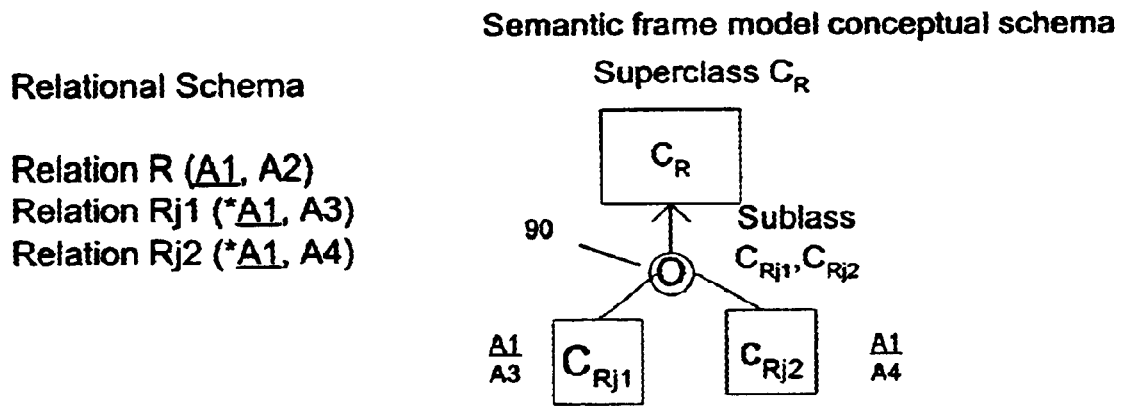
Fig 9a

Frame model logical schema

Header Class

| Class_Name | Primary_key | Parents | Operation | Class_Type |
|---|---|---|---|---|
| $C_R$ | $A_1$ | 0 | | Static |
| $C_{Rj1}$ | $A_1$ | $C_R$ | Call $C_{Rj1}$ | Static |
| $C_{Rj2}$ | $A_1$ | $C_R$ | Call $C_{Rj2}$ | Static |

Attribute class

| Attribute_name | Class_name | Method name | Attribute type | Associate attribute | Defaut value | Cardinality | Description |
|---|---|---|---|---|---|---|---|
| $A_1$ | $C_R$ | | integer | | | | Superclass primary key |
| $A_2$ | $C_R$ | | date | | | | Superclass non-key attribute |
| $A_1$ | $C_{Rj1}$ | | integer | | | | Subclass primary key |
| $A_3$ | $C_{Rj1}$ | | date | | | | Subclass non-key attribute |
| $A_1$ | $C_{Rj2}$ | | integer | | | | Subclass primary key |
| $A_4$ | $C_{Rj2}$ | | date | | | | Subclass non-key attribute |

Constraint class

| Constraint_name | Method_name | Class_Name | Parameters | Ownership | Event | Sequence | Timing |
|---|---|---|---|---|---|---|---|
| $C_{RJ1}$ | Create_$C_{Rj1}$ | $C_{Rj1}$ | $A_1$ | self | Create | before | repeat |
| $C_{Rj2}$ | Create_$C_{Rj2}$ | $C_{Rj2}$ | $A_1$ | self | Create | before | repeat |

Method class

| Method name | Class_name | Parameter | Seq no | Method type | Condition | Action | Next_Seq_no |
|---|---|---|---|---|---|---|---|
| Create_$C_{Rj1}$ | $C_{Rj1}$ | @$A_1$ | | boolean | If (Select * from $C_{Rj2}$ where $A_1$ = @$A_1$) = null | Insert $C_{Rj1}$(@$A_1$, @$A_3$) | |
| Create_$C_{Rj2}$ | $C_{Rj2}$ | @$A_1$ | | boolean | If (Select * from $C_{Rj1}$ where $A_1$ = @$A_1$) = null | Insert $C_{Rj2}$ (@$A_1$ @$A_4$) | |

Fig 9b Frame model with disjoint generalization

STEP 5: Map generalization of legacy database schema into frame model. Given a superclass relation and its parimary key: R, PK(R), referring to its subclass relations and their primary key: $R_{j1}$, $PK(R_{j1})$,...$R_{jn}$, $PK(R_{jn})$, after capturing the generalization of relations $R_{j1}$,..$R_{jn}$, generalization is mapped into a frame model as follows:

IF $ISA(R_{j1}) = ...=ISA(R_{j2})=R_s$

/*$ISA(R_1)=R_2$ => subclass relation $R_1$'s superclass relation $R_2$*/

THEN Let $ISA(R_{j1},...R_{jn})$ = disjoint; /* derived from step 3 isa relationship */

For h = 1 to n do Select $PK(R_{jh})$ from $R_{jh}$; /* check overlap data occurrence in subclass */

For k = 1 to n do begin For m = 1 to n do begin IF k ≠ m

THEN begin Select Count(*)=C from $PK(R_m)$ where $PK(R_m)$ is in $PK(R_k)$;

IF C > 0

THEN $ISA(R_{j1},...,R_{jn})$ = overlap;

end;

end;

end

Fig 9c

Frame model logical schema

11 — Header Class

| Class Name | Primary key | Parents | Operation | Class_Type |
|---|---|---|---|---|
| $C_{Rj1}$ | $A_1$ | 0 | | Static |
| $C_{Rj2}$ | $A_1$ | 0 | | Static |
| $C_R$ | $A_1$ | $C_{Rj1}, C_{Rj2}$ | Call $C_R$ | Static |

12 — Attribute class

| Attribute name | Class_name | Method_name | Attribute_type | Associate Attribute | Defaut_value | Cardinality | Description |
|---|---|---|---|---|---|---|---|
| $A_1$ | $C_{Rj1}$ | | integer | | | | Superclass attribute |
| $A_2$ | $C_{Rj1}$ | | String | | | | Superclass attribute |
| $A_1$ | $C_{Rj2}$ | | Integer | | | | Superclass attribute |
| $A_3$ | $C_{Rj2}$ | | string | | | | Superclass attribute |
| $A_1$ | $C_R$ | | Integer | | | | Subclass attribute |
| $A_4$ | $C_R$ | create $C_R$ | string | | | | Subclass attribute |

14 — Constraint class

| Constraint_name | Method_name | Class_Name | Parameters | Ownership | Event | Sequence | Timing |
|---|---|---|---|---|---|---|---|
| $C_R$ | Create_$C_R$ | $C_R$ | $A_1$ | self | Create | before | repeat |

13 — Method class

| Method_name | Class_name | Parameter | Seq-no | Method_type | Condition | Action | Next_seq_no |
|---|---|---|---|---|---|---|---|
| Create_$C_R$ | $C_R$ | @$A_1$ | | boolean | If (Select * from $C_{Rj1}$, $C_{Rj2}$ where $A_1$ = @$A_1$) ≠ null | Insert $C_R$ values (@$A_1$) | |

Fig 10b Frame model with categorization

STEP 6: Map categorization of legacy database schema into a frame model. Given a subclass relation and its primary key: R, PK(R), referring to its superclass relations and their primary keys: $R_{j1}$, $PK(R_{j1})$,....$R_{jn}$, $PK(R_{jn})$, after capturing the categorization among relations R, $R_{j1}$,...$R_{jn}$, the categorization is mapped into a frame model as:

Declare cursor C1 select PK(R) from R;

IF $PK(R_{j1})$ = $PK(R_{j2})$ =......= $PK(R_{jn})$  /* derived from step 1 entity translation */

THEN Let ISA(R) = Categorization ($R_{j1}$,...$R_{jn}$);

While not at end of PK(R) do

Begin Select any $PK_j(R)$ fromR;

For i = 1 to n do

Select Count (*)=$C_i$ from $PK(R_j)$ where $PK_{ci}(R)$ is in $PK(R_j)$;

Let $C_t$ = $C_1$ +....+ $C_n$

IF $C_t \neq 1$

THEN ISA(R) ≠ Categorization ($R_{j1}$,...$R_{jn}$);

Let j = j + 1;

end;

<p align="right">Fig 10c</p>

Frame model logical schema

Header Class

| Class_Name | Primary key | Parents | Operation | Class_Type |
|---|---|---|---|---|
| $C_{R1}$ | $A_{11}$ | 0 | Call Delete $C_{RC}$ | Active |
| $C_{R2}$ | $A_{21}$ | 0 | Call Delete $C_{RC}$ | Active |
| $C_{RC}$ | $A_{11}$ $A_{21}$ | 0 | Call Insert $C_{RC}$ | Active |
| $C_{RD}$ | A | 0 | | Static |

Attribute class

| Attribute name | Class_name | Method name | Attribute type | Associate attribute | Default value | Cardinality | Description |
|---|---|---|---|---|---|---|---|
| $A_{11}$ | $C_{R1}$ | | integer | $C_{RC}$ | | n | "strong" Component class |
| $A_{12}$ | $C_{R1}$ | | string | | | | class attribute |
| $A_{21}$ | $C_{R2}$ | | integer | $C_{RC}$ | | n | "strong" component class |
| $A_{22}$ | $C_{R2}$ | | string | | | | class attribute |
| $A_{11}$ | $C_{RC}$ | | integer | $C_{R1}$ | | 1 | "weak" component class |
| $A_{11}$ | $C_{RC}$ | | integer | $C_{RD}$ | | n | class associate attribute |
| $A_{21}$ | $C_{RC}$ | | integer | $C_{R2}$ | | 1 | "weak" component class |
| $A_{21}$ | $C_{RC}$ | | integer | $C_{RD}$ | | n | Class associate attribute |
| A | $C_{RD}$ | | integer | | | | class attribute |
| $A_{11}$ | $C_{RD}$ | | integer | $C_{RC}$ | | 1 | class attribute |
| $A_{21}$ | $C_{RD}$ | | integer | $C_{RC}$ | | 1 | class association |

Constraint class

| Constraint_name | Method_name | Class_Name | Parameters | Ownership | Event | Sequence | Timing |
|---|---|---|---|---|---|---|---|
| Delete $C_{RC}$ | Delete $C_{RC}$ | $C_{R1}$ | $A_1$ | self | delete | Before | repeat |
| Delete $C_{RC}$ | Delete $C_{RC}$ | $C_{R2}$ | $A_1$ | self | delete | before | repeat |
| Create $C_{RC}$ | Create $C_{RC}$ | $C_{RC}$ | $A_1$ | self | create | before | repeat |

Method class

| Method name | Class_name | Parameter | Seq no | Method type | Condition | Action | Next_seq_no |
|---|---|---|---|---|---|---|---|
| Delete $C_{RC}$ | $C_{R1}$ | @$A_1$ | | boolean | If (Select * from $C_{RC}$ where $A_1$ = @$A_1$) ≠ null | delete $C_{RC}$ where $A_1$=@$A_1$ | |
| delete_$C_{RC}$ | $C_{R2}$ | @$A_1$ | | boolean | If (Select * from $C_{RC}$ where $A_1$ = @$A_1$) ≠ null | delete $C_{RC}$ where $A_1$=@$A_1$ | |
| Create_$C_{RC}$ | $C_{RC}$ | @$A_1$ | | boolean | If (Select * from $C_{R1}$, $C_{R2}$ where $A_1$ = @$A_1$) ≠ null | insert $C_{RC}$ value (@$A_1$) | |

Fig 11b Frame model with aggregation

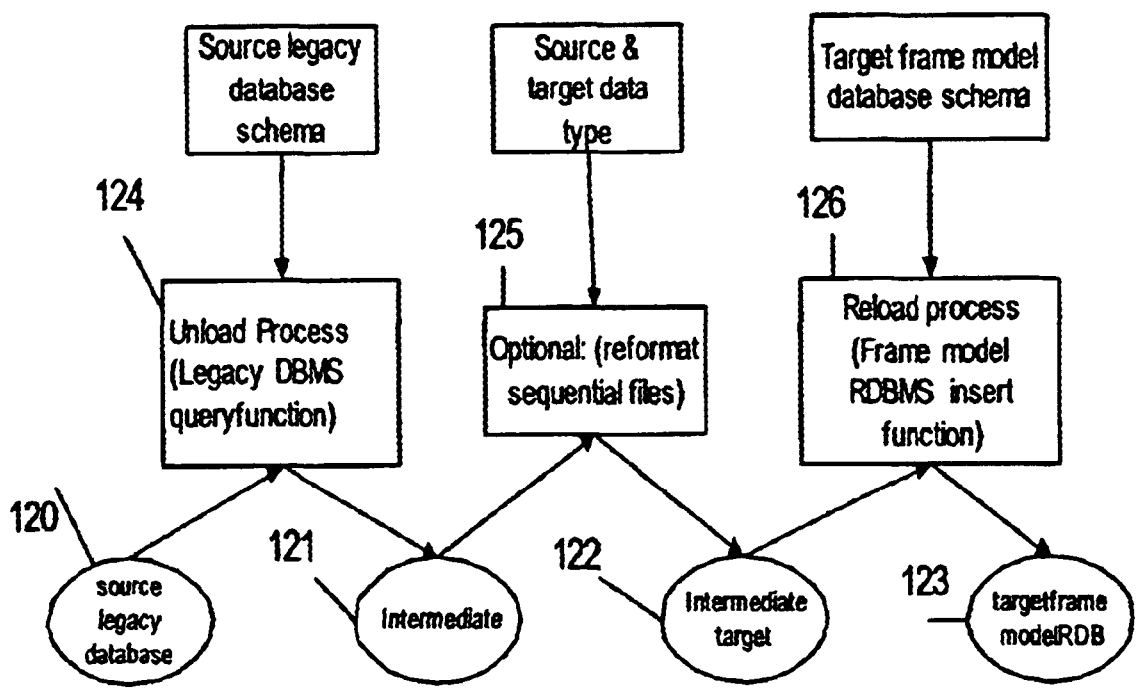
Fig 12a The logical level approach for data conversion for universal database Unload HDB into sequential files:

Begin /*Map each segment "Access path" key to a attribute. Read all segment data top down.
Writing data of each segment type along with its "access path" key to a sequential file */

Get all segment type $H_1$, $H_2$,..$H_h$ from the hierarchical input schema;

For i = 1 to h do /* H = the number of segment types */

Begin /* for each target segment type */

Get $H_{i1}$, $H_{i2}$... $H_{ii}$ segment types; /*get target segment $H_{ii}$ parent segments $H_{i1}$...$H_{i(i-1)}$*/

Let j = 1 /* start from level 1 of root segment */

While j > 0 do /* processing all target segment occurrences */

Begin case j of j=1: begin /* process all root segment occurrences */

Get next $H_{i1}$ segment;

IF segment found

THEN Let j = j + 1 /* go down toward target segment */

ELSE Let j = j - 1 /* go up to get out of the loop */ end i>j>1: begin /* set up parentage position */

Get next within parent $H_{ij}$ segment;

IF segment found

THEN Let j = j + 1 /*go down toward target segment*/

ELSE Let j = j - 1; /* go up toward root segment */ end;

j=i: begin /* process target segment */ while $H_{ii}$ segment found do begin

Get next within parent $H_{ii}$ segment; /*set up parentage */ case $H_{ii}$ segment identifier type of

"F": output $H_{ii}$ segment with its parent segment keys $H_m$ to sequential file i;

/*fully internally identified, $H_m$=the concatenation of parent segment keys of $H_i$ */

"P": output $H_{ii}$ segment along with $H_{i1}$(key), $H_{i2}$(key)...$H_{i(i-1)}$(key), $H_{ii}$(key)

to sequential file i;

/* partially internally identified */

Fig 12b

"I": output $H_{i1}$ segment along with $H_{i1}(key)$, $H_{i2}(key)$......$H_{i(i-1)}$(key), .sequence# to sequential file i; /* internally unidentified*/
            case-end;
         while-end;
         Let j = j - 1; /* go up toward root segment */
         end;
      case-end;
   while-end;
   for-end;
end.

Fig 12b (continued)

Unload NDB into sequential files:

Begin /* In the unload process, with the help of translated relational schema files, an unload program will read all record occurrences of each record type of the NDB from bottom up and load data of each record type into a sequential file */

Get all record type $N_1$, $N_2$....$N_n$ within input network schema;

For i = 1 to n do /* for each target record type $N_i$ */ while $N_i$ record occurrence found do begin /*n=number of record types, m=number of levels in each path expression */

IF it is first occurrence

THEN obtain first record $N_i$ within area

ELSE obtain next record $N_i$ within area;

For j = m-1 to 1 do /* read target record owner records by database navigation from level m-1 to level 1, a system-owned records */

Obtain owner records keys $K_i(1)$, $K_i(2)$,...$K_i(j)$

/* obtain the record keys of all owners of record $N_i$ along database access path from bottom up to the system owned record*/ end-for;

Case record identifier_type of

'F': begin    /* fully internally identified */

IF m = 1

THEN output $N_i$ record with $K_i(m)$ as record identifier to sequential file i ELSE output $N_i$ record with $K_i(1)$, $K_i(2)$....$K_i(m)$ as foreign key to sequential file i /* $K_i(m)$ = key of owner record key in level m */ end;

'P': output $N_i$ record with $K_i(1)$, $K_i(2)$,.. $K_i(m)$ as record identifier to sequential file i; /* partially internally identified */

'I': output $N_i$ record with $K_i(1)$, $K_i(2)$,.., $K_i(m-1)$,Sequence# as record identifier to sequential file i; /* internally unidentified */ end-case;

end-while;

end-for;

end.

Fig 12c

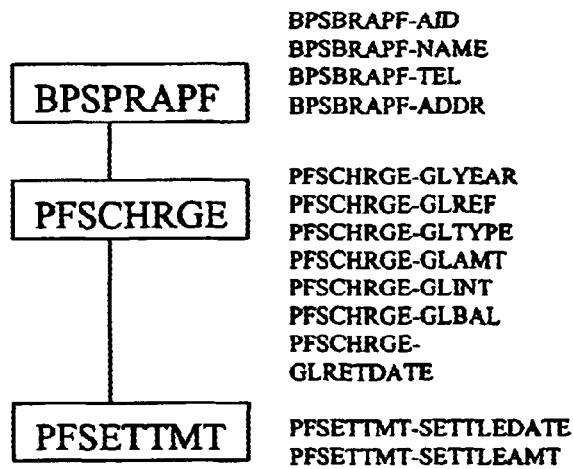
Fig 13a Original Hierarchical Database schema and data

Frame model logical schema

Header Class

| Class_Name | Primary key | Parents | Operation | Class_Type |
|---|---|---|---|---|
| C_BPSBRAPF | AID | 0 | | Static |
| C_PFSCHRGE | AID, GLYEAR, GLREF, GLTYPE | 0 | | Static |
| C_PFSETTMT | AID, GLYEAR, GLREF, GLTYPE, SETTLEDATE, SETTLEAMT | 0 | | Static |

Attribute class

| Attribute_name | Class_name | Method name | Attribute type | Associate_attribute | Default_value | Cardinality | Description |
|---|---|---|---|---|---|---|---|
| AID | C_BPSBRAPF | | integer | C_PFSCHRGE | | n | class association attribute |
| NAME | C_BPSBRAPF | | string | | | | class attribute |
| TEL | C_BPSBRAPF | | integer | | | | class attributes |
| ADDR | C_BPSBRAPF | | integer | | | | class attribute |
| AID | C_PFSCHRGE | | integer | C_BPSBRAPF | | 1 | class association attribute |
| AID | C_PFSCHRGE | | integer | C_PFSETTMT | | n | class association attribute |
| GLYEAR | C_PFSCHRGE | | Integer | C_PFSETTMT | | n | class association attribute |
| GLREF | C_PFSCHRGE | | Integer | C_PFSETTMT | | n | class association attribute |
| GLTYPE | C_PFSCHRGE | | Numeric | C_PFSETTMT | | n | class association attributes |
| GLAMT | C_PFSCHRGE | | Numeric | | | | class attribute |
| GLINT | C_PFSCHRGE | | Numeric | | | | class attribute |
| GLBAL | C_PFSCHRGE | | Numeric | | | | class attribute |
| GLRETDATE | C_PFSCHRGE | | Date | | | | class attribute |
| AID | C_PFSETTMT | | Integer | C_PFSCHRGE | | 1 | class association attribute |
| GLYEAR | C_PFSETTMT | | Integer | C_PFSCHRGE | | 1 | class association attributes |
| GLREF | C_PFSETTMT | | Integer | C_PFSCHRGE | | 1 | class association attribute |
| GLTYPE | C_PFSCHRGE | | String | C_PFSCHRGE | | 1 | class association attribute |
| SETTLEDATE | C_PFSCHRGE | | Date | | | | class primary key attribute |
| SETTLEAMT | C_PFSCHRGE | | numeric | | | | Class attribute |

Fig 13b Frame model logical schema

The translated relational schema
Relation BPSBRAPF (AID, NAME, TEL, ADDR)
Relation PFSCHRGE (*AID, GLYEAR, GLREF, GLTYPE, GLAMT, GLINT, GLBAL, GLRETDATE)
Relation PFSETTMT (*AID, *GLYEAR, *GLREF, *GLTYPE, SETTLEDATE, SETTLEAMT)

Fig 13C

*The translated relational Database*

| BPSBRAPF | | | |
|---|---|---|---|
| AID | NAME | TEL | ADDR |
| 91225 736 | DING SIU KEUNG | 2889-2452 | FLT F, 33/F, 342, MARKET ST, TSUENWAN, NT |

| PFSCHRGE | | | | | | | |
|---|---|---|---|---|---|---|---|
| AID | GLYEAR | GLREF | GLTYPE | GLAMT | GLINT | GLBAL | GLRETDATE |
| 91225 736 | 92 | 214531 1 | L | 21000.00 | 2.00 | 0.00 | 950501 |
| 91225 736 | 94 | 164328 1 | G | 25000.00 | 0.00 | 0.00 | 000000 |

| PFSETTMT | | | | | |
|---|---|---|---|---|---|
| AID | GLYEAR | GLREF | GLTYPE | SETTLEDATE | SETTLEAMT |
| 91225 736 | 92 | 214531 1 | L | 950501 | 3714.00 |
| 91225 736 | 92 | 214531 1 | L | 950601 | 3714.00 |
| 91225 736 | 92 | 214531 1 | L | 950701 | 3714.00 |

Fig 13d

Program Work Area

| BPSBRAPF | | | |
|---|---|---|---|
| 91225736 | DING SIU KEUNG | 2889-2452 | FLT F.33/F.342 |

PFSCHRGE template

| 91225736 | 94 | 1643281 | 25000.00 | 2.00 | 0.00 | 00000000 |

PFSETTMT template

| 1225736 | 92 | 2145311 | L | 950701 | 3714.00 |

Currency pointer (cursor) — Cursor C1, Cursor, Cursor C3

Translated Relational schema

| 91225736 | DING SIU KEUNG | 2889-2452 | FLT F.33/F.34 |
|---|---|---|---|

| 91225736 | 92 | 1643281 | 21000.00 | 2.00 | 0.00 | 950501 |
| 91225736 | 94 | 1643281 | G | 25000.0 | 2.00 | 0.0 | 00000000 |

| 1225736 | 92 | 2145311 | L | 950501 | 3714.00 |
| 1225736 | 92 | 2145311 | L | 950601 | 3714.00 |
| 1225736 | 92 | 2145311 | L | 950701 | 3714.00 |

Fig 13e HDB embedded-DL/1 Database program emulated by embedded-SQL cursors

| | |
|---|---|
| H D B | Call 'CBLTDLI' using GU<br>              PCB-Mask-1<br>              I-O-Area<br>              Segment-$H_o$<br>If return-code = space<br>    Perform LOOP until-end-of-record.<br>LOOP.   Call 'CBLTDLI' using GN<br>              PCB-Mask-1<br>              I-O-Area<br>              Segment-H |
| N D B | Find first $N_o$ record.<br>Perform LOOP until-end-of-record.<br>LOOP.   Obtain next N record within S. |
| R D B | Exec SQL Declare C cursor for Select $A_{o1}.A_{ok}...A_{on}$ from $R_o$ end-exec./*$A_{ok}$=key of $R_o$*/<br>Exec SQL Declare S cursor for Select $A_1, A_k...A_n, F$ from R where $F = A_{ok}$ end-exec.<br>/*F=foreign key */<br>    Exec SQL Open C, S end-exec.<br>    Exec SQL Fetch C into $R_o$ end-exec.<br>    Move $A_{ok}$ to F.<br>    Perform LOOP until tuple-not-found.<br>LOOP: Exec SQL Fetch S into R end-exec. |

Fig 13f The algorithm for PROJECT operation DML transaction translation

| | |
|---|---|
| H D B | Call 'CBLTDLI' using GU<br>    PCB-Mask-1<br>    I-O-Area<br>    Segment-$H_o$<br>If return-code = space<br>    Move New-data to Segment-H<br>    Call 'CBLTDLI' using ISRT<br>        PCB-Mask-1<br>        I-O-Area<br>        Segment-H |
| N D B | Find $N_{k-1}$ using K.<br>If return-code ≠ 0<br>    error-exit-1<br>else<br>    Move $N_1$ to $V_1$<br>    ...<br>    Move $N_n$ to $V_n$<br>    Find $N_k$ within S<br>    If return-code = 0<br>        error-exit-2<br>    else<br>        Store $N_k$. |
| | Exec SQL Declare C cursor for Select $A_{(k-1)1},..A_{(k-1)k}.A_{(k-1)n}$ from $R_{k-1}$ where $K=A_{(k-1)k}$ end-exec.<br><br>Exec SQL Declare S cursor for Select $A_{k1},..A_{km}$, F from $R_k$ where $F = A_{(k-1)k}$ end-exec.<br><br>    Exec SQL Open C, S end-exec.<br><br>    Move $A_{(k-1)k}$ to K.<br><br>    Exec SQL Fetch C into $R_o$ end-exec.<br><br>    If return-code ≠ 0<br><br>      error-exit-1<br><br>    else<br><br>      Move $A_{(k-1)k}$ to F<br><br>    Exec SQL Fetch S into $R_k$ using F end-exec.<br><br>    If return-code = 0<br><br>      error-exit-2<br><br>    else<br><br>      Exec SQL Store R end-exec. |

Fig 13g The algorithm for INSERT operation DML transaction translation

| | |
|---|---|
| H<br>D<br>B | Move Vk1 to Fk1.<br>Move Vk2 to Fk2.<br>...<br>Move Vkn to Fkn.<br>Exec DLI GHU using PCB(1)<br>    Segment T<br>    into Segment-area<br>    where S1 = Fk1<br>    and Sk2 = Fk2<br>    ....<br>    and SKn = Fkn.<br>If return-code = space<br>  Exec 'CBLTDLI' using DLET<br>       PCB (1)<br>       Segment T<br>Else<br>  error-exit. |
| N<br>D<br>B | Obtain $N_k$ using K.<br>If return-code ≠ 0<br>  Error-exit-1<br>Else<br>  Find current $N_{k+1}$ within S<br>  If return-code = 0<br>    error-exit-2<br>  else<br>    Erase $N_k$. |
| R<br>D<br>B | Exec SQL Declare C cursor for Select $A_{k1},. A_{kk}...A_{kn}$ from $R_k$ where $K = A_{kk}$ end-exec.<br>Exec SQL Declare S cursor for Select $A_{(k+1)1},...A_{(k+1)m}$, F from $R_{k+1}$ where $F = A_{kk}$ end-exec.<br>Exec SQL Open C, S end-exec.<br>Move $A_{kk}$ to K.<br>Exec SQL Fetch C into $R_k$ end-exec.<br>If return-code ≠ 0<br> error-exit-1<br>else<br> Move $A_{kk}$ to F<br> Exec SQL Fetch S into R using F<br> If return-code = 0<br>  error-exit-2<br> else<br>  Exec SQL Delete from R end-exec. |

Fig 13h The algorithm for DELETE operation DML transaction translation

|   |   |
|---|---|
| H D B | Move Vk1 to Fk1.<br>Move Vk2 to Fk2.<br>...<br>Move Vkn to Fkn.<br>Exec DLI GHU using PCB(1)<br>    Segment-T<br>    into Segment-area<br>    where S1 = Fk1<br>    and Sk2 = Fk2<br>    ....<br>    and SKn = Fkn.<br>If return-code = space<br>    Move New-data to Segment-T<br>    Exec 'CBLTDLI' using REPL<br>        PCB (1)<br>        Segment-T<br>else<br>    error-exit. |
| N D B | Obtain $N_k$ using K.<br>If return-code ≠ 0<br>    error-exit<br>else<br>If A ≠ foreign key<br>    Move A to $V_a$<br>    Modify $N_k$<br>Else<br>If V ≠ null and value (A) = null<br>    Find $N_{k-1}$ within S<br>    Connect $N_k$ to $N_{k-1}$<br>else<br>If V = null and value (A) ≠ null<br>    Find $N_{k-1}$ within S<br>    Disconnect $N_k$ from $N_{(k-1)}$<br>else<br>If V ≠ null and value (A) ≠ null<br>    Find $N_{k-1}$ within S<br>    Find $N_n$ within S'<br>    Reconnect $N_k$ from $N_{k-1}$ to $N_{(k-1)'}$ |
| R D B | Exec SQL Declare $C_{k-1}$ cursor for Select $A_{(k-1)1}, ...A_{(k-1)n}$ from $R_{k-1}$ where $K = A_{(k-1)k}$ end-exec.<br>Exec SQL Declare $C_{k-1'}$ cursor for Select $A_{(k-1)1'}, ..A_{(k-1)n'}$ from $R_{k-1'}$ where $K' = A_{(k-1)k'}$ end-exec.<br>Exec SQL Declare $C_k$ cursor for Select $A_{k1}, A_{k2}...A_{kn}, F$ from $R_k$ where $F = A_{(k-1)k}$ end-exec. |

Fig 13i - The algorithm for UPDATE operation DML transaction translation

```
Move A_{(k+1)k} to K.
    Exec SQL Open C_{k-1}, C_{k-1'}, C_k end-exec.
    Exec SQL Fetch C_{k-1} into R_{k-1} end-exec.
    If return-code ≠ 0
        Error-exit-1
    Else
     If V ≠ foreign key
            Move A_a to A
            Modify R_k
        else
    If V ≠ null and value(A) = null
            Move A_{(k-1)k} to F
            Modify R_k
        else
    If V = null and value(A) ≠ null
            Move null to F
            Modify R_k
        else
            Move A_{(k-1)k'} to F
            Modify R_k
```

Fig 13i – (Continued)

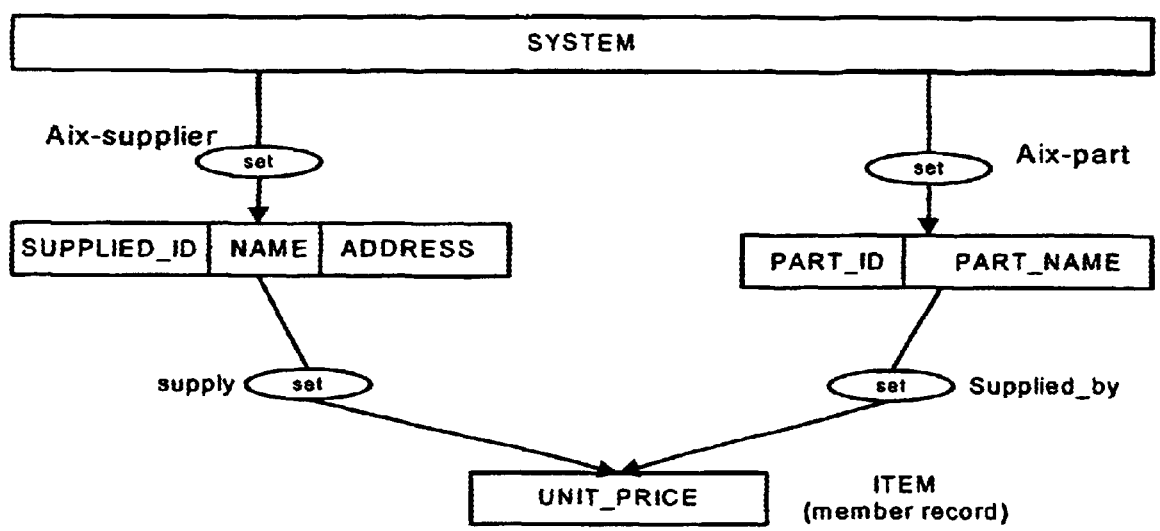
Fig 14a Network schema for a network database

SUPPLIER

| SUPPLIER_ID | SUPPLIER_NAME | ADDRESS |
|---|---|---|
| S1 | John's Co. | 32 Ivy Road |
| S2 | Michael Lee | 61 Clark Road |
| S3 | Jack's Store | 90 Dicky Road |
| S4 | Michael Lee | 61 Clark Road |

PART

| PART_ID | PART_NAME |
|---|---|
| P1 | Sugar |
| P2 | Orange Juice |
| P3 | Beer |
| P4 | Chocolate |

ITEM

| UNIT_PRICE |
|---|
| 4 |
| 5 |
| 6 |

Fig 14b Sample data from the Network Database

Relation Supplier (Supplier_ID, Supplier_name, Address)
Relation Part (Part_ID, Part_name)
Relation Item (*Supplier, *Part_ID, Unit_price)

Fig 14c Translated relational schema

SUPPLIER

| SUPPLIER_ID | SUPPLIER_NAME | ADDRESS |
|---|---|---|
| S1 | John's Co. | 32 Ivy Road |
| S2 | Michael Lee | 61 Clark Road |
| S3 | Jack's Stare | 90 Dicky Road |
| S4 | Michael Lee | 61 Clark Road |

PART

| PART_ID | PART_NAME |
|---|---|
| P1 | Sugar |
| P2 | Orange Juice |
| P3 | Beer |
| P4 | Chocolate |

ITEM

| SUPPLIER | PART_ID | UNIT_PRICE |
|---|---|---|
| S1 | P1 | 4 |
| S2 | P3 | 6 |
| S3 | P1 | 5 |

Fig 14d The Translated relations in the frame model

Fig 14 Network database schema and data and translated RDB schema and data

Figure 15a Integrated frame schema resolving synonyms and homonyms

Sub-step 1.1 Resolve conflicts on synonyms and homonyms

IF A.x and B.x have different data types or sizes

THEN x in A and B may be homonyms, let users clarify x in A and B

ELSE IF x ≠ y, and A.x and B.y have the same data type and size

THEN ((x,y) may be synonyms, let users clarify (x, y));

Figure 16a-c Integrated frame model schema remove data type conflict by transformation

Sub-step 1.2 Resolve conflicts on data types

IF $x \in$ (attribute(A) $\cap$ class(B))

THEN class X $\leftarrow$ class B such that cardinality (A, X) $\leftarrow$ n:1

ELSE IF $x \in$ (keys(A) $\cap$ class(B))

THEN class A' $\leftarrow$ class B such that cardinality (A, X) $\leftarrow$ 1:1

ELSE IF (x $\subset$ keys(A)) $\cap$ (class(B))

THEN class X $\leftarrow$ class B such that cardinality(A, X) $\leftarrow$ m:n

Fig 16d

Fig 17a Integrated frame model schema remove data type conflict by transformation Sub-step 1.3 Resolve conflicts on key IF x ∈(key(A) ∩ candidate_keys(B))

THEN let users clarify x in A and B

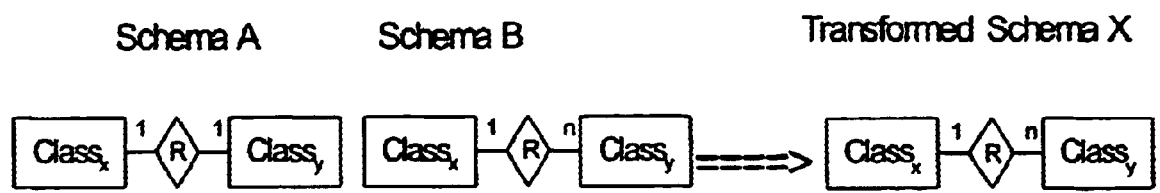
Fig 18a Integrated frame model schema resolving cardinality conflict

Sub-step 1.4 Resolve conflicts on cardinality

IF (class($A_1$) = class($B_1$)) ∧ (class($A_2$) = class($B_2$)) ∧ (cardinality($A_1$, $A_2$) = 1:1) ∧

(cardinality($B_1$, $B_2$) = 1:n)

THEN begin     $X_1$ ← $A_1$;

$X_2$ ← $A_2$;

cardinality($X_1$, $X_2$) ← 1:n;

ELSE IF (class($A_1$) = class($B_1$)) ∧ (class($A_2$) = class($B_2$)) ∧ (cardinality($A_1$, $A_2$) = 1:1 or 1:n)

∧ (cardinality($B_1$, $B_2$) = m:n)

THEN begin
$X_1$ ← $A_1$;

$X_2$ ← $A_2$;

cardinality($X_1$, $X_2$) ← m:n;
end;

Fig 18b

Fig 19a Integrated frame model schema resolving subtype conflict

Sub-step 1.5 Resolve conflicts on subtype classes

IF ((Class(A$_2$) ⊆ Class(A$_1$)) ∧ (Class(B$_1$) ⊆ Class(B$_2$)) ∧ (Class(A$_1$) = Class(B$_1$)) ∧

(Class(A$_2$) ≠ Class(B$_2$)))

THEN begin Class(X$_1$) ← Class(A$_1$)

Class(X$_2$) ← Class(A$_2$)

cardinality(X$_1$, X$_2$) ← 1:1 end;

Fig 20a Integrated frame model schema resolving weak entity conflict

Sub-step 1.6 Resolve conflicts on weak classes

IF $((Class(A_1) = Class(B_1)) \wedge (Class(A_2) = Class(B_2)) \wedge ((key(A_2) \cap key(B_2))=0)$ $\wedge\ ((key(B_1)) \cap key(B_2)) \neq 0)$ THEN  $Key(A_2) \leftarrow (Key(A_1) + Key(A_2))$ Fig 21a Integrated frame model schema with merged classes' domain attributes Sub-step 2.1 Merge classes by Union IF ((domain(A) ∩ domain(B)) ≠ 0)

THEN domain(X) ← (domain(A) ∪ domain(B))

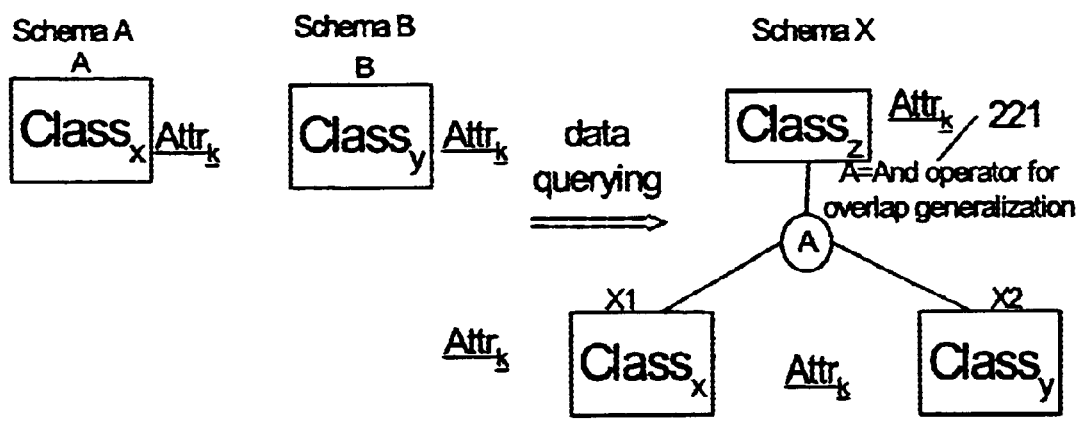
Figure 22a-b Integrated frame model schema with merged generalization classes

Sub-step 2.2 Merge classes by Generalization

IF ((domain(A) ∩ domain(B)) ≠ 0) ∧ ((I(A) ∩ I(B))=0)

THEN begin  Class($X_1$) ← Class(A)

Class($X_2$) ← Class(B)

domain(X) ← domain(A) ∩ domain(B)

/*create a superclass with common attributes from subclasses*/

(I($X_1$) ∩ I($X_2$))=0 end

ELSE IF ((domain(A) ∩ domain(B)) ≠ 0) ∧ ((I(A) ∩ I(B)) ≠ 0)

THEN begin Class($X_1$) ← Class(A)

Class($X_2$) ← Class(B)

domain(X) ← domain(A) ∩ domain(B)

/*create a superclass with common attributes from subclass*/

(I($X_1$) ∩ I($X_2$)) ≠ 0 end;

IF A.ClassPK =B.ClassPK

THEN begin Select A.ClassPK from A.Class;

Select B.ClassPK from B.Class;

Select Count(*)=C from A.ClassPK where A.ClassPK is in B.ClassPK;

IF C=0

THEN ISA(A.Class, B.Class) = disjoint

ELSE ISA(A.Class, B.Class) = overlap;

End;

Fig 22c

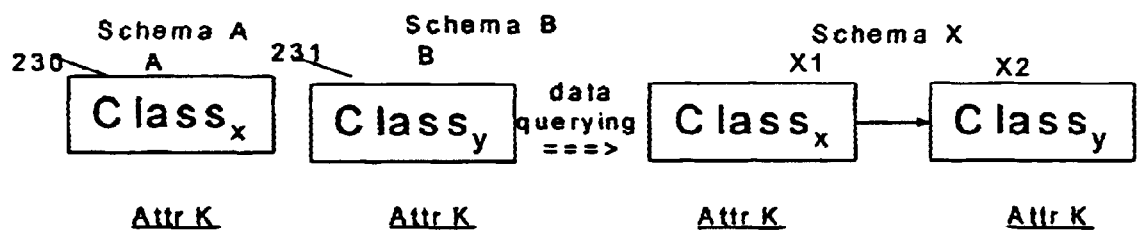
Fig 23a Integrated frame model schema with merged subtype classes

Sub-step 2.3 Merge classes by Subtype Relationship

If domain(A) ⊂ domain(B)        /* (see below) */ then begin Class($X_1$) ← Class(A)

Class($X_2$) ← Class(B)

Class($X_1$) isa Class($X_2$)

end;

/*The relationship between classes in two schemas is derived by examining actual data occurrences in the physical databases: */

IF A.ClassPK =B.ClassPK

THEN begin Select Count(*)=C1, A.ClassPK from A.Class;

Select B.ClassPK from B.Class;

Select Count(*)=C2 from A.ClassPK where A.ClassPK is in B.ClassPK;

IF C1=C2

THEN ISA(A.Class) = B.Class

End;

Fig 23b

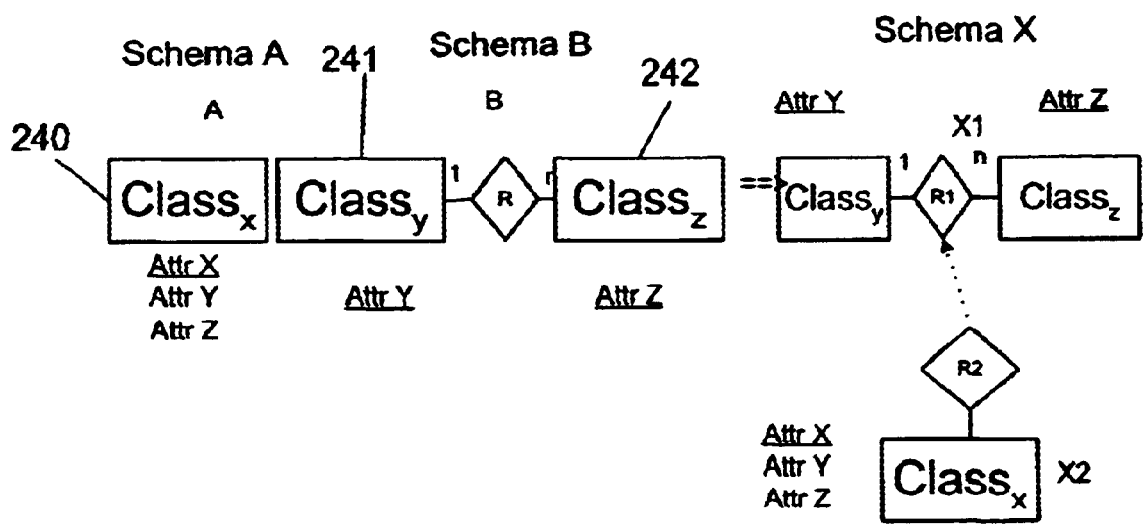
Fig 24a Integrated frame model schema with merged classes by aggregation

Sub-step 2.4 Merge frames by Aggregation

IF relationship B $\rightarrow\!\!\!\rightarrow$ Class(A)  /*MVD $\rightarrow\!\!\!\rightarrow$ means multi-value dependency/

THEN begin aggregation $X_1 \leftarrow$ (Class($B_1$) , relationship B, Class($B_2$))

Class($X_2$) $\leftarrow$ Class(A)

cardinality ($X_1$, $X_2$) $\leftarrow$ 1:n end;

Fig 24b

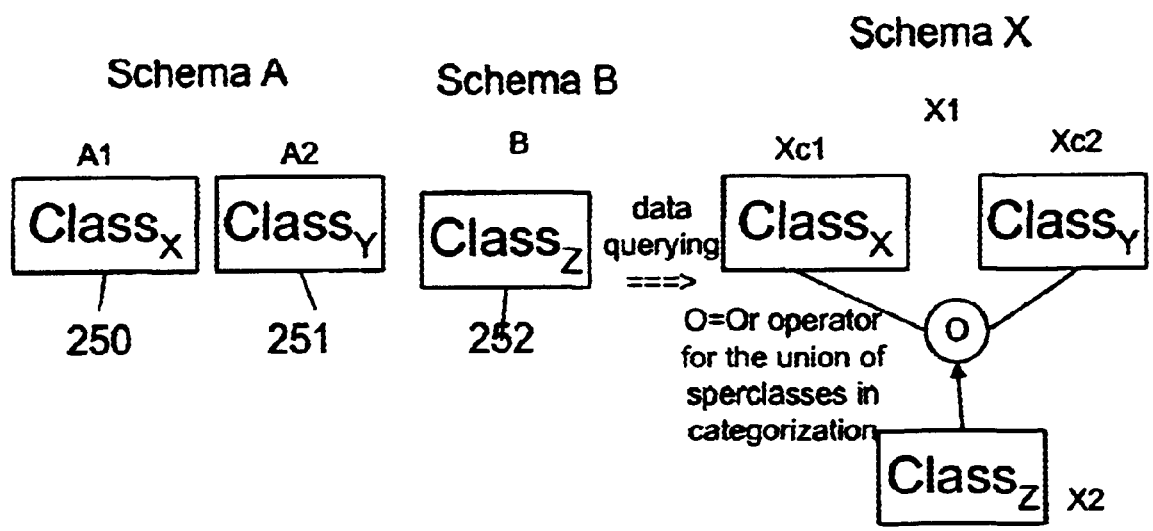
Fig 25a Integrated frame model schema classes merged by categorization Sub-step 2.5 Merge classes by categorization IF $(I(B) \subset I(A_1)) \vee (I(B) \subset I(A_2))$ THEN begin Class$(X_2)$ ← Class(B)

Class$(X_{c1})$ ← Class$(A_1)$

Class$(X_{c2})$ ← Class$(A_2)$ categorization $X_1$ ← (Class$(X_{c1})$, Class$(X_{c2})$)

$(I(X_2)$ isa $I(Xc_1)) \vee (I(X_2)$ isa $I(Xc_2))$    /* $X_2$ is subtype to $X_{c1}$ or $X_{c2}$ */ end;

/* The data querying to determine whether there is a categorization between the data occurrence of subclass as a subset of the union of the data occurrences of its superclass: */

IF B.ClassPK = A.ClassPK$_x$

And B.ClassPK = A.ClassPK$_y$

THEN begin Select A.ClassPK$_x$ from A.class$_x$;

Select A.ClassPK$_y$ from A.class$_y$;

Select B.ClassPK from B.Class;

Select Count(*) = C1 from B.ClassPK where B.ClassPK is in A.ClassPK$_x$;

Select Count(*) = C2 from B.ClassPK where B.ClassPK is in A.ClassPK$_y$;

Let C = C1 + C2;

IF C = 1

THEN ISA(B.Class) = Categorization (A.Class$_x$, A.Class$_y$);

End;

Fig 25b

Figure 26a-b Integrated frame model schema merged by implied relationship

Sub-step 2.6 Merge classes by Implied Binary Relationship

IF $x \in (\text{attribute}(A) \cap \text{key}(B))$

THEN begin Class($X_1$) ← Class(A)

Class($X_2$) ← Class(B)

cardinality ($X_1$, $X_2$) ← n:1 end

/* derived relationship by data querying cardinality by: */

IF A.Attribute = B.Attribute

THEN begin

Select A.Attribute from A.Class;

Let I = 1;

While not at end of Instance$_i$(A.Attribute) Do

Select Count(B.Attribute)=$C_i$ from A.Class where B.Attribute = Instance$_i$(A.Attribute);

Let Minimum(A.Attribute) = Minimum($C_1,...C_n$);

Let Maximum(A.Attribute) = Maximum($C_1,...C_n$);

IF Minimum(A.Attribute) = 0

THEN Cardinality(A.Class, B.Class) = 1: (0, n)

ELSE IF Maximum(A.Attribute) = 1

THEN Cardinality(A.Class, B.Class) = 1:1

ELSE Cardinality(A.Class, B.Class) = m:n

End;

Fig 26c

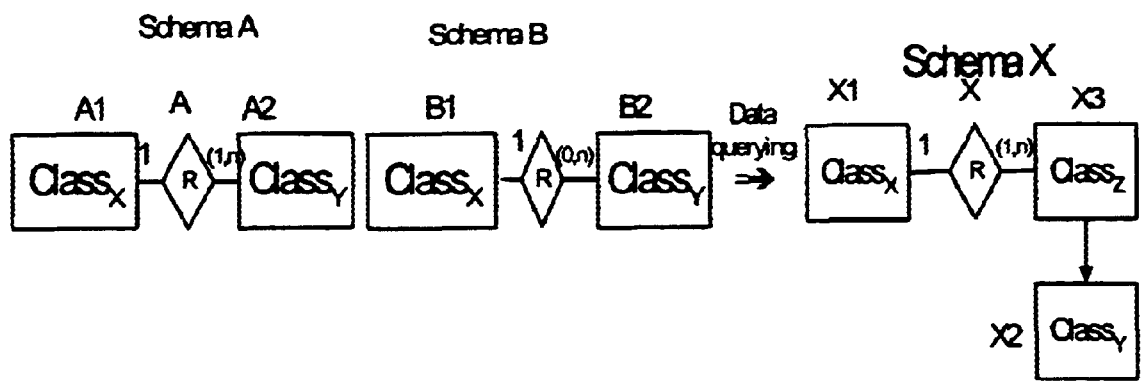
Fig 27a Integrated frame model schema classes merged with subtype relationship

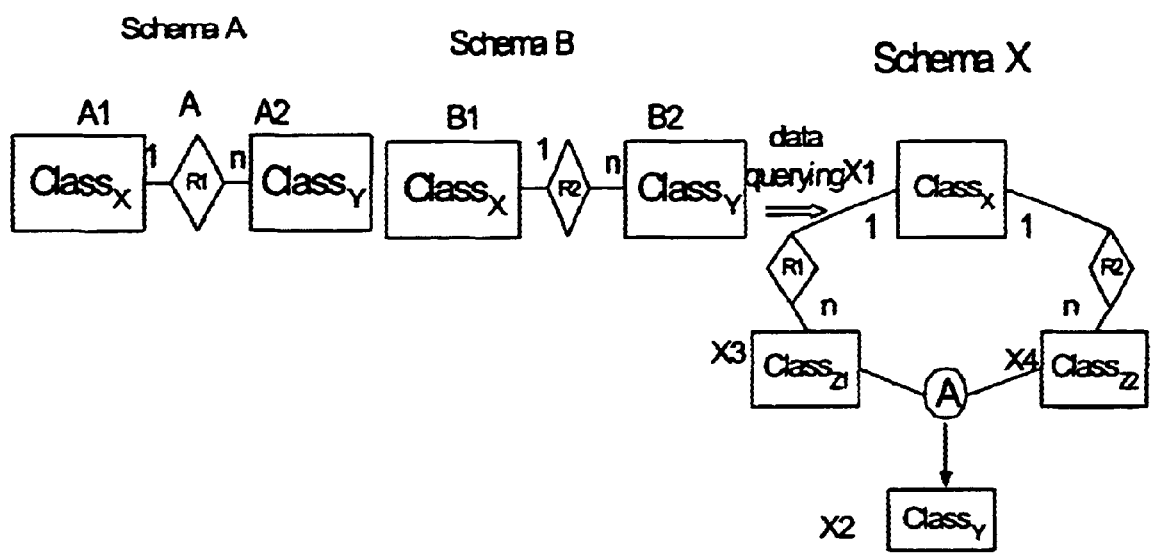
Fig 27b Integrated frame model schema merged by overlap generalization

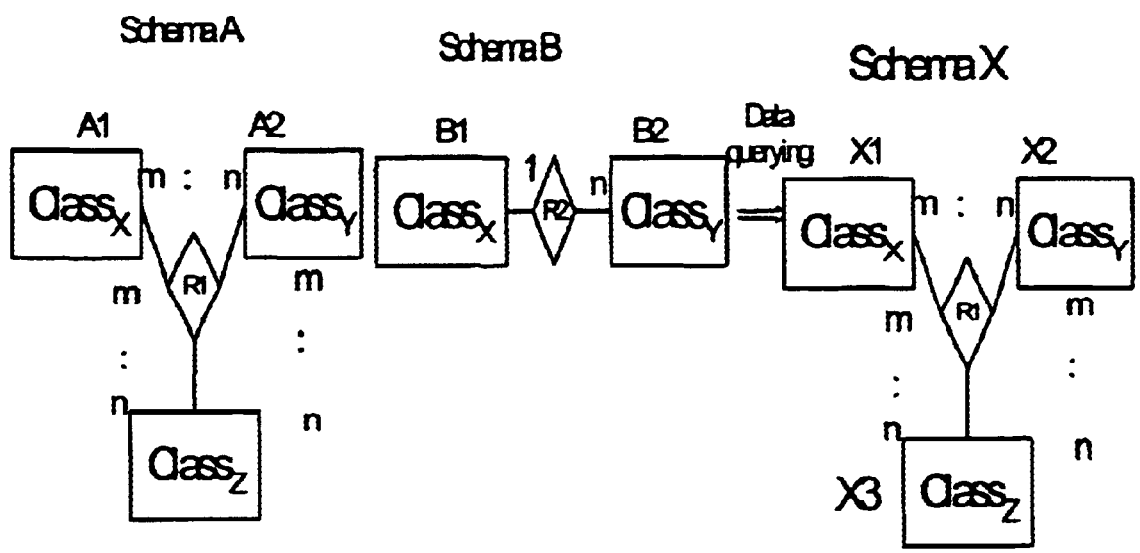
Fig 28a Integrated frame model schema merged by absorbing relationship Sub-step 3.2  Absorbing Lower degree Relationship into a Higher degree Relationship IF ((relationship(A) ⊃ relationship (B) ∧ (degree(A) > degree(B)) ∧(class(A1)=class(B1)) ∧
(class(A2)=class(B2))

THEN begin relationship(X) ← relationship(A)

class(X1) ← class(A1)

class(X2) ← class(A2)

class(X3) ← class(A3)

end;

Fig 28b

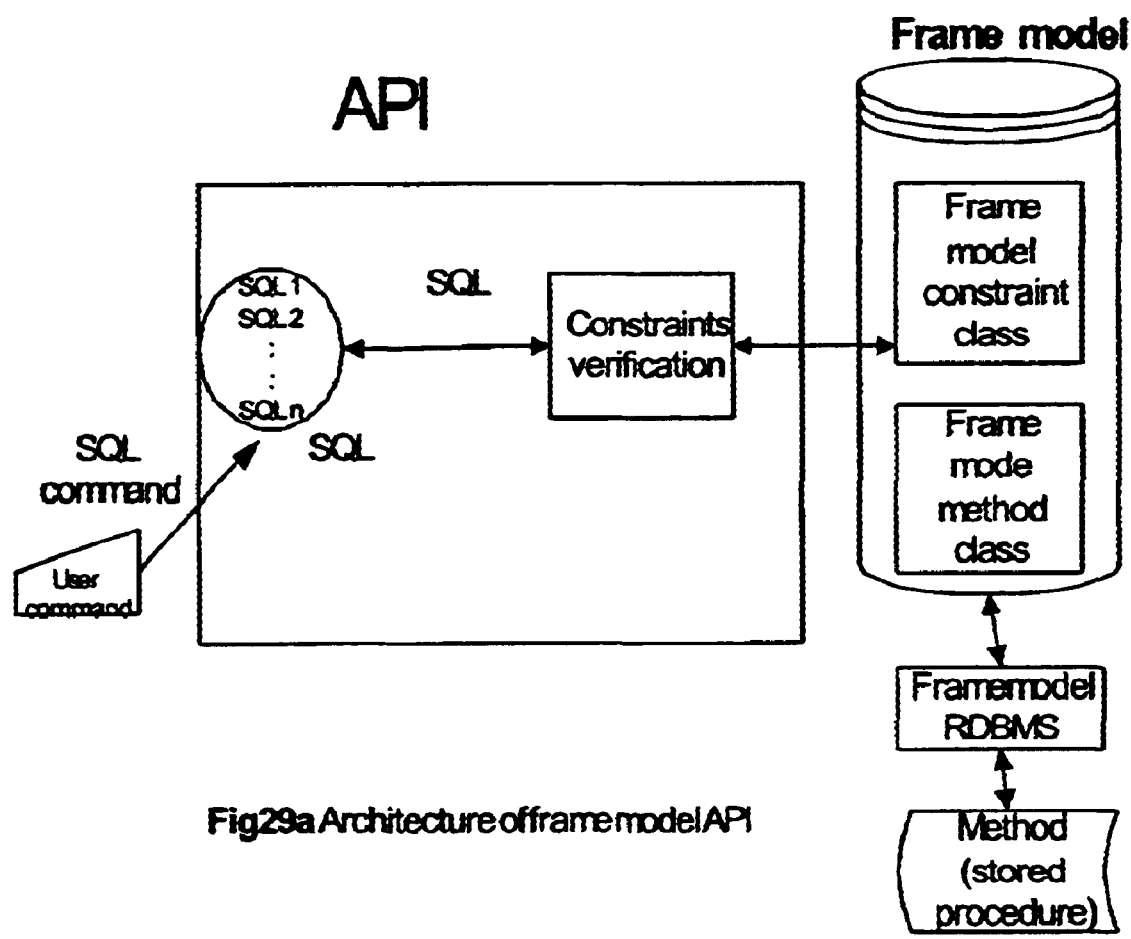
Fig 29a Architecture of frame model API

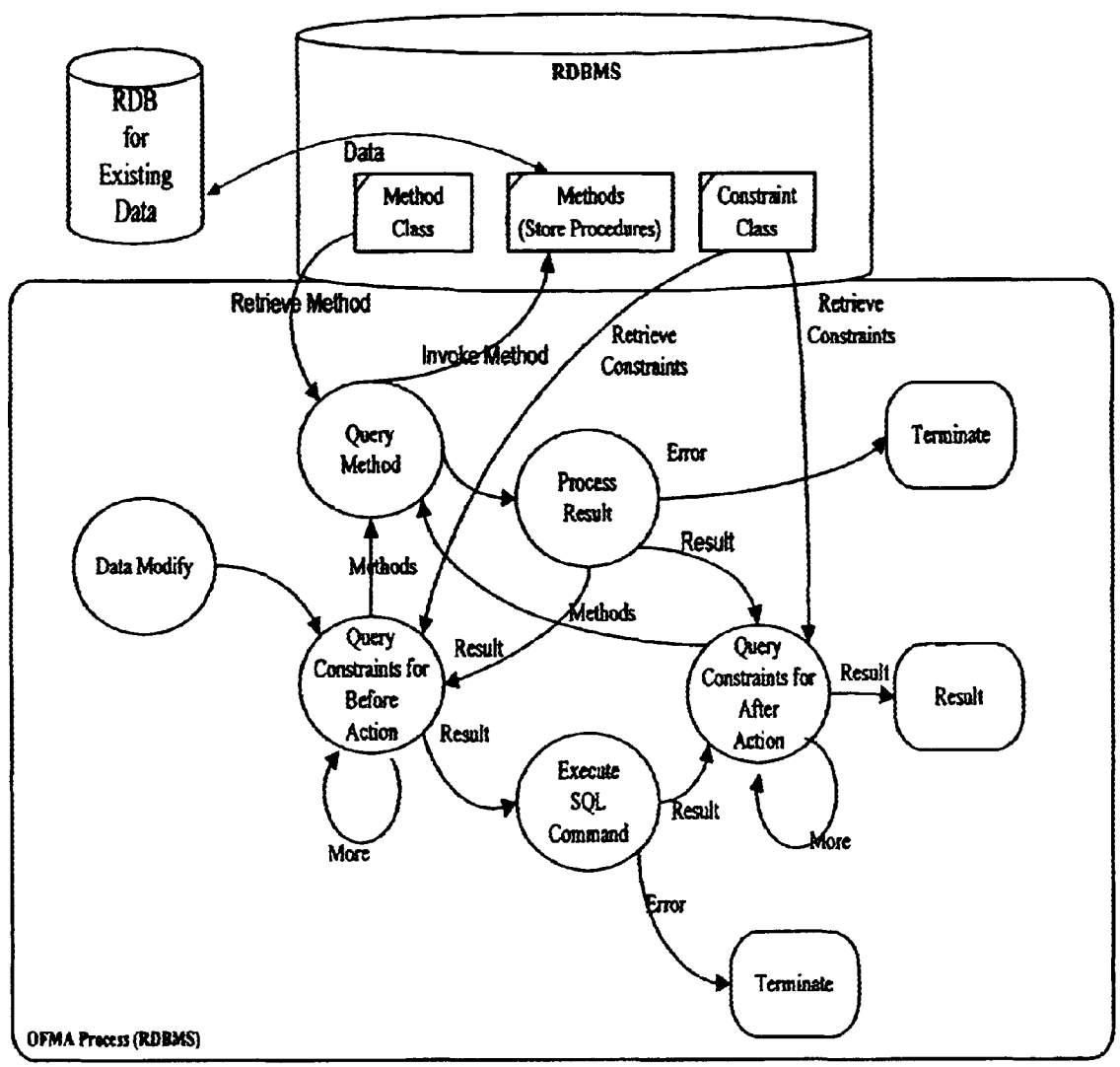
Fig 29b Data Flow of frame model API

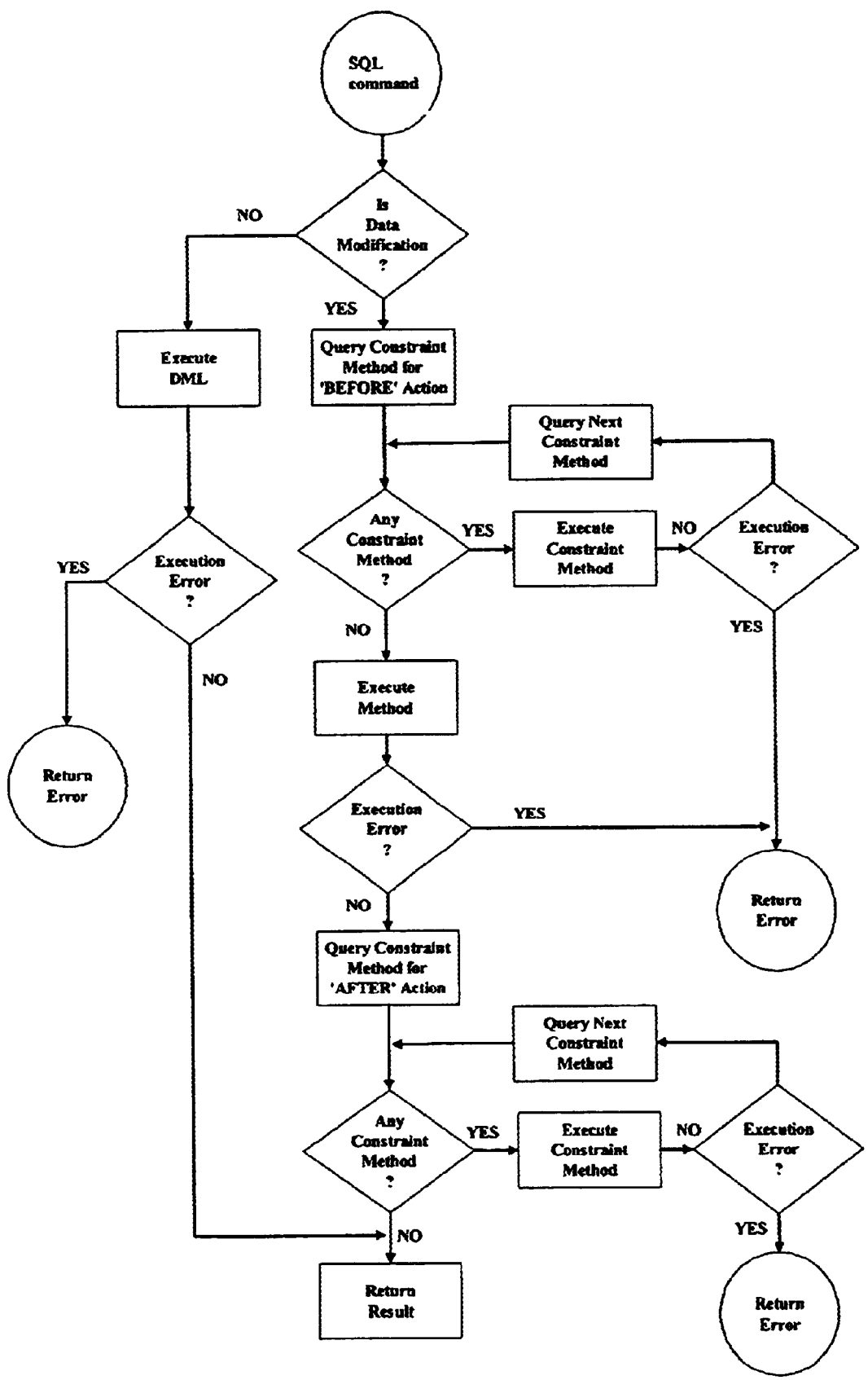
Fig 30 Logic flow of SQL command execution

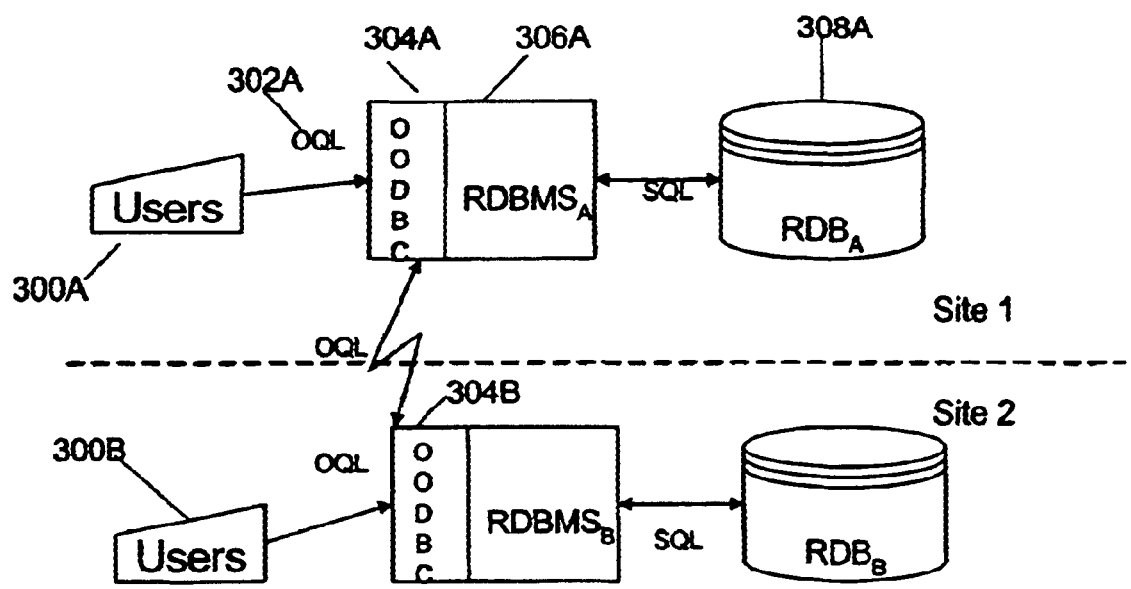
Figure 31 The interoperability of RDBs through OODBC

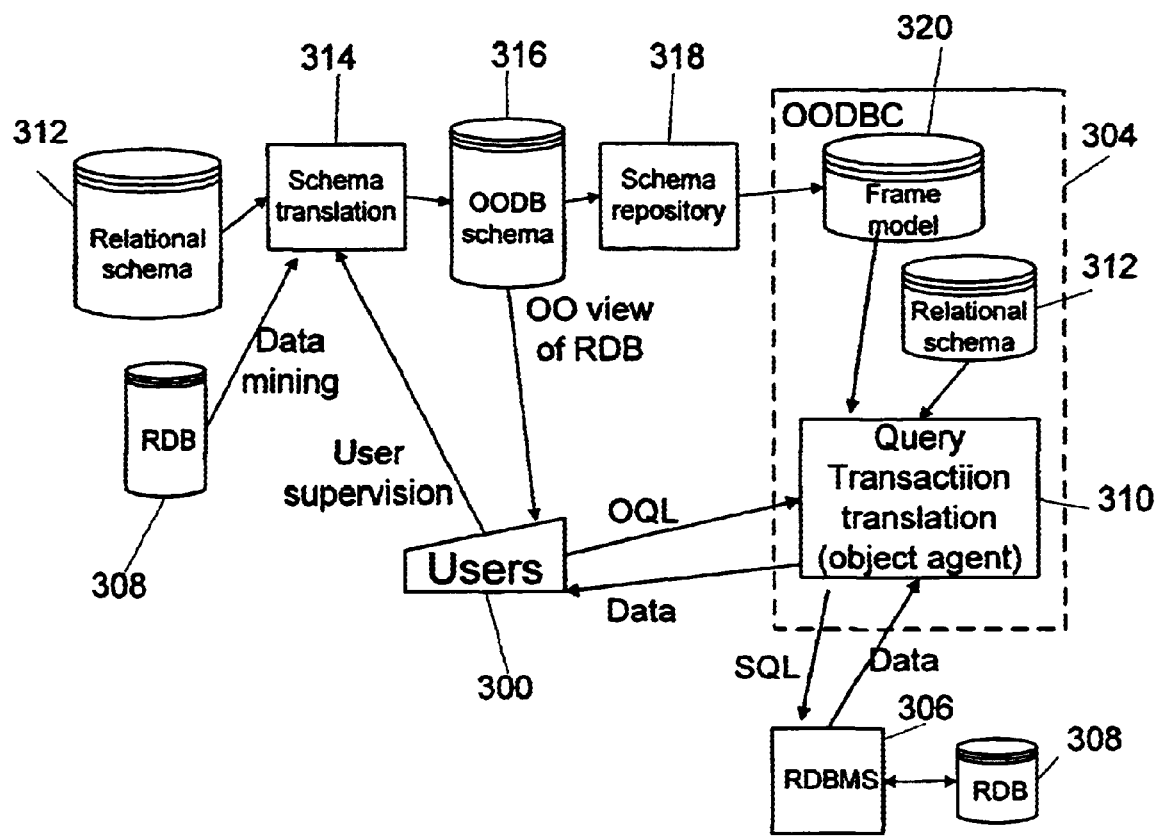
Figure 32 Architecture of OODBC

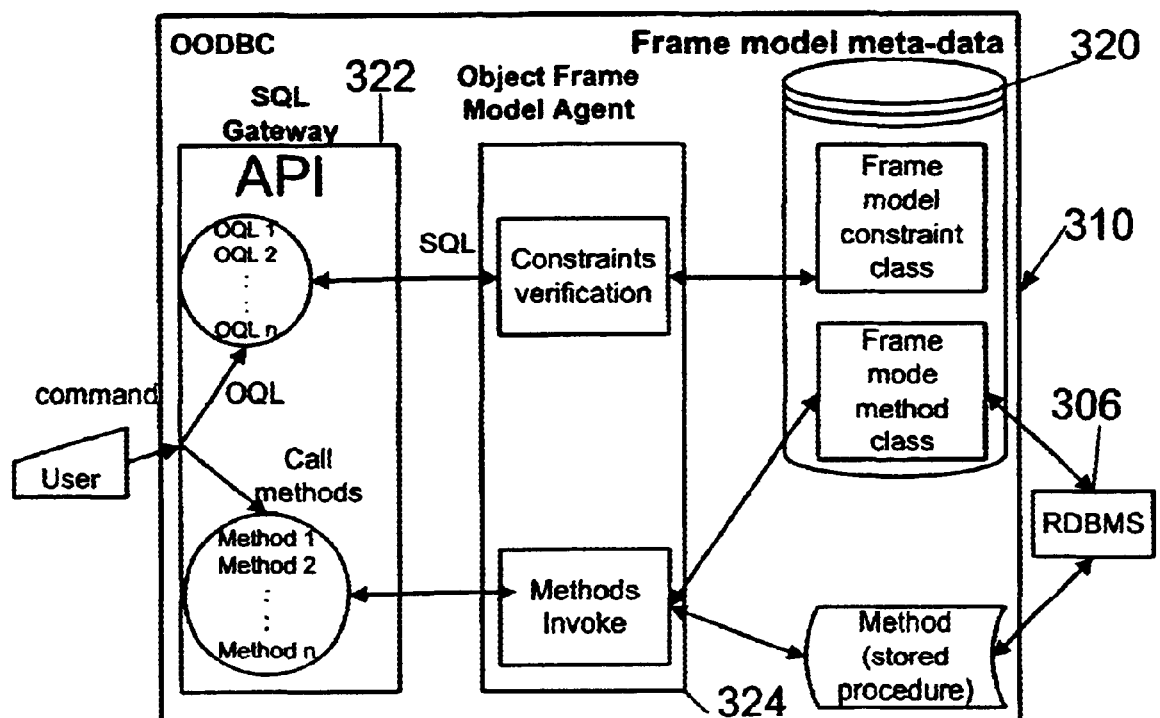
Fig 33 The architecture of OFMA (object agent)

Begin If DML perform data modification
    Then begin    Query constraint definition for 'BEFORE' action;
                  While not at end of Constraint definition do
                  Begin  Query Constraint Method;
                          Execute Constraint Method;
                          If execution error
                          Then return with error;
                End;
                Execute DML command;
                If execution error
                Then return with error;
                Query Constraint definition for 'AFTER' action;
                While not at end of Constraint definition do
                  Begin  Query Constraint Method;
                          Execute Constraint Method;
                          If execution error
                          Then return with error;
        End
    Else    Execute DML command;
                If execution error
                Then return with error
                Else return result;
End;

Fig 35 <u>DML COMMAND PROCESSING</u>

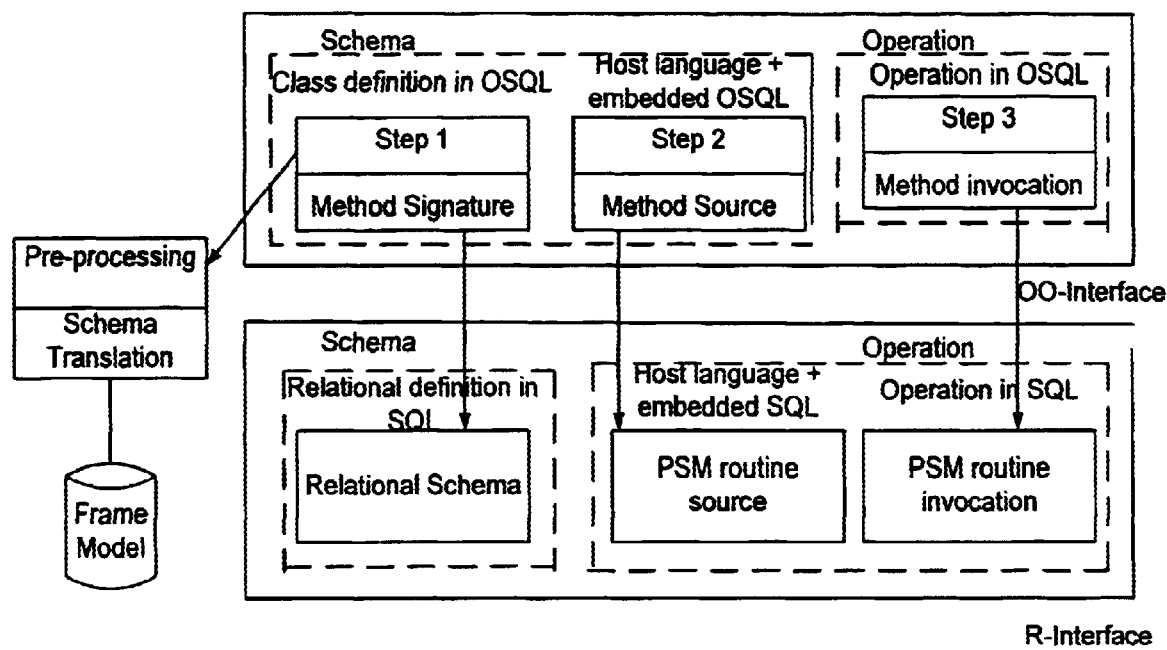
Fig 36 Mapping from object method to PSM routine

Temp Class

```
{       table_name         // table name
        child_table        // table for composite or multiple-valued attribute
        attribute_name     // actual name in RDB
        attribute_type     // relational data type
        operator           // predicate operator
        value              // new updating or predicate value
        old_value          // old updating value
        oid-value          // object-identifier for linking the multiple valued table
}
```

Fig 37 SAMPLE TEMPORARY CLASS DEFINITION

```
program schematran        // This is for reading superclass(es).
OPEN OODB schema
WHILE not at end of classes in OODB schema DO
begin
        get a class;
        IF class has superclass(es)
        THEN save class and superclass(es) in a temporary file;
end;
WHILE not at end of classes in OODB schema DO
// This is for extending inheritance and building oid field for each table
begin
        get a class;
        save the class into a table and header class of frame model;
        insert attribute oid value into the table;
        // the superclasses must be in front of the subclasses on the list of OODB schema
        //so their attributes will be read before their subclasses.
        IF the table has superclass
        THEN begin
                Get superclass's attributes and methods; subclasses
                save attributes to relational schema and the attribute class of frame model;
                // signature to frame model
                save methods into the method class of frame model;
                end;
        save own class attributes to RDB table and attribute class of frame model;
        // signature to frame model
        save own method to method class of frame model;
end;
<continued>
```

Fig 38a        SCHEMA TRANSLATION ALOGORITHM

```
//This is for reorganizing attributes and atomizing aggregate attributes
OPEN RDB schema
WHILE not at end of tables in RDB schema DO
Begin
        Get an attribute;
        IF attribute = multiple-valued
        THEN begin
                Map OODB type to RDB type;  // change data type
                Copy oid attribute and multiple-valued attribute to a new table;
                Save the new table to the header class of frame model;
                Save the attributes of new table to the attribute class of frame model;
        End;
        If data type of attribute = OID              // this is a user-defined data type
        Then begin
                Map OODB type to RDB type;      // change data type
                Copy oid attribute into foreign key of an association table;
        End;
End;
```

Fig 38b

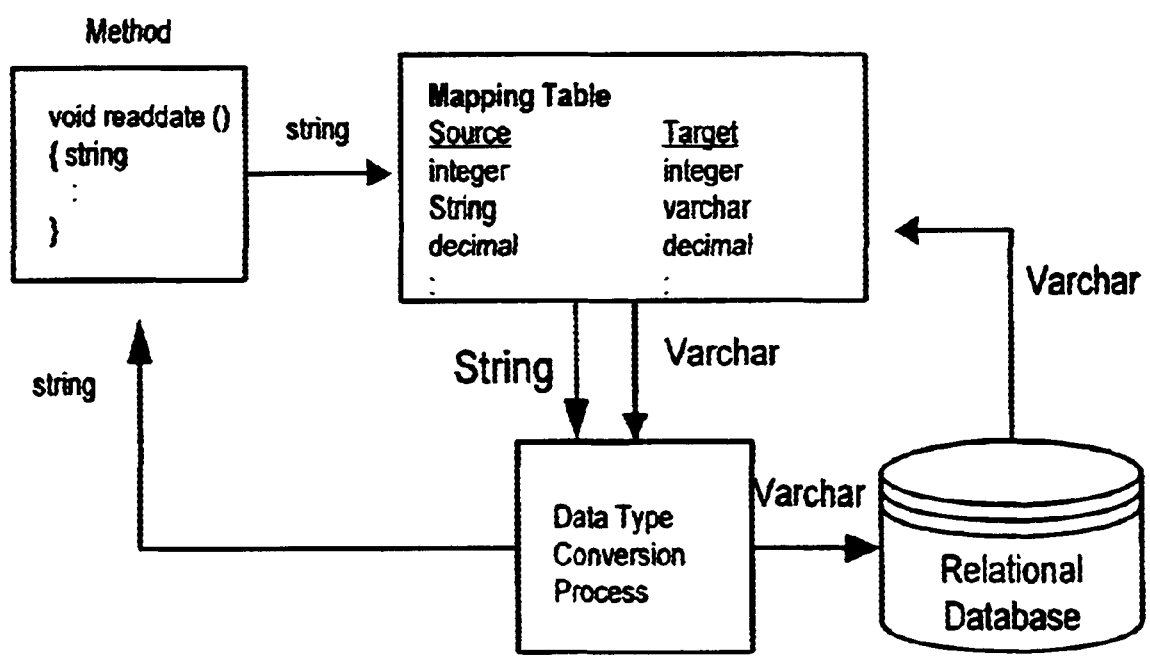
Fig 39 Mapping data types program findpathelement  //for decomposing the path expression of an OSQL statement
WHILE not at end of comparison operator's elements DO  //operators in "where-clause"
Begin                //map transaction's attributes into frame model and temporary file
  get elements from operator; // left or right side
  get components of each element;
    map components to attribute class of frame model; //collect all tables into frame model
    save table and sub-ordinate tables to temporary file;
    get data type from attribute class of frame model;
  CASE data type of
    "preliminary data type" :    save attribute to temporary file;
    "method parameter" :        save the name of action attribute to temporary file;
  END-CASE;
end;

Fig 40 DECOMPOSE PATH EXPRESSION OF AN OSQL STATEMENT

```
program findsetelement   // This is for decomposing the set operand.of OSQL statement
WHILE not at end of comparison operator's elements DO  //operator in "where-clause"
  Begin                    //map transaction's attribute's into frame model and temporary file
    get elements from operator;       // left and right side
    get components of each element;
    map components to attribute classes of frame model;  //collect all tables into frame model
    get data type from attribute class of frame model;
    IF attribute data type = table    // i.e. set attribute by verifying against data type in temp file
    THEN begin
        save table and sub-tables from attribute class of frame model to temporary file;
        get attribute from attribute class of frame model;
        IF attribute type = preliminary data type   //new multiple-value table
        THEN save attribute to temporary file;   // attribute from new table
            end;
end;
```

Fig 41  ALGORITHM FOR THE PATH LOGIC OF THE SET ATTRIBUTE program querytrans    // This is for translating OSQL query stmt to SQL query stmt.
WHILE not at end of attribute list DO //for "select-" clause
begin
    CASE attribute of
"preliminary data type" : begin
        save table from attribute class of frame model to temporary file;
        save attribute from attribute class of frame model to temporary file;
    end;
"multiple value" : begin
        map components of element to attribute class of frame model;
        save table & sub-table from attribute class of frame model to temporary file;
        save attribute from attribute class of frame model to temporary file;
        IF attribute type = preliminary type //i.e. new multiple-valued table
        THEN save attribute to temporary file; //i.e. attribute from new table
    end;
"composite value": begin
        map path elements to attribute class of frame model;   //collect all tables
        save table & sub-tables to temporary file;
        get data type from attribute class of frame model;
        CASE data type of
            'preliminary data type': save attribute name to temporary file
                'method parameter': save the name of action attribute to temporary file
    END-CASE;
end;
<continued>

Fig 42a    TRANSLATE OSQL QUERY STATEMENT TO SQL QUERY

Get attribute names from temporary file;
Put attribute names into SQL;           //in "select" clause
Get table names from temporary file;
Put tables names into SQL;              //in "from" clause
WHILE not at end of operator's elements DO    // for "where" clause
begin
    save operator to temporary file;
    get element from operator;       //left or right side
    get components of element;
    map components to attribute class of frame model;
    IF data type = multiple value
    THEN begin
        Save table & sub-table from attribute class of frame model to temporary file;
        Get attribute from attribute class of frame model to temporary file;
        IF attribute type = preliminary data type;   //i.e. new multiple value table
        THEN save attribute to temporary file;       //i.e. attribute from new table
    End;
    ELSE IF data type = path expression
        THEN begin
            save table from sub-tables to temporary file;
            get data type from attribute class of frame model;
        CASE data type of
          'preliminary data type': save attribute name to temporary file
          'method parameter': save the name of action attribute to temporary file
        END-CASE;
    End
<continued>

Fig 42b

```
ELSE IF data type = preliminary data type
THEN begin
        save table from attribute class of frame model to temporary file;
        save attribute from attribute class of frame model to temporary file;
    end;
ELSE
        Save value to temporary file;
        Get left element, operator, and right element from temporary file;
        Put left element, operator, and right element into SQL; //in "where" clause
End;
```

Fig 42c program updatetrans  // This is for translating OSQL update statement to SQL update statement
WHILE not at end of operator's element DO     //for "set" clause"
begin
      save operator to temporary file;
      get elements from operator;     //left or right side
      get components to element;
  IF data type = multiple value
  THEN begin
      Save table & sub-table from attribute class of frame model to temporary file;
      Get attribute from attribute class of frame model to temporary file;
      IF attribute type = preliminary data type     //i.e. new multiple value table
      THEN save attribute to temporary file;     //i.e. attribute from new table
  End
  ELSE IF data type = path expression
      THEN begin
          Map path elements to attribute class of frame model;
          Save table and sub-tables to temporary file;
          Get data type from attribute class of frame model;
          CASE data type of
              'preliminary data type': save attribute name to temporary file
              'method parameter': save the name of action attribute to temporary file
      EMD-CASE;
End;
<continued>

Fig 43a    TRANSLATE OSQL UPDATE STATEMENT TO SQL UPDATE STATEMENT

ELSE IF data type = preliminary data type

THEN begin save table from attribute class of frame model to temporary file;

save attribute from attribute class of frame model to temporary file;

end;

get new value from OSQL              // can be a multiple-value attribute get oid_value and old_value from RDB table;

save oid_value to temporary file;

save the new value and old_value to temporary file;

end;

WHILE not at end of logical operator's elements DO          // for "where-clause"

begin save operator to temporary file;

get components of element;

map components to attribute class of frame model;

IF data type = multiple value

THEN begin save table and sub-table from attribute class of frame model to temporary file;

get attribute from attribute class of frame model to temporary file;

IF attribute type = preliminary data type   //i.e. new multiple value table

THEN save attribute to temporary file   //i.e. attribute from new table

End

```
ELSE IF data type = path expression
THEN begin
        Save table and sub-tables to temporary file;
        Get data type from attribute class of frame model;
        CASE data type of
                'preliminary data type': save attribute name to temporary file
                'method parameter': save the name of action attribute to temporary file
        END-CASE;
End
ELSE IF data type = preliminary data type
THEN begin
        Save table from attribute class of frame model to temporary file;
        Save attribute from attribute class of frame model to temporary file;
End
ELSE
        Save value to temporary file;
End;
WHILE not at end value of temporary file DO
Begin
        Get table list from temporary file;          //in "update" clause
        Get table list into SQL;
        Get attribute and value from temporary file;
        Put attribute and value into SQL;            //in "set" clause
        Get predicate from temporary file;
        Put predicate into SQL;                      //in "where" clause
End;
```

Fig 43c

Program dataconvert
Begin
        Get mapping table;
        Map source data type to target data type;
        Get value from database;
        Map target data type to source data type;
        Copy the value to source;
        Copy the source value to program;
end

Fig 44      DATA TYPE TRANSLATION

```
Program takeaction    // This is for translating the invocation from method to routine
Begin
        CASE class of
                'name 1 in header class of frame model':
                        IF method and parameters are located in the method class of frame model
                        THEN copy action and parameters attributes to temporary file;
                'name 2 in header class of frame model':
                        IF method and parameters are located in the method class of frame model
                        THEN copy action and parameters attributes to temporary file;
        END-CASE
end
```

Fig 45    TRANSLATION OF INVOCATION FROM METHOD TO ROUTINE

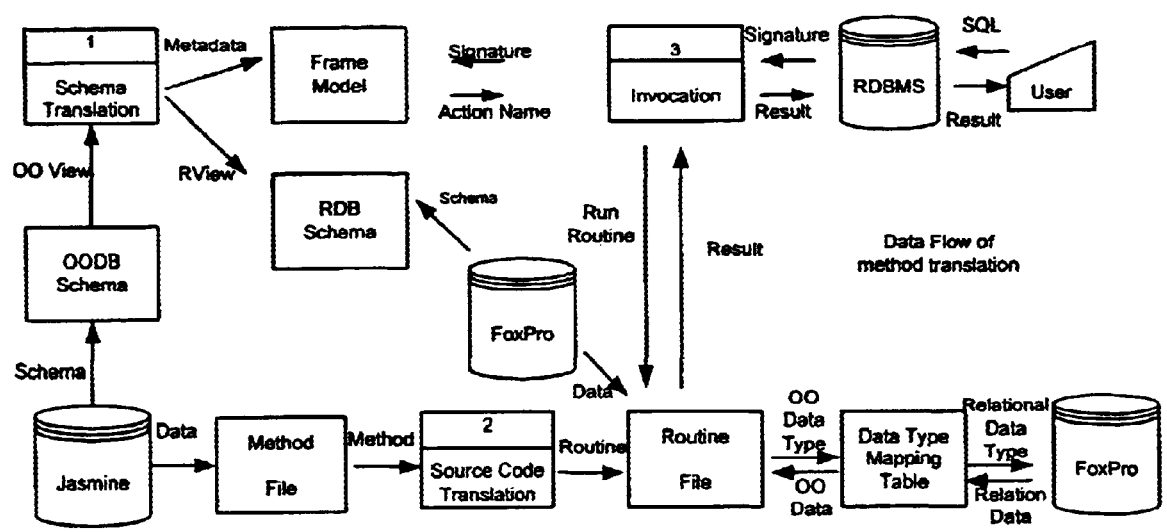
Fig 46 Data Flow of method translation

Source signature
defineClass staff
{     instance :
          String  firstname;
          String  surname;

Void    findsurname (String name);
};

Frame (Target signature)

| method_name | class | parameters | method_type | action |
|---|---|---|---|---|
| findsurname | staff | varchar | void | staff_findsurname |

Fig 47a The source signature is translated to the frame as a target signature

Source Jasmine method
Void findsurname (String name)
{       $string s <sval,sstat>;
        $staff p;
        $p = staff from staff where staff.firstname == name;
        $s = p.surname;
        if (sstat == ODB_STATNIL)
        {       printf ("Surname is NIL"); }
        else
        {       printf ("Surname is %s", sval); } }

Translated target FoxPro routine
procedure staff_findsurname
parameters name
string sval, sstat
s = char(30)
use p                   && a predefined image table for staff table
select * into p from staff where firstname = name
s = p->surname
sval = s        && non-volatile data
if (sstat == ODB_STATNIL)
{       printf ("Surname is NIL"); }
else
{       printf ("Surname is %s", sval); }

Fig 47b The next step is to translate the source Jasmine method to target FoxPro routine

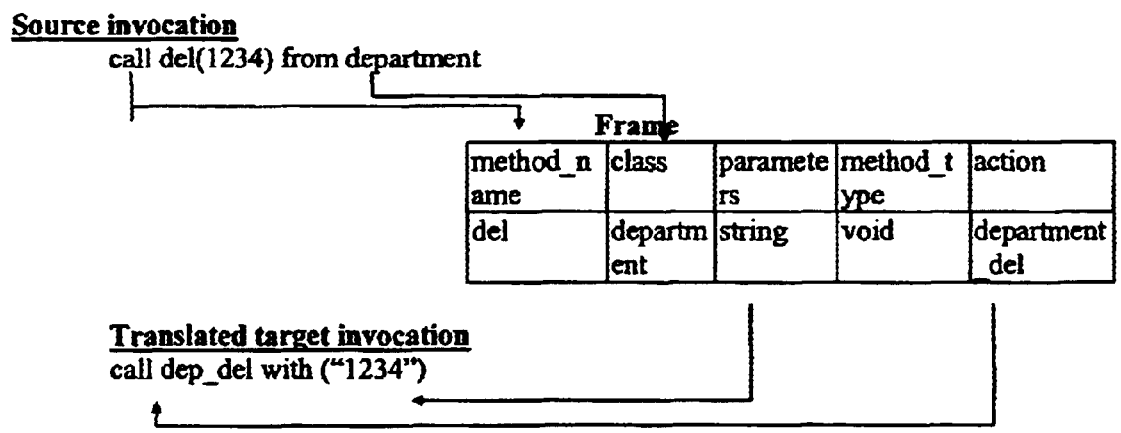
Fig 47c The third step is invocation translation
Fig 47 An example of a OODB method source to RDB routine target translation.

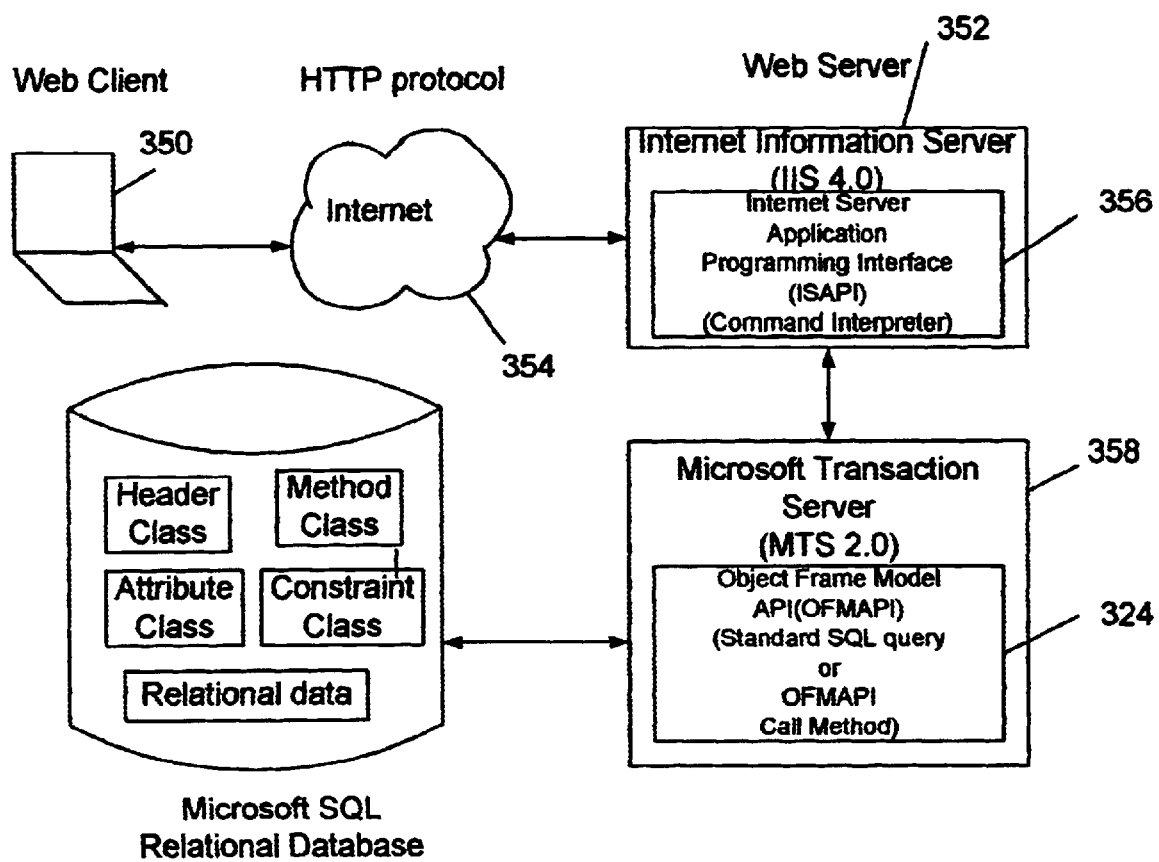
Figure 48 Frame Model database data flow diagram through Internet

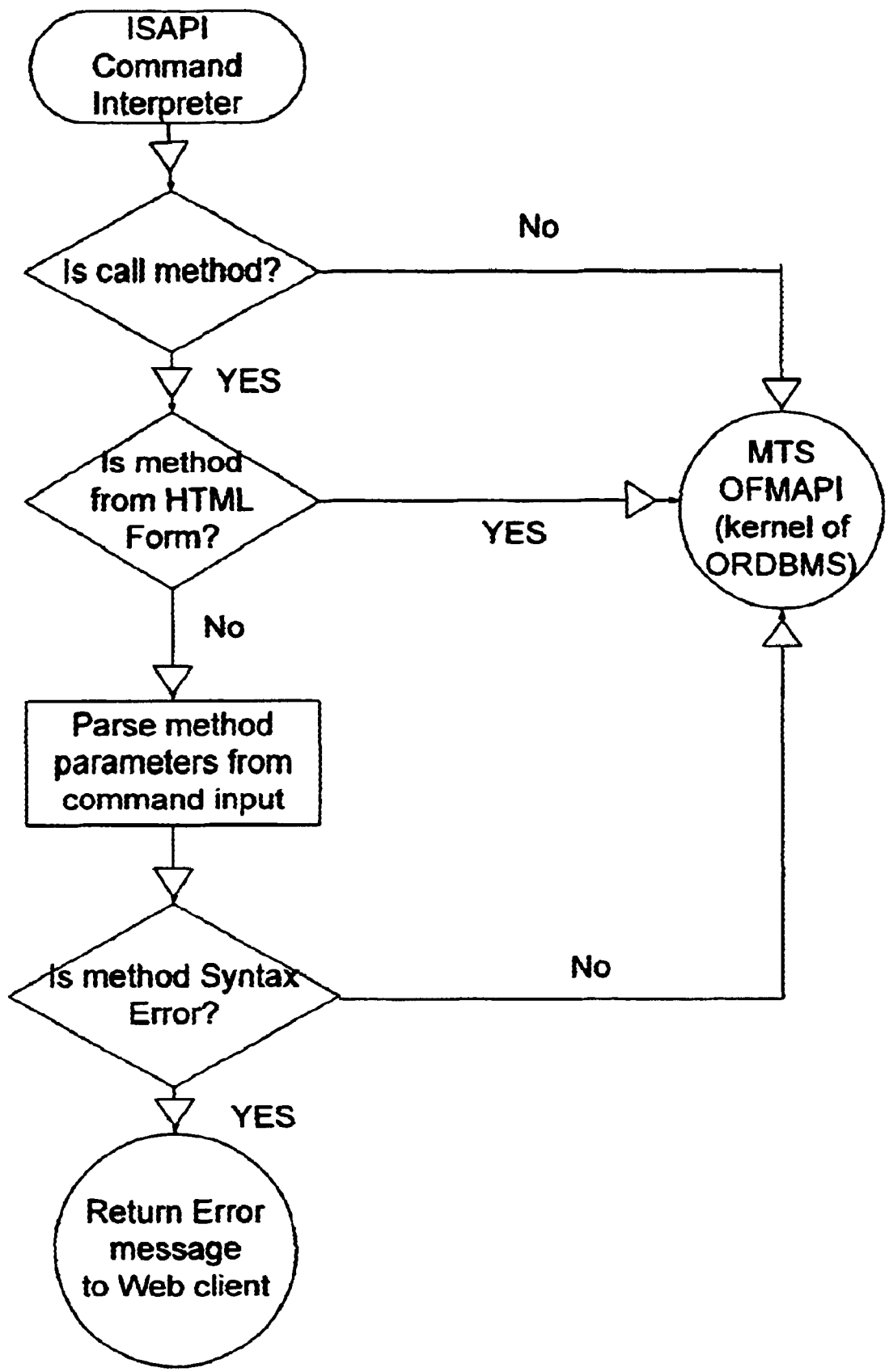
Fig 49 Command Interpreter

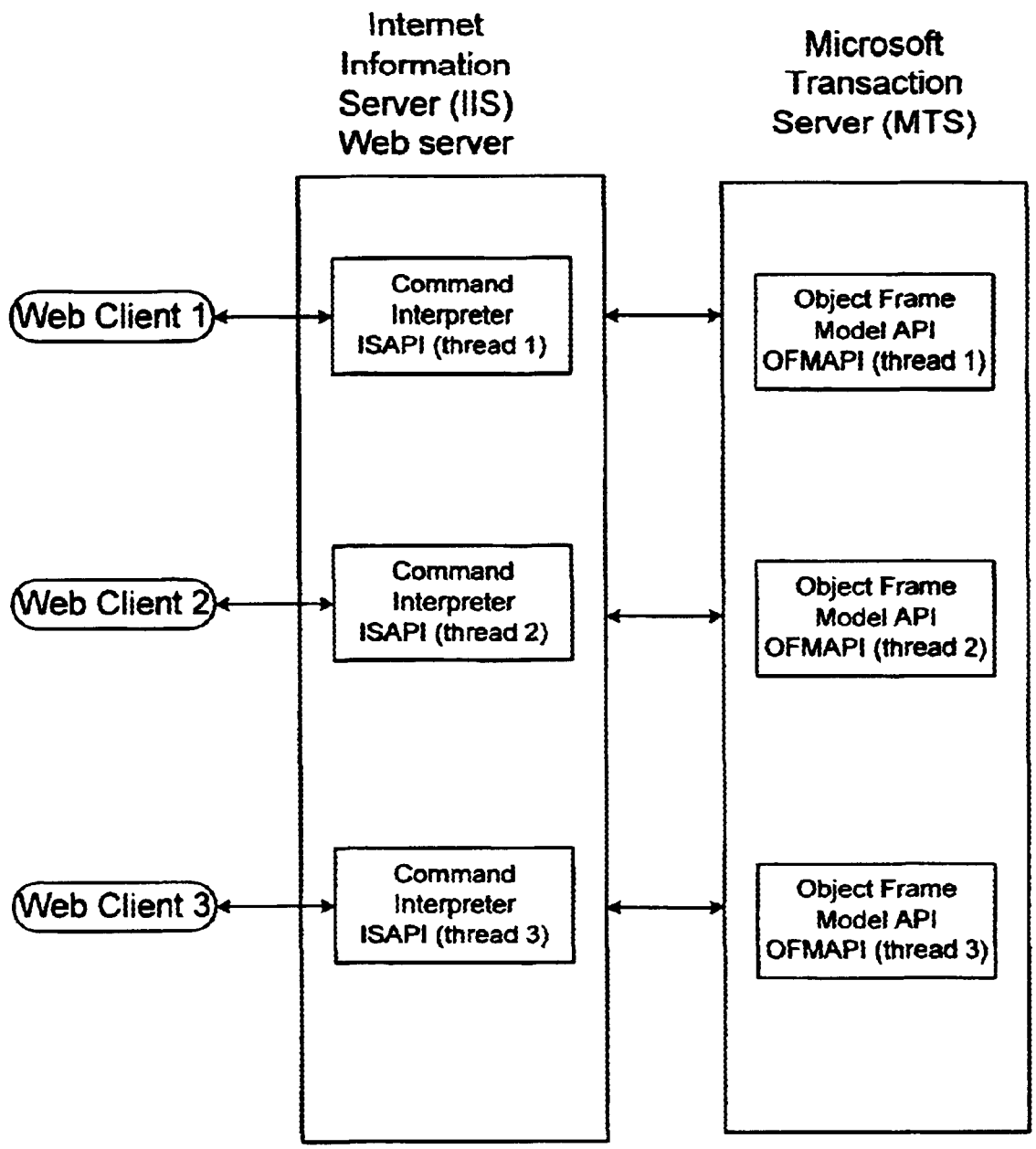
Fig 50 Architecture of Frame Model database access through Internet

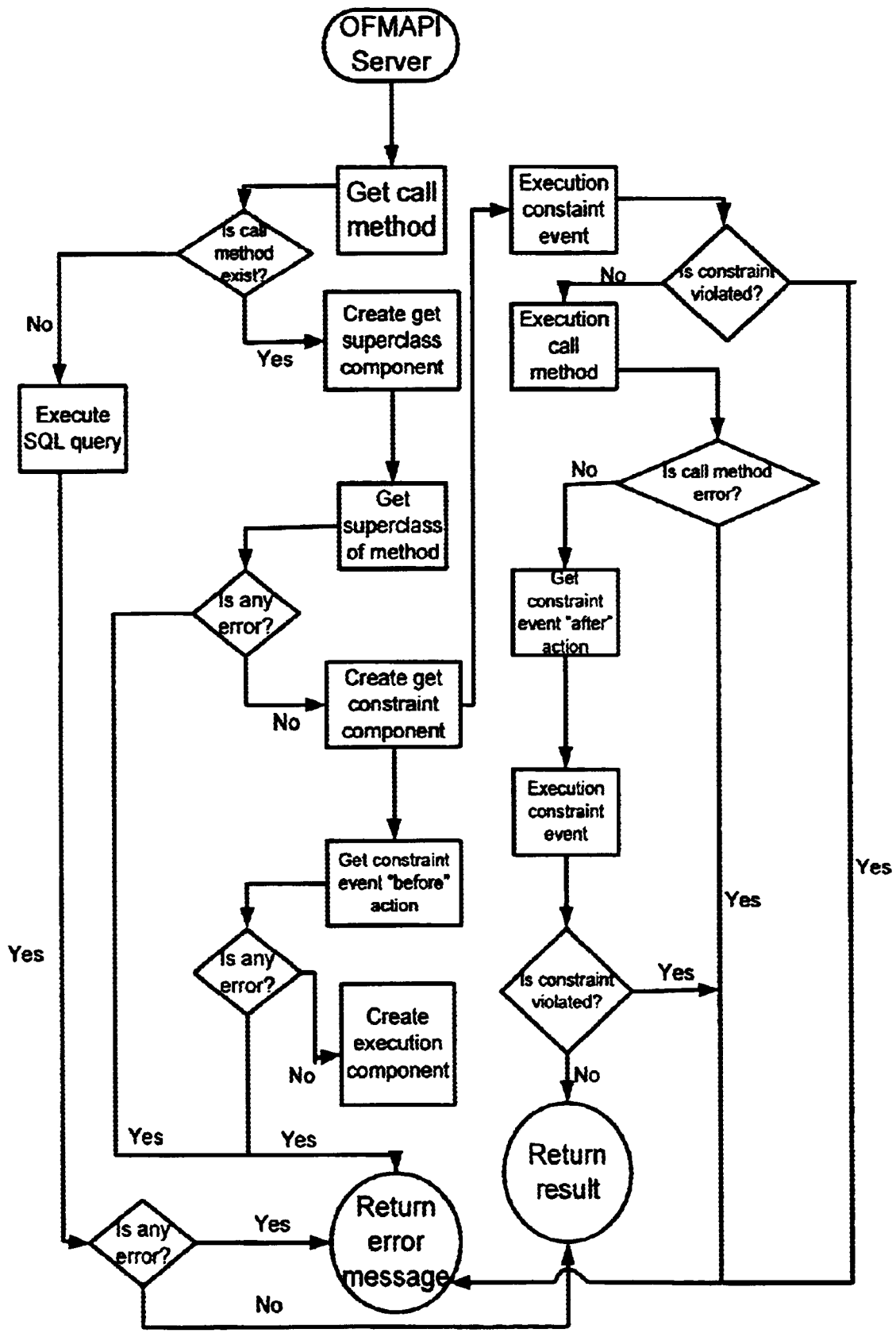
Fig 51 Program Flow of Object Frame Model API (OEMAPI)

METHOD AND SYSTEM FOR PROVIDING INTERNET-BASED DATABASE INTEROPERABILITY USING A FRAME MODEL FOR UNIVERSAL DATABASE

STATEMENT OF RELATED APPLICATIONS

This application is a continuation-in-part of U.S. patent application Ser. No. 09/268,987, filed on Mar. 16, 1999 and entitled "Frame Model For Universal Database in Database Reengineering And Integration."

FIELD OF INVENTION

The present invention is related to database structure and conversion. More specifically, the present invention is related to a method and system which utilizes a universal frame model database schema and a method and system for translating the structure, contents, and functionality of legacy databases into the frame model to provide interoperability between various databases and, in particular, relational databases and object-oriented databases.

BACKGROUND OF THE INVENTION

Over the last two decades, various database systems have been developed utilizing three predominant data models: hierarchical, network and relational. As the performance of Relational Database ("RDB") systems improved, companies have abandoned older technology in favor of applications based on RDB. This shift results in the need to convert a companies' older "legacy" hierarchical or network databases to a form usable by a RDB. The basic process utilized for this database reengineering consists of three major steps: schema translation, data conversion, and program translation.

Schema translation from one data model to another involves the transformation of the database structure and preservation of the data semantics. There are various levels of schema translation. A direct schema translation is a translation from one schema to another. An indirect schema translation is a two-step process where the source schema is translated to a conceptual schema, which is then translated into a target schema. The conceptual schema is designed with richer semantics than the source schema so that the semantics of the source schema can be recovered in the indirect translation without loss of information. However, user supervision is required to recapture the original database design because many semantics are lost from the source schema during the mapping into the conceptual schema. To assist users in the recovery of the missing semantics, data querying is used to recapture the original conceptual schema design.

Data conversion involves converting the actual data stored in the legacy database into a new database according to the translated target schema. The primary goal for a data conversion system is complete process automation. However, problems arise when the semantics of the source database are not fully recovered. User supervision is then required and the data conversion must be deferred until after the schema translation is complete.

Finally, in program translation, the functions performed by the source database program are converted into forms recognized by the target database program. There are inherent problems in converting legacy database program functionality because the original application requirements may not match those of the new application. Methods exist to recapture the programs intention manually and many indirect solutions which provide a relational database interface to hierarchical databases ("HDB") and network databases ("NDB") have been proposed. However, they are expensive to maintain and require the interface to co-exist with the HDB and NDB database management systems.

As databases proliferate companies, heterogeneous database system become common and even necessary. However, conventional processes for reengineering legacy databases into new database technologies are also risky and time consuming. In addition, due to the implied constraints of the various data models, it is difficult for organizations to support and manage heterogeneous database systems.

Further, in order to meet users' requirements, various data models must be supported by a single platform. Often, companies strive to utilize proprietary database gateways to facilitate connectivity among different database management systems. However, these gateways require complex programming for passing data from one platform to another because there is no single system architecture. However, implementing a proprietary database gateway solution in a heterogeneous database system requires the use of n(n−1) different gateways to connect n different database management systems. A substantial improvement would be achieved through the use of an open database gateway such that only n database gateways would be needed to provide interoperability between n database management systems in a heterogeneous database system.

An additional problem with current efforts to integrate and utilize various legacy databases is the lack of a global view of all the data that is being managed by the organization. Such a global schema should support the coexistence and integration of the various legacy database systems of an organization into an integrated decision support system. In particular, and as discussed, the relational database has been accepted as an industry standard. More recently, however, the object-oriented database model is being recognized as the successor to the relational database structure because of its improved ability to manage inheritance, encapsulation and polymorphism. As various databases proliferate within companies and organizations, it is thus increasingly common to be faced with a heterogeneous database systems while wanting to access the various database models using the most current and powerful techniques.

The problem of interoperability between database management system is increased by the tendency of companies to rely upon prior legacy database systems in which the database and the data applications are tightly coupled. This makes the process of migration or reengineering difficult. As the object oriented database model is increasingly recognized as the successor to the relational database systems, it is important to provide a method and system to provide interoperability between relational and object oriented database system.

The importance of providing object oriented database interoperability is further magnified by the increasing use of database-driven Internet applications. In many systems, rich data resources are available in relational database models. However, database via the Internet is more often driven using object-oriented SQL or similar object-oriented access tools. It would therefore be advantageous to provide a system and method to access a relational database in a manner which makes the database appear to the user to be object-oriented database model, thus permitting the use of object-oriented functions, such as processing of object-oriented SQL queries to the relational database.

SUMMARY OF THE INVENTION

These and other objects are achieved by utilizing a new universal database architecture for heterogeneous database systems. The architecture utilizes a frame model relational database system as a kernel system to store the underlying structure of legacy databases, i.e., the static data and dynamic data behavior of hierarchical, network and relational databases. The schema stored in the frame model can be translated into a target frame model database, such as a relational database. The legacy data programs and data can then be translated and transferred into the frame model relational database to provide a frame model universal database system that embodies the structure, data, and functionality of the legacy database. In addition, the frame models from several legacy databases can be merged to produce an integrated universal frame model database.

The frame model schema includes of four classes of meta data: the static classes of header and attribute, and the active classes of method, and constraint. Static classes represent the factual data entities of a database structure while active classes represent the rule entities. An active class is event driven, obtaining data from the database when invoked by a certain event. The static class stores data in its own database. The classes are arranged in relational tables using the same general structure and are managed by a relational database system. Combining these two types of objects within an inheritance based hierarchy structure enables the frame model to represent heterogeneous knowledge in a manner which makes it very suitable for use as a target schema during legacy database reengineering and integration.

According to a further aspect of the invention, a system and method for reengineering the schema, data, and programs of legacy databases into the frame model database system is provided. In the reengineering process, the primitive semantics of legacy databases, followed by the advanced semantics, are captured and mapped into the frame model. Data querying can be applied to extract hidden semantics from relational databases by examining the data instances in the database.

After the semantics of the legacy database programs are mapped into the frame model, the data from the legacy databases is transferred into the frame model. Data conversion is preferably performed by unloading the legacy databases into sequential files and then reloading the data into the frame model in an appropriate manner.

Finally, legacy procedural programs are translated into an SQL database program frame embedded in the frame model relational database system through emulation. According to the method, the record pointers of the program work area in the legacy database programs are replaced by declared relation cursors of embedded SQL statements. Program translation is implemented through Data Manipulation Language ("DML") substitution. Each legacy database DML statement is translated into corresponding embedded-SQL cursor on one-to-one basis. As a result, the legacy database program functionality are converted into embedded-SQL database programs, and can inter-operate with each other. Because the preferred frame model database engine is a relational database management system ("RDBMS"), the frame model database can utilize the translated embedded-SQL database programs.

Thus, the data of the heterogeneous databases is converted to RDB according to the frame model, which consists of the frame model schema, the frame model RDB and the frame model RDBMS, to thereby provide a universal database that allows users inter-operate the various legacy databases. Using data querying, the frame model schemas are integrated into a global frame model schema which provides a global conceptual view for heterogeneous database management systems for data warehousing. The result is a universal database architecture which allows heterogeneous databases inter-operate with each other. The architecture is an "open" database system which captures both the static and dynamic behavior of various data models.

According to a further aspect of the invention, the frame model database, or another model providing similar interoperability, is used by an object-relational database gateway in frame model is provided to support interoperability between relational databases and object oriented databases. This interoperability is entitled Open Object DataBase Connectivity ("OODBC"). In a preferred embodiment, it is implemented as an application program interface on top of the relational database and allows users to apply object-oriented functions on a relational database. The API provides an object-oriented interface to a relational database management system and thus transforms the relational database system into a more powerful and flexible "object relational" database management system. Among the various added object-oriented features are object identity, encapsulation, inheritance, polymorphism, set values, complex object and overloading functions.

The architecture of the OODBC model comprises an object-oriented schema and frame model meta-data. The frame model meta data adds data operations to the underlying relational database management system. The frame model includes the four classes of header, attribute, method and constraint, and it captures both the static data and the dynamic data behavior of the heterogeneous RDB system. Users can invoke Object Structural Query Language for database interoperability. Access by users to various relational databases is facilitated by the use of a database gateway inside the OODBC which translate the object oriented SQL into a structural query language suitable for accessing the relational database.

A method is disclosed for translating from object oriented database methods to relational database routines as part of the OODBC processing. This method includes mapping of method signature, method source language, and method invocation into persistent stored modules. It also provides for function procedural routine and routine invocation. Through use of this method, object oriented database methods can be translated into relational database routines which can subsequently be executed in the relational database environment.

The relational database model has been widely used in database servers which provide services to Web clients via the Internet. Access to these relational databases is generally provided through SQL. However, SQL and the relational database only support simple data types which are insufficient for many present applications. The object-relational database management system of the invention advantageously addresses this issue by allowing use of existing relational database management systems while also supporting the use of more powerful object oriented concepts and features in Internet database applications.

Advantageously, an object oriented database user can write an object-oriented SQL transaction to access a relational database as if it were an object oriented database and the necessary translations provided by the object-oriented API. Thus, companies using relational database on technology can add new applications using object-oriented techniques. Technologies via OODBC and increase productivity. Other applications using the present inventive methods are available in the area data mining in addition since use of the OODBC can improve the flexibility of data extraction from relational databases through the use of add-on object-oriented features.

BRIEF DESCRIPTION OF THE DRAWINGS

The foregoing and other features of the present invention will be more readily apparent from the following detailed description and drawings of illustrative embodiments of the invention in which:

FIGS. 1a and 1b illustrate respectively the conceptual and logical frame model schema for the universal frame model of the invention;

FIG. 2 shows the architecture and method of creation of a universal database from a legacy database, including the frame model of FIG. 1b, and a method of conversion;

FIG. 3 shows the architecture and method of creation of a global frame model database from legacy databases;

FIGS. 4a–c, 5a–c, 6a–f, 7a–c, 8a–c, 9a–c, 10a–c and 11a–b are illustrations of various schema relationships for legacy databases a mapping of these relationships to a conceptual and logical frame model along with pseudo code illustrating implementations of the mapping from a legacy database to a frame model schema;

FIGS. 12a–12c show a flow model and pseudo code for converting data from a legacy database into a frame model database;

FIGS. 13a–13d illustrate the conversion of a sample hierarchical database into a relational database according to the invention;

FIG. 13e is a graphical illustration of the emulation of HDB embedded DL/1 database segments as embedded-SQL cursors in an RDB;

FIGS. 13f–13i contain pseudo code algorithms for extracting the appropriate segment from an HDB or record from an NDB and for creating a corresponding embedded SQL cursor for the Project, Insert, Delete, and Update DML operations, respectively.

FIGS. 14a–14d illustrate the conversion of a sample network database into a relational database according to the invention and provide associated pseudo code;

FIGS. 15a–b, 16a–d, 17a–b, 18a–b, 19a–b and 20a–b illustrate the resolution of various semantical conflicts to integrate the frame models into a universal frame model along with associated pseudo code;

FIGS. 21a–b, 22a–c, 23a–b, 24a–b, 25a–b, and 26a–c illustrate the merging of classes from frame model schemas in integrating the frame models into a universal frame model and provide associated pseudo code;

FIGS. 27a–b and 28a–b illustrate the merging of relationships to integrate frame model schemas into a universal frame model;

FIGS. 29a–b illustrate the architecture and data flow of a frame model application program interface;

FIG. 30 is a flow chart of the execution of an SQL command by the interface of FIGS. 29a–29b;

FIG. 31 is an illustration showing the interoperability of various relational databases via OODBC;

FIG. 32 is a more detailed illustration of the architecture and construction of the OODBC;

FIG. 33 is an illustration of the OFMA object agent architecture;

FIG. 35 contains pseudo code illustrating one technique of passing DML commands to the DML interpreter;

FIG. 36 is a flow diagram illustrating the mapping of an object method to a PSM routine;

FIG. 37 shows a sample temporary class definition;

FIGS. 38a and 38b contain pseudo-code for a method of database signature translation;

FIG. 39 is generalized flow diagram illustrating the mapping of data types;

FIG. 40 contains pseudo code of an algorithm to decompose a path expression of an OSQL statement;

FIG. 41 contains pseudo code illustrating a method for decomposing the set operand of an object-oriented SQL statement;

FIGS. 42a–42c contain pseudo code of a method for translating an OSQL query statement into an SQL query statement;

FIGS. 43a–43c contain pseudo code of a method of translating the update transaction;

FIG. 44 contains pseudo code for a method for translating data types;

FIG. 45 contains pseudo code illustrating an algorithm for translating of the invocation from a method to a routine;

FIG. 46 illustrates the overall data flow of method translation;

FIG. 47 shows a before-and-after illustration of a sample object-oriented method translated into a target relational routine;

FIG. 48 is a flow diagram of an Internet-based Frame model database system;

FIG. 49 is a flowchart summarizing the operation of the Command Interpreter;

FIG. 50 is an illustration of multi-threaded database access; and

FIG. 51 shows the overall program flow of the object frame model API.

DETAILED DESCRIPTION OF THE PREFERRED EMBODIMENT(S)

According to the present invention, a frame model is developed as a universal data model for the interoperability of legacy database systems. The frame model serves as a meta-database which is used to store the structure and functionality of one or more separate legacy databases. In operation, the frame model exists as a structured data object which is stored on a computer readable medium, such as a disk drive, and is suitable for several applications, including legacy database reengineering and heterogeneous database integration. Other applications, will be apparent to one of skill in the art.

Figure 1A:
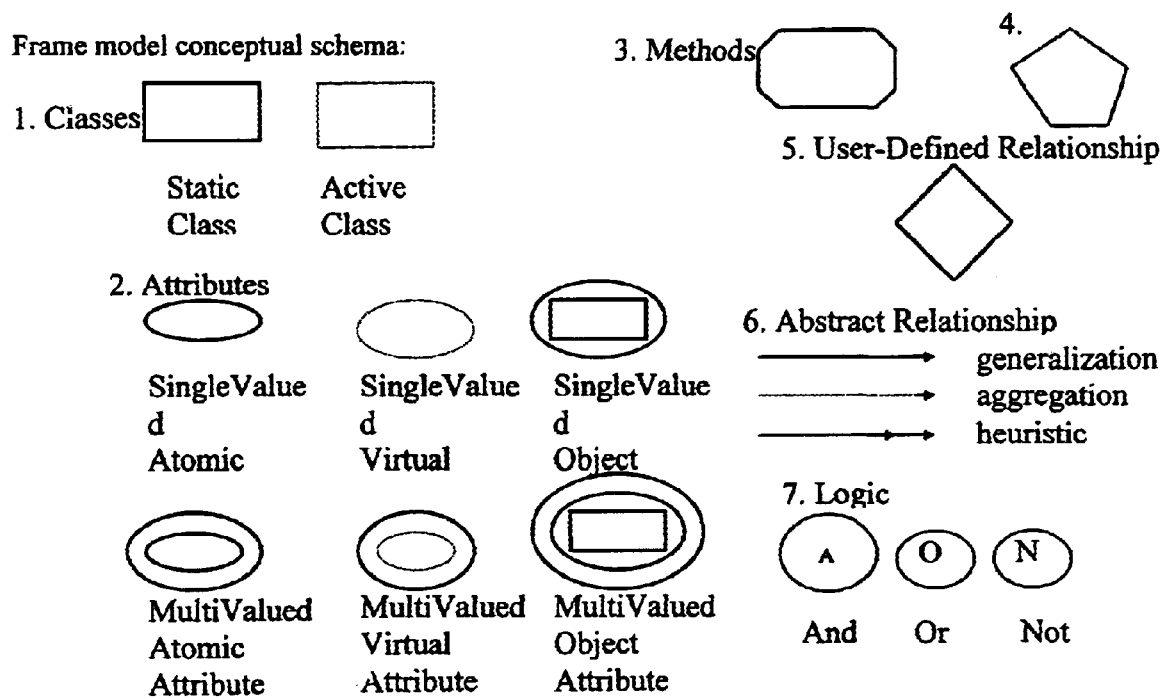

FIGS. 1a and 1b illustrate the conceptual and logical frame model schema, respectively, for the universal frame model of the invention. The conceptual schema describes the frame model in the form of visual constructs which graphically depict various aspects of the frame model. The conceptual schema has seven primary elements: (1) classes, (2) attributes, (3) methods, (4) constraints, (5) user-defined relationship, (6) abstract relationship, and (7) logic. The various elements in the schema each have one or more components which have a unique graphical form. These constructs are useful for data modeling, i.e., database design, and are used to illustrate various aspects of the frame model schema throughout the figures. Definitions for the various components of the primary elements are presented in the discussion of FIG. 1b, below.

FIG. 1b is an illustration of a frame model logical schema 10 configured in a relational database (RDB) structure.

Although the various classes and class elements are represented in RDB form, other structures for storing the logical frame model can also be used as well, as will be appreciated to those of skill in the art. For example, the frame model schema can be implemented as a set of data structures, perhaps with the use of linked lists, by means of object oriented programing techniques, etc.

The logical schema 10 is the structured implementation of the conceptual schema shown in FIG. 1a and is used to store the schema meta data. The frame model is a meta data structure with two type of classes having a common structure: static classes and active classes. Static classes represent the structure of factual data entities and include a header class 11 for storing entity definitions and an attribute class 12 for storing the attribute structure of defined entities. Active classes are used to represent the structure of rule entities and include a method class 13 and a constraint class 14. When applied within a database system, the meta-data stored in active class is translated into event driven processes which obtain data from the database when invoked by a certain event. The static classes store data elements. Combining these two types of objects within the inheritance hierarchy structure enables the frame model represent heterogeneous knowledge.

As discussed in more detail below, the frame model logical schema is used to store the structure of a legacy database schema during schema translation. Briefly, for a given database schema, the static schema semantics of class name, class key, and class attributes are mapped into the frame model Header class 11 Class_Name and Primary_key elements, while the class attributes are mapped into the frame model Attribute class 12. Cardinality semantics are mapped into the Associate_Attribute element of Attribute class 12. The isa relationship is mapped to the Parent element in the Header class 11. Other dynamic semantics of weak entity, generalization, categorization, etc., are mapped into the Constraint class 14 and Method class 13 in the frame model such that the Condition attribute and Action attribute are used to enforce constraints, and Constraint class is used to control the execution timing of the Method class.

The various elements in each of the classes are discussed below. It will be appreciated that in a given instantiation of the frame model configured to represent the schema of a legacy database, not all of the classes or class elements will be utilized. In addition, those of skill in the art will recognize that the particular data items which are stored in the logical frame model so as to represent the schema of a legacy database can be represented in various ways. Thus, while the preferred breakdown of elements in the classes is detailed below, modifications can be made without departing from the overall concept. For example, the manner in which specific constraints and methods are stored in the frame model can be varied, so long as the method and constraint information is accurately represented and can be referenced as needed.

The records in the header class structure 11 are configured to store basic frame information which represents a class entity and each preferably includes the following elements: Class_Name, Primary key, Class_Type, Parents, and Operation. The first three of these elements will be present in all frame model instantiations of a legacy database.

The Class_Name element is used for storing a class identifier which is defined by the application developer to identify a particular class of data. The name should be unique and is generally string data. The class name is used to associate other defined elements with a particular class.

The Primary_key element is used for storing the name of a key that describes unique value of an attribute as a set of one or more strings. If a single attribute is used as the primary key for the defined class, only that attribute will be contained in this element. If the class has a compound key consisting of two or more attributes, all attributes will be indicated in this element.

The Parents element is used for storing hierarchical meta data that represents the generalization/specialization relationship between the current class, identified by data stored in the Class_Name element, and its superclass. If a class defined in a record of the Header Class 11 is a subclass of one or more other superclasses, the Class_Names of the parent super classes are stored in this element. The superclasses themselves are defined in separate records of the Header Class 11, etc. If there are no parents, this element is empty. The superclasses can be represented as text strings.

The Operation element is used to store an operation which is related to procedures for operating on the entity itself, such as call to create or delete a record procedure. In particular, the Operation element contains a call to an operation constraint, defined in the Constraint Class 14, for an active class, or a method, defined in the Method Class 13, for a static class. If a method is referenced, the operation is unconditional. If a constraint is referenced, the operation is event triggered. More than one operation can be referenced. If there are no constraints on the class, this element is empty. The operation call can be stored in the form of an executable statement, a text string, or another appropriate format.

The Class_Type element is used to store data that indicates whether the class is "static", where that the defined class represents a static data instance, or "active", where the class obtains data from the database when invoked. One example of an active class is one with an operation element that calls an event-driven rule. An operation referenced by an active header classes is defined in the Constraint class 14. An operation referenced by a static header class is defined in the Method class 15. The class-type data can be stored as a boolean or binary data type.

Each record in the attribute class structure 12 represents the properties or attributes of a particular class. Each attribute for a class schema stored in the frame model is represented in a separate record in the Attribute class. An attribute composed of several basic attributes is a composite attribute. Attributes that are not divisible are atomic attributes. An attribute value can also be derived from the related attributes or objects. This type of attribute is considered to be a virtual attribute in the frame model, the result of a deductive rule or an active rule.

Records in the Attribute class structure 12 each preferably include the following elements: Class_name, Attribute_name, Attribute_type, Associate_attribute, Method_name, Default_value, Cardinality, and Description. Of these, the first three elements will be present in all frame model instantiations of a legacy database.

The Attribute_name element is used to store the name of a particular attribute, preferably as string data. Attribute names are unique within a class.

The Class_name element is used to reference a class specified in the Class_Name element of a record in the Header Class 11. The class name can be expressly stored as string data in this element. Alternatively, a pointer to the appropriate record in the Header Class 11 can be provided. The referenced class is the one which has the defined attribute.

The Method_name in the Attribute Class 11 is used to store the name of a method, preferably as string data, that is associated with the particular attribute. The method name refers to a record in the Method class 13, discussed below, which is invoked when a value for the particular attribute must be derived from the database, as opposed to being a fixed or predefined value. For example, as discussed with respect to FIG. 4b, discussed below, a patient class can have an Age attribute which represents the age of the patent. Rather than being a fixed value, the age is calculated by a method which subtracts the present date from that patient's birthday.

The Attribute_type element is used to store the data type of the respective attribute, such as integer, string, data, etc.

The Associate_attribute element is used to store data which identifies cross references (e.g., relationships) to other classes. The relationship has a particular cardinality. The Cardinality element is used to store a value indicating the cardinality of the attribute relationship to the class and can be a single or multi-valued number, such as 1, n, 1:(0,n), where 0 means minimum occurrence and n means maximum occurrence, or other cardinality designations as will be known to those of skill in the art.

For example, an instance(object) of the class "Department" can refer to many instances(objects) of class "Employee", i.e. a department may hire many employees. In this case, the Associate_attribute in the Department class is assigned the value Employee, and the Cardinality in class Department is given the value of n, to indicate that the department can have many employees. On the other hand, the Associate_attribute in class Employee is assigned the value Department, and the Cardinality in class Employee is 1, indicating that an employee can only belong to one department. In other words, the cross-referenced associated attributes and cardinality values indicate that there is a 1:n cardinality association between class Department (an object) and class Employee (another object).

The default_value field is used to store a default value for the attribute in all elements of the class and is generally a primitive data type.

Finally, a Description is a text field which can be provided to store additional descriptive information about the attribute.

A primary characteristic of the frame model according to the invention is that it provides mechanisms for structuring and sharing not only data, but also the methods that act on the data. The frame model uses this characteristic to integrate operations into its model. Records in the Method class 13 are used to store the definitions of rules that extend the semantics of the database data. In other words, the methods stored in records of the Method class 13 of the frame model are used to represent the behavior of a particular object.

Each record in the Method class 13 preferably includes a Class_name, a Method_name, and one or more additional elements which are used to store data defining the operation of the particular defined method. In the preferred embodiment, the additional elements include Parameters, Sequence_no, Method_type, Condition, Action, and next_sequence_no.

The Class_name element is used to store the name of, or a pointer to, a particular class Name in the Header Class 11 to which the method applies. The Method_name element is used to define the name by which the method is referenced in other. Both of these elements are generally string elements.

The remaining elements are used to store data defining the specific operation of the particular method. A preferred set of elements are detailed below.

The Parameters element is used to store a list of arguments for the method and is comprised of a set of field names. The value of each argument will be stored in each row (tuple) in the method class. The parameters are referred to in a defined condition or action.

The Sequence_no element is a numeric field which can be used to facilitate the execution sequence of the particular method at issue, particularly when several methods may be keyed off of the same action. Each sequence number is stored in a row. As will be apparent by its name, the Next_sequence_no element is used to indicate the sequence number of a method which will be executed after the present one completes.

The Method_type element is used to specify the data type of the method's output. When a method is executed, the returned results have the defined data type and are generally placed in temporary storage.

The Condition element contains is used to store a boolean statement, preferably in executable form, which indicate the conditions under which the action for the method is executed. The particular format depends on the details of the database system. Preferably, the statements are SQL commands or function calls.

The Action element contains the action(s) which are taken by the method provided that any supplied condition is met. The actions are preferably represented in executable form, such as SQL or a function call.

It is a primary consideration of database technology to ensure data correctness and consistency. Thus, in addition to methods, there are many properties of data that serve to additionally restrict the values of the data which can be added to a database and how the data may be related. These additional restrictions are defined within the Constraint class 14. Each record within the constraint class 14 preferably includes the elements of Class_name, Constraint_name, and Method_name, as well as one or more additional elements which define the constraint. In the disclosed preferred embodiment, the additional elements are Parameter, Ownership, Event, Sequence, and Timing.

The Class_name element stores the identity of, or a pointer to, a particular class, as discussed above. The Constraint_name element is used to store the name of a constraint at issue. The defined constraints are tied to the defined classes by references made to the constraint name in the operation element of the Header Class 11. Both of these elements are generally string type data.

The Method_name element is used to identify a method which is triggered when the constraint is called. It references a particular Method_name of the Method class and is generally a string data type. Referenced methods are used for enforcing the particular constraint.

The remaining elements are used to define the particular constraint which is imposed. A preferred set of elements are detailed below.

The Parameter element is used to store a list of arguments which are used by a referenced method. Generally, the arguments will be stored as a set of strings.

The Ownership element is used to represent the class name to which a referenced method belongs. Ownership of "self" indicates that the class referencing the method owns the method. Ownership of "system" indicates that the database system owns the method. If an external class, i.e., not the system or the referencing class, owns the method, the external class name is indicated in this element.

The Event element is used to store the name of an event which is triggered by the constraint, preferably in string format. The Sequence element is used to specify whether the defined method should be executed before, during, of after the triggering event is processed. Finally, the Timing element is used to indicate whether a method referenced by the constraint should be executed one time only or repeated if called multiple times. In this implementation, the Event, Sequence, and Timing elements must be defined as part of the constraint definition.

As will be apparent to one skilled in the art, the frame model 10 of the present invention, as described above, provides a structured meta-data object which is flexible enough to represent the schema of a wide variety of legacy databases without loss of structural complexity. Once the schema of one or more legacy databases are translated into a frame model database, the configured frame model can then be used to create a relational database which implements the schema of the legacy database. Transferring the data from the legacy database into the frame model database and converting program functions of the legacy database completes the mapping and results in a frame model relational database management system ("RDBMS") that encompasses the schema, data, and functionality of the legacy database.

According to another aspect of the invention, a universal database suitable for use in database reengineering is provided and which allows the conversion of existing hierarchical database ("HDB") and network database ("NDB") system into the open database system of the frame model.

With reference to FIG. 2, a legacy database 21 has an overall structure or schema 22, data 23, and programmed functionality 24, all managed by a legacy DBMS. Similarly, the universal frame model database system 20 includes a frame model schema 26, data stored in a frame model RDB 27, and embedded-SQL programs for the RDB. The frame model database is operated by means of a frame model RDBMS 29.

As discussed in more detail below, the database conversion from the legacy database system 21 to the universal frame model database system 20 includes schema translation, data conversion, and program translation. Data querying is utilized to recover the semantics underlying a legacy database and the recovered semantics are then mapped into frame model. The data stored in the legacy database is unloaded, i.e., into sequential files, and then reloaded into the frame model. In addition, the procedural legacy programs are translated into frame model RDB's embedded SQL database program through emulation. The record pointers of the program work area in the legacy programs are replaced by declared relation cursors of the embedded SQL statement. The program translation from the legacy to frame model is implemented using Data Manipulation Language ("DML") substitution where each legacy DML is translated into corresponding embedded-SQL cursor on one-to-one basis.

According to a further aspect of the invention, and with reference to FIG. 3, the schemas of several different, i.e., heterogeneous, legacy databases 31a–31c are translated into respective frame model schemas 32a–32c and then integrated into a Global Frame Model schema 33 using data querying. The data associated with the heterogeneous databases 34a–34c is converted to a respective frame model RDB 35a–35c according to the associated frame models 32a–32c. The global frame model schema 33 and the universal frame model databases 35a–35c are then integrated using a frame model RDBMS 36 to thereby form a universal database which permits database applications to span the individual frame model databases. The universal database provides a global conceptual view for heterogeneous DBMSs for data warehousing.

A particular inventive method of translating a legacy database schema into the novel frame model schema will now be discussed. In general, relational, hierarchical, and network legacy database schemas are translated into the frame model schema 10 by transferring their primitive semantics, including entity, isa, cardinality, and weak entity, into the various frame model classes, and then transferring advanced semantics, including generalization, categorization and aggregation, into the frame model. An explanation of the seven schema translation steps follows.

Figure 4A:
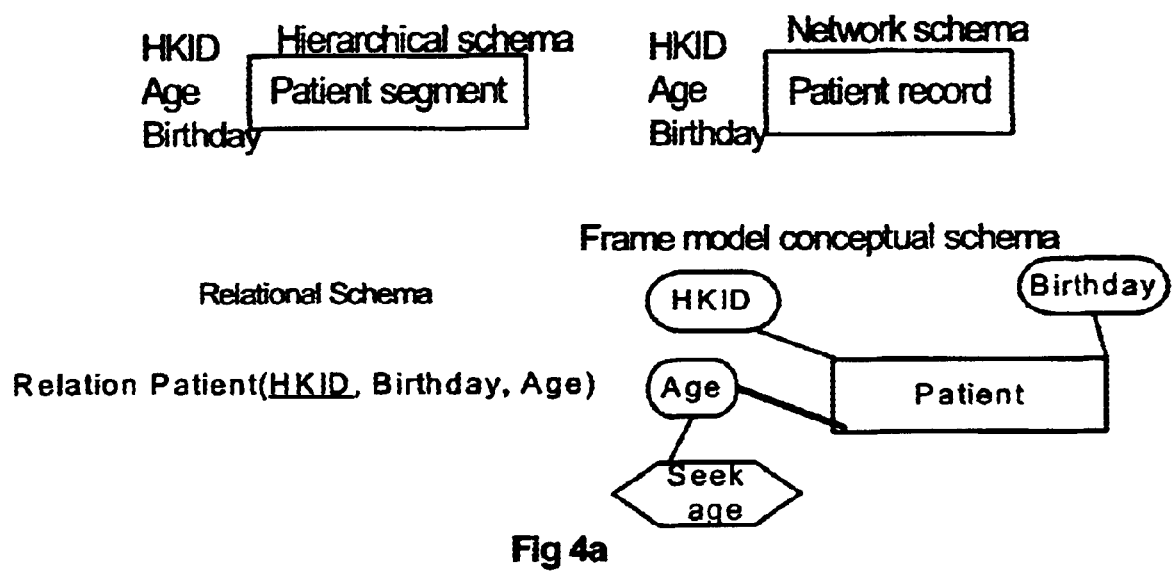

Step 1: Map Entities of Legacy Database Schema into Frame Model:

The first step in the schema translation process is to map the entities of the legacy database into the frame model 10. In this step, the keys and attributes of each segment/record/relation of the legacy HDB/NDB/RDB are mapped into a primary key and attribute of a class in frame model conceptual and logical schema 10. An entity is a collection of uniquely identified objects in a database. FIG. 4a is an illustration of entity relationships for HDB, NDB, and relational database ("RDB") systems for a sample patient entity with the attributes of HKID, Age, and Birthday and also a constrained method Seek_age.

FIG. 4b is a frame model schema 10 containing a mapping of these legacy database entities into the frame model. As shown, the entity "patient" is mapped to the Class_name field in the header class 11 with a Primary_key of "HKID". In addition, the new record Operation "Call Create_patient" is shown. Because the class is active, the Create_patient operation references a constraint.

The three attributes are mapped to separate records in the Attribute class 12 which refer to the Patient class name. The Age attribute refers to the method "Seek_Age" which is defined in the Method class 13. In addition, and as shown, the Create_Patient constraint, referenced in the header class, itself references the insert patient method.

In a mapping entities RDB, a relation with a primary key is considered an entity. The primary key and attribute of a relation in RDB schema are mapped on a one-to-one basis into primary keys and attributes of a class in frame model conceptual and logical schema. A three-step method is used. Pseudo code illustrating one implementation of these steps for an RDB legacy database is illustrated in FIG. 4c. With reference to FIG. 4c, first, the primary keys of the RDB schema are determined. (Step 1.1) Then, any compound keys are identified. (Step 1.2) Finally, any foreign keys are identified. (Step 1.3).

In a legacy RDB, the primary keys are identified by the condition where, if data of an attribute A is unique in a relation R, then attribute A is a primary key in relation R. In some instances, more than one primary key candidate will be identified. If this is the case, user supervision can be used to select which one will be the primary key for the entity.

If no primary keys are discovered, compound key are considered. If data of two attributes $A_{c1}$ $A_{c2}$ is unique in a relation R, then the attributes $(A_{c1}, A_{c2})$ form a compound key in relation R. If there is more than possible one compound key, then as when more than one primary key is identified, user supervision can be used to select which one will be the primary compound key. In addition, foreign keys are considered. If an attribute $A_{jk}$ in relation $R_j$ refers to a primary key PK(R) in relational R, then $A_{jk}$ is a Foreign Key(FK) in $R_j$ referring to PK(R) in R.

In an HDB, an entity is a segment. During translation parent segment keys are concatenated with child segment keys and mapped into a class in the frame model with primary keys mapped from the segment keys. When a segment key is not defined, a sequence number can be substituted instead. Alternatively, a user can define the key manually.

In an NDB, an entity is a record. Owner record keys into member record keys are concatenated with member record keys in the NDB and each record is mapped into a class in frame model having primary keys mapped from record keys. If a record key is not defined, a sequence number or user supplied key is used.

Step 2: Map isa Relationship of Legacy Database Schema into Frame Model.

Figure 5A:
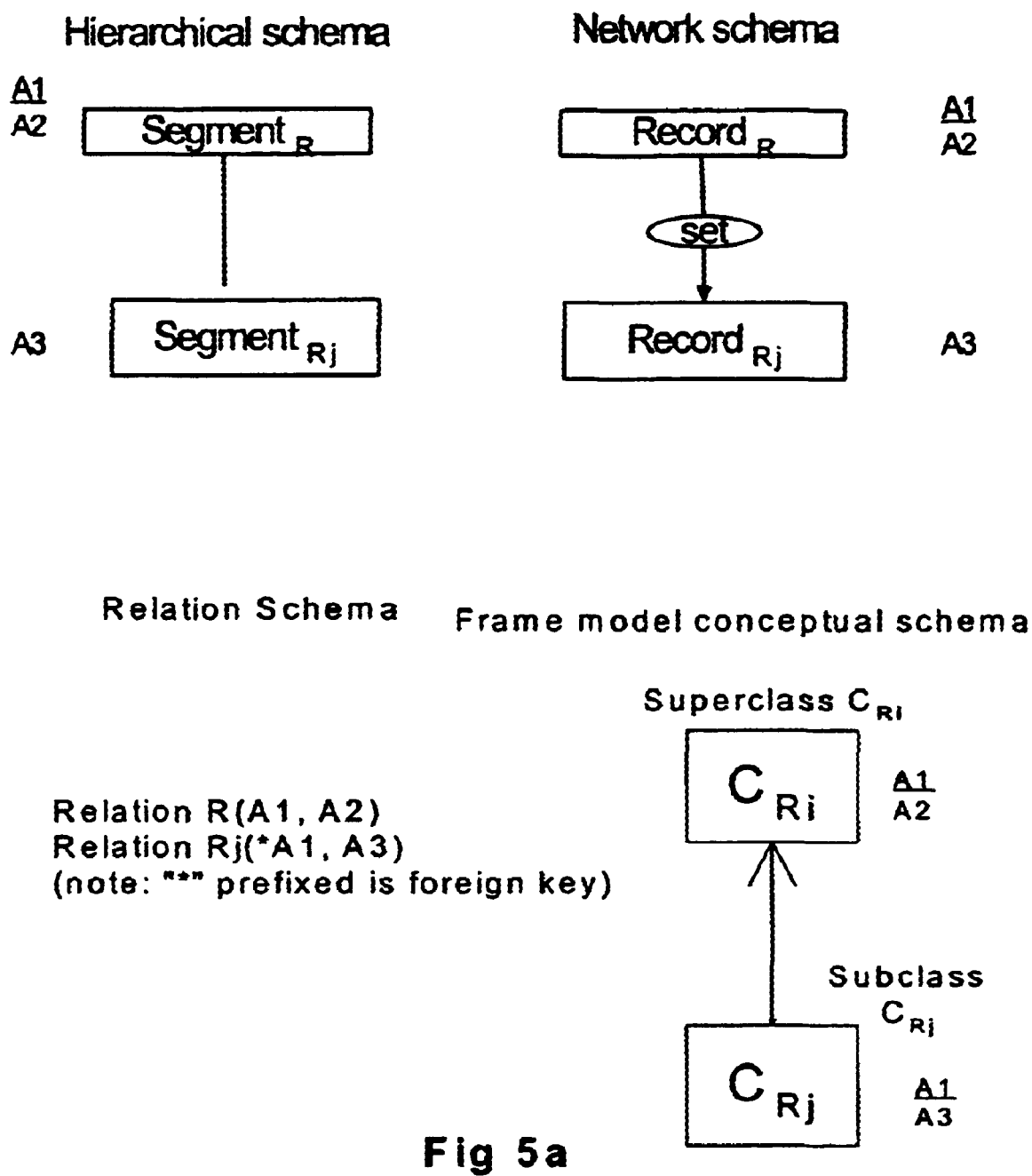

The next step is to map "isa" relationships from the legacy database into the frame model schema 10. FIG. 5a is an illustration of isa relationships for RDB, HDB and NDB schemas and the corresponding isa relationship for the frame model schema. For an RDB, a relation R with a key attribute A1 and a second attribute A2 has a subclass relation Rj with a foreign key *A1 and an attribute A3. The foreign key *A1 indicates that subclass relation $R_j$ "isa" member of the superclass R. A defining characteristic of an isa relationship is that the subclass can inherit all the methods and attributes of the superclass. The isa relationship is mapped to the frame model using the Parents element in the header class 11 to store the parent class for a subclass and the attribute class 12 to define the attributes.

As shown in FIG. 5b, the entities are mapped to the frame model as class names and attribute names. Specifically, the superclass relation R is mapped to a class name $C_R$ having a primary key $A_1$ in record 50 of header class 11. Relation $R_j$ is mapped to the class $C_{Rj}$ in record 51 of header class 11, also with a primary key of $A_1$. In addition, the class $C_{Rj}$ is defined as having parent $C_R$. The attribute $A_1$ is mapped for both classes $C_R$ and $C_{Rj}$ in records 53 and 55 of attribute class 12. Similarly, the attribute $A_2$ is mapped for class $C_R$ in record 54 and the attribute $A_3$ is mapped for class $C_{Rj}$ in record 56. Note that the associate_attribute elements of the attribute class 11 are not needed to identify the inheritance relationship of the isa relationship.

In an RDB, an isa relationship is a relationship between superclass and subclass such that the domain of subclass is a subset of its superclass. By examining the data occurrences of the same primary keys in different relations, the isa relationship can be determined such that the subclass relation's primary key is a subset to its superclass relation's primary key. The superclass/subclass relations are then mapped into the superclass/subclass in the frame model. The superclass relation is specified in the attribute Parent in Header class of a subclass in the frame model. FIG. 5c contains sample pseudo code to determine an isa relationship for an RDB and map it to the frame model. An RDB with sample data illustrating an isa relationship is illustrated in FIG. 6a.

In an HDB, the isa relationship is represented by a hierarchy structure between parent segment and child segment such that the child segment does not have a key, i.e., the parent and child segments have same primary key. Because the shared key is not expressly indicated in the child segment, user supervision may be needed to identify the isa relationship. The translation process maps the pair of superclass and subclass segments in HDB into pair of superclass and subclass in frame model with superclass specified in the attribute parent of the Header class of subclass.

In an NDB, the isa relationship is represented in a hierarchy structure with an owner record as a superclass entity and its member records as subclass entities such that the member record does not have a key. As with isa relationships in an HDB, user supervision is required to identify the isa relationship. The translation process maps pair of superclass and subclass records in NDB into pair of superclass and subclass relations in the frame model with superclass specified in the attribute parent of the Header class of subclass.

Step 3: Map Cardinality of Legacy Database Schema into Frame Model

Figure 7A:
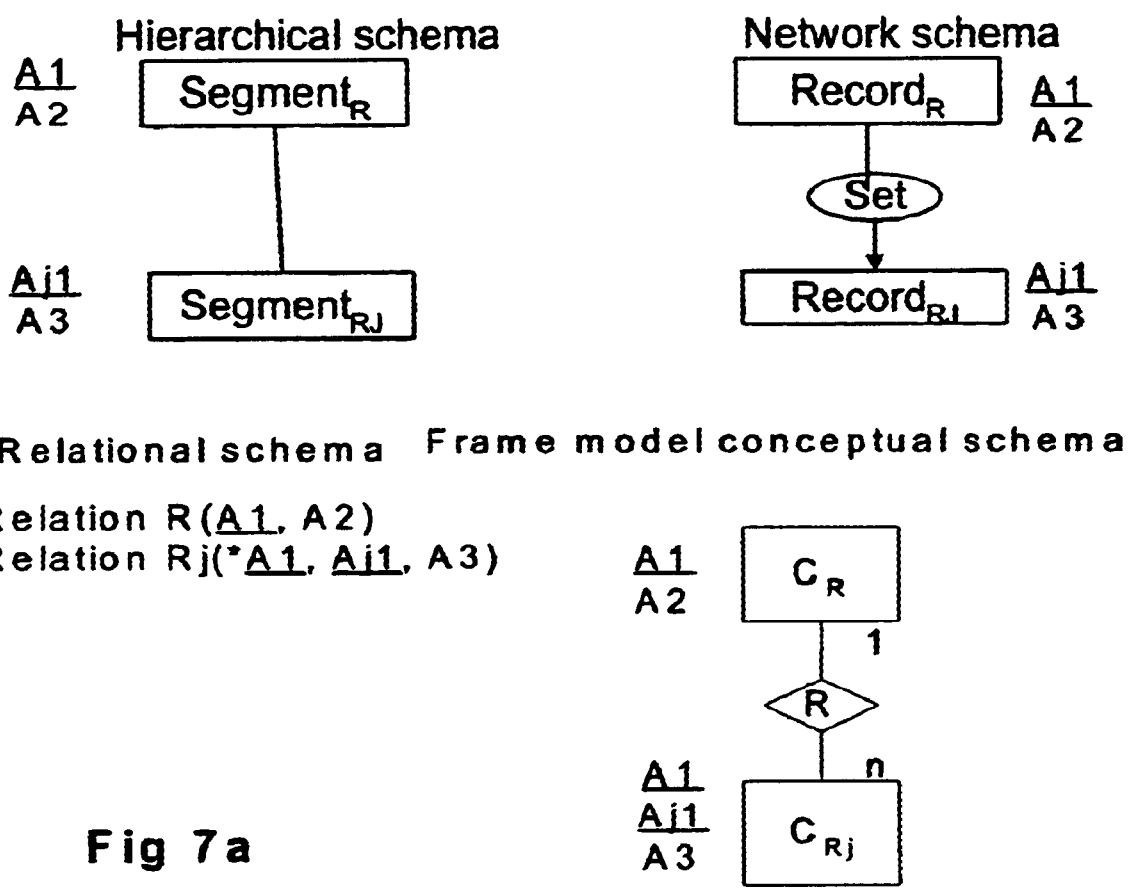

The next primitive semantic mapped from a legacy database schema is cardinality. The cardinality function captures the number of elements in a parent-child relationship between associated classes. Conceptual illustrations of the cardinality semantic for HDB, NDB, and RDB schemas and the corresponding conceptual frame model schema are shown in FIG. 7a. The corresponding frame model logical schema containing this semantic is shown in FIG. 7b.

In general, and with reference to the RDB structure of FIG. 7a, entities related to each other's data volume via cardinality are identified by examining the data occurrences between a relation's primary key and another relation's foreign key, the cardinality between the two relations is identified to be either , 1:1, 1:n or m:n. The cardinality function determines the volume relationship of a parent relation R with respect to its child relation $R_j$.

In an RDB, a child relation will have a foreign key referring to the primary key of its parent relation. For each tuple of a parent relation, if there is only one tuple in its child relation, then cardinality between parent and child relation is 1:1. If there are n tuples in a child relation, i.e., a parent has n children, then the cardinality between parent and child relation is 1:n. If there is no tuple in a child relation with a foreign key identifying the parent, then there is 1: (0,n) in cardinality between parent and child relation. If there is a child relation in n:1 relationships with m parent relations, then cardinality between the parent relations is m:n. In other words, if there is only one foreign key data occurrence which refers to a primary key, then it is likely that there is 1:1 cardinality. However, to avoid the possibility that the occurrence is a coincidence, manual verification should be performed. If a primary key is referenced by n foreign keys, n>1, then the cardinality of the two relations is 1:n. In addition, if relations A and B are both in 1:n cardinality to relation C, then relation A is in m:n cardinality to relation B.

For example, the RDB relation R has primary key $A_1$. The child relation $R_j$ has a primary key $A_{j1}$, but also references the foreign key $A_1$. The relations are defined as classes $C_R$ and $C_{Rj}$ in records 70 and 71, respectively, of header class 11 with the appropriate keys. The cardinality associations are mapped into the Associate_attribute and Cardinality attribute in the Attribute class 12 of the frame model. In the example shown in FIG. 7a, relations R and $R_j$, have a 1:n cardinality. Since parent relation R can have or point to up to n children relations $R_j$ that reference its primary key $A_1$ as a foreign key, the record 72 in the attribute class 11 defining primary key $A_1$ of class $C_R$ reflects this association by setting the associate_attribute value equal to $C_{Rj}$ and the Cardinality value equal to n. The record 73 defining key $A_1$ of class $C_{RJ}$ has the associate_attribute value set equal to $C_R$, indicating the cardinality association, and a cardinality value equal to 1, since each data instance of $C_{Rj}$ can refer to only 1 instance of $C_R$.

FIG. 7c contains sample pseudo code to determine cardinality between relations in an RDB by examining the data occurrence between their foreign keys and referred primary keys. An RDB with sample data illustrating a 1:n cardinality derived semantic illustrated in FIG. 6e.

In an HDB, by default, a 1:n cardinality relationship is represented by a pointer between parent and child segments. For an m:n relationship, a relationship segment is created to represent it. For an n-ary relationship, the relationship is mapped to one parent and n child segments. Pairs of parent and child segments in an HDB are mapped into pair of classes in frame model with cardinality defined by the attribute_type and cardinality in the Attribute class 12.

In an NDB, by default, the relationship between entities is represented by a Set. A binary relationship is mapped to a Set between an owner and a member record in 1:n cardinality. A relationship it is mapped to two Sets between two owners and one common member records if the cardinality is m:n between the two owners. For an n-ary relationship, there are n Sets between n owners and one member record. During schema translation, pairs of owner and member records in an NDB are mapped into corresponding pairs of classes in the frame model with cardinality defined in the cardinality element of the Attribute class 12.

Step 4: Map Weak Entity of Legacy Database Schema into Frame Model.

A weak entity is a subclass which is unique only through a superior unique key and can be identified only by considering another (owner) entity. Thus, the existence of a weak entity depends on its strong entity. When a strong entity is deleted, its weak entities are also deleted.

Figure 8A:
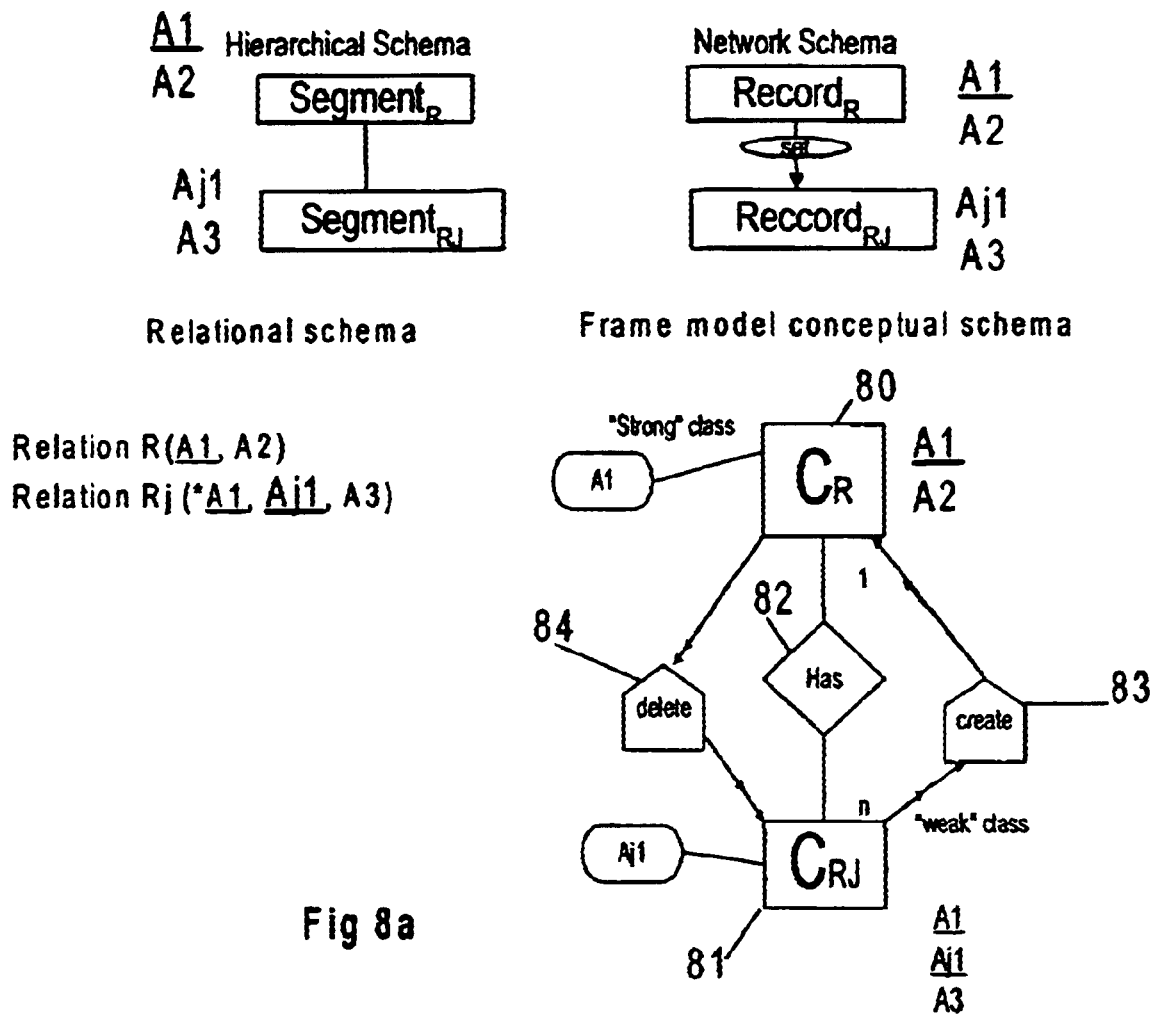

Conceptual Weak entity schema relationships for RDB, HDB, and NDB are illustrated in FIG. 8a, along with a corresponding Frame model conceptual schema. As shown, in the RDB schema for example, the Relation R has key $A_1$ and an additional attribute $A_2$. Relation $R_j$ has primary key $A_{j1}$ but also references $A_1$ as a foreign key. In RDB, the existence of the "weak" child relation depends on its "strong" parent segment and this functionality is implemented by the Create constraint and Delete constraint functions included in legacy database system itself.

This schema is mapped to the conceptual frame model as strong class $C_R$ 80 and weak class $C_{Rj}$ 81 using the user defined relationship "has" 82. The create constraint 83 is mapped as a heuristic relationship which indicates that the creation of the weak class implies creation of the strong class. The delete constraint 82 is mapped as a heuristic relationship which indicates that the deletion of the strong class implies the deletion of the weak class.

With reference to the logical frame model schema shown in FIG. 8b, the weak and strong relations are mapped into weak and strong classes in frame model by defining the weak/strong class functionality in the Constraint and Method classes 14, 13 and referencing the constraints in the appropriate Header class definitions. The constraints indicate that the creation of weak class depends on the existence of strong class and the deletion of strong class will delete its weak class.

As shown in records 80 and 81 of the header class 11, the class names and primary keys are mapped into the header class with the strong class $C_R$ having primary key $A_1$, and the weak class $C_{Rj}$ having primary keys $A_1$ as well as $A_{j1}$. The weak and strong class definitions 80, 81 call the Delete_$C_R$ and Create_$C_{Rj}$ constraints, respectively. The attributes are mapped to the attribute class, with the cardinality association between classes $C_R$ and $C_{Rj}$ indicated by the associate_attribute and cardinality elements in the manner discussed above with respect to step 3 and FIG. 7b.

The Delete_$C_R$ constraint, defined as record 82 in the constraint class 14, is defined to call the Delete_$C_R$ method before a delete event of an element of class name $C_R$ is detected and performed. The Create_$C_{Rj}$ constraint, defined as record 83 in the constraint class 14, is defined to call the Create_$C_{Rj}$ method when a create event of an element of class name $C_{Rj}$ is detected, but before the event is performed.

The particular methods of deleting and creating records are mapped into records 84 and 85, respectively, of method class 13. The delete_$C_R$ method is associated with the strong class $C_R$ by the Class_name element in record 84. The Create_$C_{Rj}$ method is similarly associated with the weak class $C_{Rj}$. The purpose of the "delete-$C_R$" Method is to enforce the constraint that before the strong class entity is deleted, any depending weak class elements are also deleted. A "Select" statement is used in the Method to identify any "weak" class entities that are associated with the deleted strong entity. The strong entity is deleted only if no weak entities currently exist which depend from it. Similarly, before a weak class entity can be created, the Create $C_{Rj}$ method is executed via the Create_$C_{Rj}$ constraint to ensure that the strong class already exists.

In an RDB, weak entities are located by examining the data occurrence between a parent and a child relations, and in particular, by locating a null value of the foreign key in the child relation. The participation between the child and parent relation is partial (i.e. strong entity) if null value exists; otherwise the participation is total and the entity is weak. Such a null-value relationship is illustrated in FIG. 6d.

Another signature of a weak entity is the existence of composite key in a relation. This qualifies the composite key as a weak relation or entity because its key depends on a key in another relation. FIG. 8c contains sample pseudo code to determine the participation between elements, and therefore whether there is a weak relationship In an HDB, by default, a child segment is a weak entity. This is represented by its pointer structure between its parent and child segments. Each child segment is in a fixed mandatory relationship with its parent segment such that the existence of child segment depends on its parent segment. The child segment key is the concatenation of parent segment key and a separate child key. During translation, pairs of parent and child segments in HDB are mapped into pairs of associated classes in the frame model. The "weak" entity semantic constraints are enforced by appropriate methods, as discussed above.

In an NDB, by default, a member record with a mandatory or fixed membership is a weak entity. The existence dependency is represented in a Set having mandatory automatic membership. Whenever a member record is created, it is assigned to an owner record automatically. During translation, pairs of owner and member records in the NDB are mapped into pairs of associated classes in the frame model with constraints and methods defined to enforce the "weak" entity semantic. (If the member record with optional retention mode SET is connected to owner record, then it is not mapped into a weak entity because it can also be a stand alone entity).

Step 5: Map Generalization of Legacy Database Schema into Frame Model

A generalization entity schema exists when more than one subclass has a common, more general superclass. Generalization can be either disjoint or overlap. In a disjoint generalization, the subclass objects are disjoint from each other. An overlap generalization has no such restriction. FIG. 9a illustrates generalization for an RDB, HDB, and NDB and a corresponding semantic frame model conceptual schema.

As illustrated, each parent relation, segment, etc. has a number of subclasses. As an example, a superclass entity can represent "employee" and have a number of subclasses, such as a "manager" and a "programmer". In a disjoint generalization, both managers and programmers are employees, but a manager cannot be a programmer and visa-versa. This disjoint relationship is represented by the logical OR operator 90 shown in the conceptual frame model schema. In an overlap generalization, an employee can be both a manager and a programmer. Such an overlapping schema is represented in the frame model conceptual schema using a logical AND operator, instead of the OR operator 90 (not shown).

FIG. 9b illustrates a logical frame model including a disjoint generalization schema mapped from a legacy database. Translation of generalization from legacy database schemas to the frame model depends on interpretations of the isa relationships. Thus, the isa relationships should be translated from legacy database schemas to frame model before generalization. The generalization translation adds the necessary condition and action elements to the Method class along with corresponding constraints to map the constraint checking which must be enforced before inserting a new subclass segment/record. In particular, the enforced constraint of a disjoint generalization is that the data occurrences of the subclasses are mutually exclusive. This can be enforced during insert operation by verifying that when one object is inserted in a subclass, the same object does not exist in another subclass.

The generalization of the relations can be captured by examining the record counts of two relations with the same primary keys. The relation with the smaller count must be the subclass relation to the one with the larger count. A disjoint relationship is detected by locating isa relationship linkages with one parent segment and more than one child segments. The process can be automated. However, user supervision is preferably utilized to confirm that the located semantics are correct.

The subclass relation is translated into a class in the frame model with the attribute Parent pointing to another class mapped from the corresponding superclass relation as shown in the records 91 and 92 of the header class 11. The subclass records 91, 92 for classes $C_{Ri1}$ and $C_{Rj1}$ also include an Operation reference calling the constraint $C_{Ri1}$ and $C_{Rj1}$, respectively.

The attributes are defined in the attribute class as shown. Because the relationship between classes is not a cardinality association, but instead is similar to an isa relationship, no association information is defined in the associate_attribute field.

Constraint $C_{Ri1}$, defined as a record 93 in the constraint class 14, references the method Create_$C_{Ri1}$ and is linked to Class_name $C_{Ri1}$. The constraint uses the primary key A1 as a parameter and is triggered by the creation of $C_{Ri1}$, as indicated by the "Create" in the event element. The method Create_$C_{Ri1}$, defined as a record 94 in the Method class 11, is also linked to Class_name $C_{Ri1}$ and is referenced by the $C_{Ri1}$ constraint. The method and constraint for $C_{Rj1}$ are defined similarly.

The method class in the frame model serves to enforce disjoint generalization as a result of schema translation from legacy database schema to frame model.

Pseudo code for determining this relationship in an RDB is detailed in FIG. 9c. In addition, the disjoint/overlap generalization can also be derived by data querying or with user supervision if necessary. FIG. 6b illustrates as RDB with data in disjoint generalization. In particular, the types in the subclasses $R_{j1}$ and $R_{j2}$ are mutually exclusive within the subclasses but are inclusive in the superclass.

In an HDB, a disjoint generalization is derived by mapping isa relationships and their segment types to superclass/subclass segment relationships such that a superclass segment (i.e., the parent segment) is a generalized class for subclass segments (i.e., the child segments) which are mutually exclusive. User supervision may be needed to confirm such a derived relationship. Alternatively, the constraint can be manually derived from the application's program logic in that the constraints of superclass and subclass with disjoint or overlap generalization are implemented by programs. There is one-to-one mapping from superclass/subclass segments of HDB to the superclass/subclass in frame model schema, wherein the superclass specified as parent to subclass.

The generalization process for mapping an NDB to the frame model schema is generally the same as the mapping for an HDB. The primary key is the legacy database structure. An HDB utilizes implied pointers between parent and child segments while an NDB uses external pointers between owner and member records through SET pointers.

Step 6: Map Categorization of Legacy Database Schema into a Frame Model

Figure 10A:
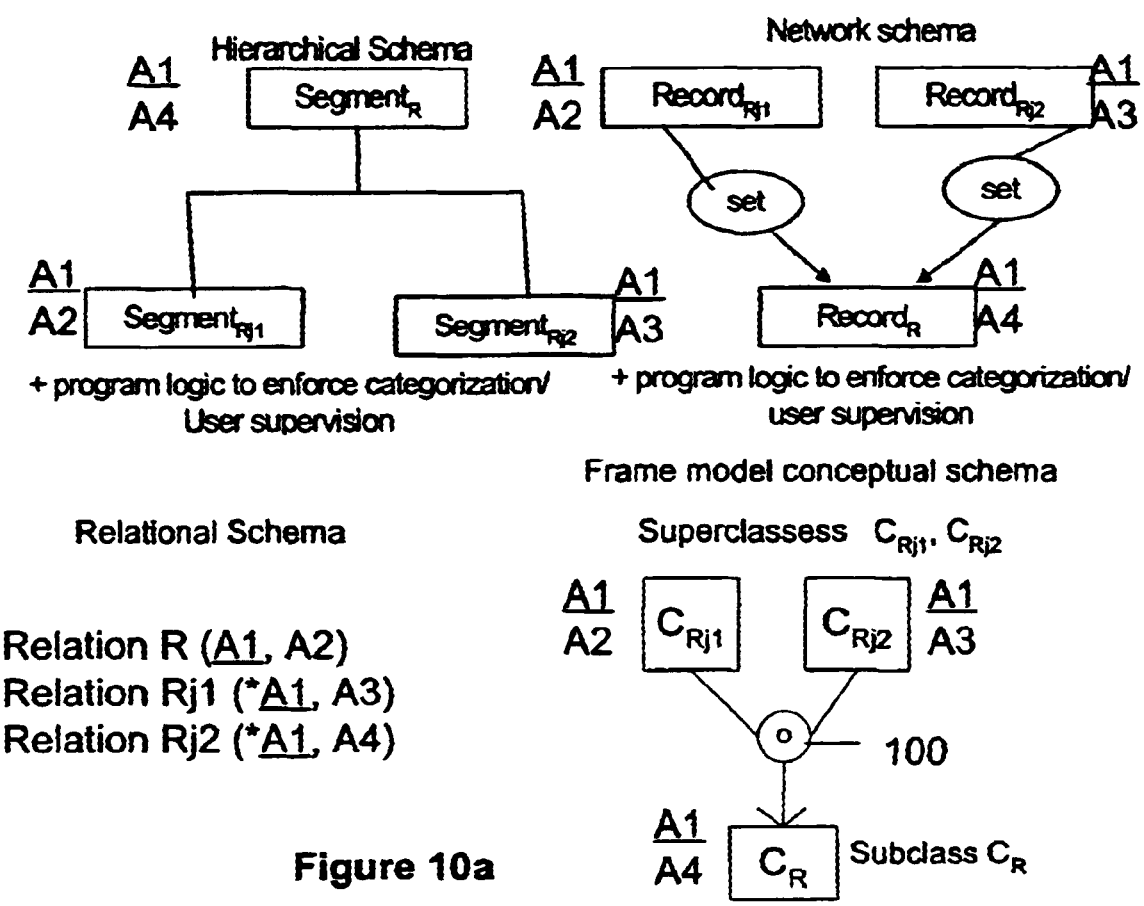

Categorization is represented by a subclass that has a superclass is a union of the two (or more) classes. Conceptual representations of a categorization schema for RDB, HDB, and NDB are illustrated in FIG. 10a, along with the corresponding frame model conceptual schema for categorization. As illustrated, each conceptual schema has multiple classes which are united to form a superclass having a single subclass. (In contrast, the generalization relationships illustrated in FIG. 9a have multiple subclasses which are united as a subclass with one superclass). The categorization relationship is constrained by the rule that an occurrence of a superclass must exist before an subclass object can be created.

With reference to the RDB schema of FIG. 10a, relations $R_{j1}$ and $R_{j2}$ are superclasses, each having a primary key A1, and also having a second attribute $A_3$ $A_4$, respectively. Relation R is a subclass of both relations $R_{j1}$ and $R_{j2}$. This is indicated by its use of $A_1$ as a foreign key. The illustrated conceptual frame model schema shows this categorization relationship through the use of the directed OR operator 100. The difference between the categorization relationship illustrated in FIG. 10a and the disjoint generalization relationship, illustrated in FIG. 9a, is captured by the opposite orientation of the figure, which indicates the order in which the data elements are traversed.

FIG. 10b illustrates a frame model logical schema mapping of the categorization relationship shown in FIG. 10a. As shown in the $C_R$ record 101 in the header class 11, the subclass is mapped to the frame model by referencing the name of each superclass in the Parents element. To enforce categorization constraint between a subclass and its superclasses, a constraint $C_R$ record 102 is defined in the constraint class 14 which references a method Create_$C_R$, defined in a record 103 in the method class. The method is defined to implement the constraint that an occurrence of superclass must exist before a subclass object can be inserted. Constraint $C_R$ is tied to the header class definition by including a call to the constraint in the Operation element of the record 101 defining the constrained class. As with the generalization relationship, discussed above, since the relationship between classes is not a cardinality association, no association information is defined in the associate_attribute fields of the attribute class.

The categorization relationship can be derived by data querying, with user supervision if necessary. In an RDB, if the primary key of the subclass relation appears only once in one of its superclass relations, then categorization of the subclass relation and its superclass relations is true. Pseudo code illustrating a method to determine categorizations in an RDB is illustrated in FIG. 10c. Sample data illustrating a categorization relationship in an RDB is illustrated in FIG. 6c.

In an HDB, the categorization is represented by a hierarchy structure where the parents are the subclass segment and the child segment is its superclass segment. In translation, each set of a subclass and its superclass segments are mapped into a set of subclasses and superclass in the frame model with constraints enforced by method class. In an NDB, a categorization is represented with one member record as a subclass entity and its owner records as its superclass entities. During translation, each set of a subclass and its superclass records in a set of a subclass and superclass records is mapped to the frame model with constraints enforced by the method class. While the process can be automated, user supervision is preferably used to confirm the derived relationships. Alternatively, the constraint can be derived from an analysis of the application program since the program is used to implement the categorization constraints.

Step 7: Map Aggregation of Legacy Database Schema into Frame Model

The final step in mapping the schema from legacy databases into the frame model addresses aggregation. Aggregation is an abstraction concept for component classes which are part-of a "whole" class. The aggregation semantic indicates that an entity consists of a component entity which must exist before the creation of the entity and which must be deleted when the entity is deleted. Conceptual schema diagrams illustrating aggregation in an RDB, an HDB, and an NDB are shown in FIG. 11a along with a corresponding conceptual diagram of the aggregation in the frame model schema.

In an RDB aggregation relationship, the existence of one relation depends on the existence of its component relations. For example, if relation A and relation B are in an m:n relationship which is represented in a relation AB, then relation A and relation B are part of relation AB because the creation of the relation AB depends on the existence of relation A and relation B (i.e., relations A, B, and AB can be treated as an aggregation entity). In an HDB, the m:n cardinality can be represented by a child segment which has two parent segments (logical and physical), and which is treated as an aggregation entity. Similarly, in an NDB, the m:n cardinality can be represented by a member record which has two owner records, and which is treated as an aggregation entity.

Figure 11A:
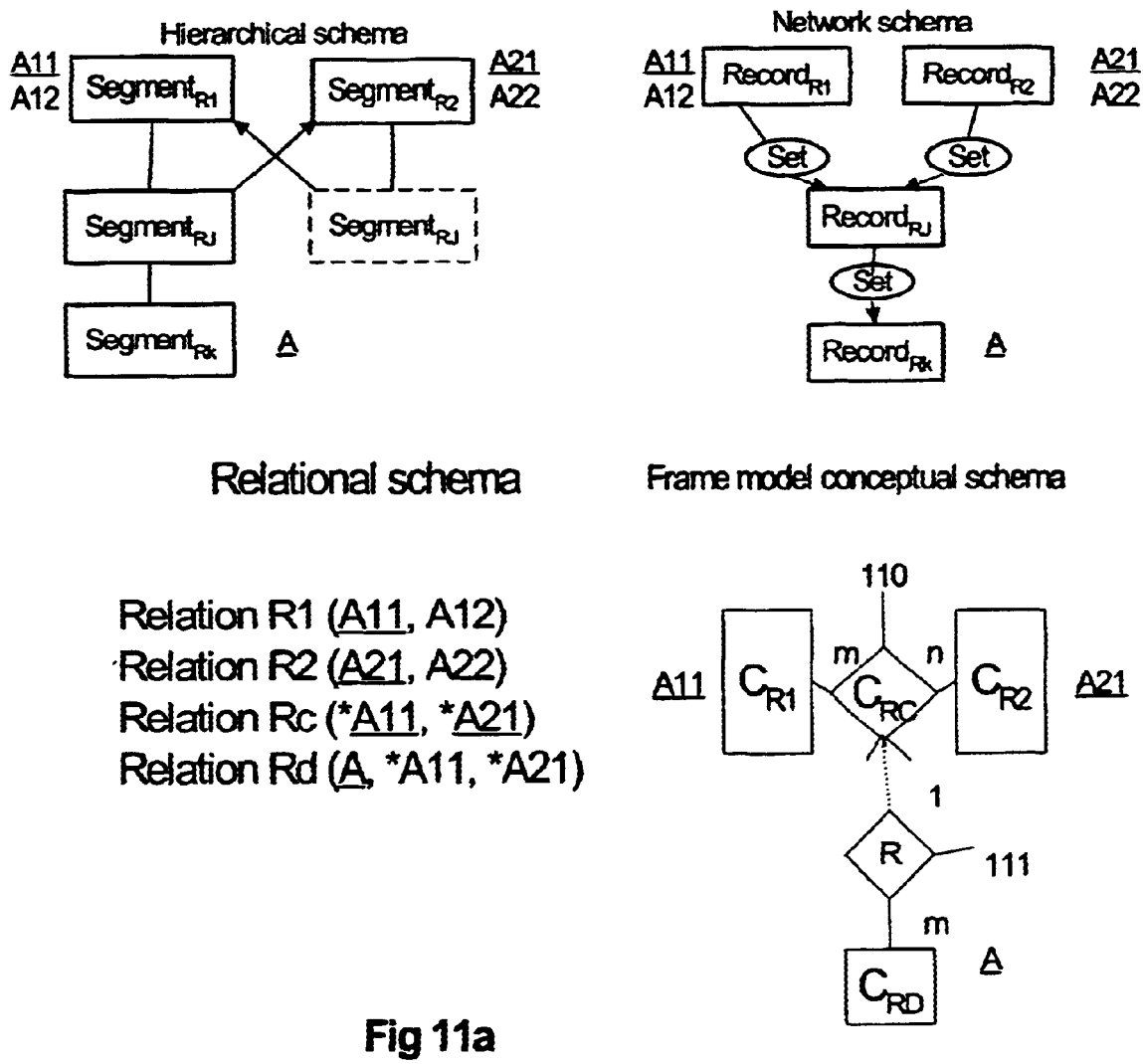

With reference to the RDB schema of FIG. 11a, relations R1 and R2 have primary keys A11 and A21, respectively. These relations are related to each other by a third "relationship" relation RC through the use of primary compound (foreign) key A11, A21. This relationship is mapped into the frame model schema as classes $C_{R1}$ and $C_{R2}$ which are connected to each other via the relationship RC 119 and with m:n cardinality.

A relationship relation between two entities is treated as an aggregation when the relationship entity relates to a third entity. In this case, the foreign (composite) keys *A11 and *A21 in RC reference the primary keys of R1 and R2. The relation entity RD has primary key A and also references $A_{11}$ and $A_{21}$ as a foreign compound key. The reference to $A_{11}$ and $A_{21}$ by RD thus relates RD to the relationship entity RC. This is mapped into the conceptual frame model schema through a relationship R, which represents a 1:m cardinality similar to that illustrated in FIG. 7a.

FIG. 11b is a Frame model logical schema illustrating the mapping of the aggregation relationship shown in FIG. 11a. The classes are mapped into the header class 11 in the manner discussed above. Note that record $C_{RC}$ 112 in the header class 11 is mapped with the primary compound key $A_{11}\ A_{21}$. The aggregation relationship is implemented in the Attribute class 12. The records 113, 114, defining primary key attributes $A_{11}$ and $A_{21}$ for classes $C_{R1}$ and $C_{R2}$, respectively, are both associated with class $C_{RC}$ through this key with a cardinality of n. The corresponding attribute definitions for $A_{11}$ and $A_{21}$ 115, 116 in class $C_{RC}$ are defined so as to represent the association with classes $C_{R1}$ and $C_{R2}$, respectively, with a cardinality of 1.

Class $C_{RD}$ also has its attributes mapped in the attribute class 11. The aggregation relationship is indicated by the reference to $C_{RC}$ in the associate_attribute element in records 118, 118, which define the $A_{11}$ and $A_{21}$ attributes for class $C_{RD}$. In accordance with the 1:m relationship between $C_{RC}$ and $C_{RD}$, each attribute has a cardinality of 1. The corresponding attribute definitions for $A_{11}$ and $A_{21}$ 119, 120 in class $C_{RC}$ are defined so as to represent the association of these two keys to class $C_{RD}$ with a cardinality of n.

The constraints associated with the aggregation relationships, namely the restrictions on the creation and deletion of strong and weak components of the class are defined in a manner similar to that for the weak class, discussed above. The particular implementation is illustrated in FIG. 11B.

The test for the existence of aggregation classes in a RDB can be reduced to the equation:

If $CK(Ra)=(Ac1\ Ac2)=PK(Rc1)+PK(Rc2)$ and $CK(Ra)=PK(R)$ THEN $Rc1+Rc2 +Ra$=Aggregation class.

The aggregation semantic can be illustrated in a conceptual schema but cannot generally be represented in a legacy database logical schema. During mapping, reverse engineering is used to map a set of relations in a relational schema to the frame model. Whenever a relationship relation $R_a$ in the RDB is found to be related to two relations $R_{C1}$, $R_{C2}$ in the relational schema, they are grouped together as an aggregation class comprising $R_a$, $R_{C1}$, and $R_{C2}$. A constraint is imposed wherein class $R_a$, as a whole, consists of component classes $R_{C1}$, $R_{C2}$. To create class $R_a$, both component classes must exist. To delete class $R_a$, both component classes must be deleted.

In HDB, an aggregation is represented by a relationship segment which is linked to another segment. In translation set of related segments in HDB are mapped into set of classes in frame model with constraints implemented by Attribute class.

In NDB, an aggregation is represented in a relationship record between two owner records. An aggregation occurs when the member record acts as an owner record by connecting it to another member record. In translation, set of related records in NDB are mapped into set of classes in frame model with constraints implemented by Attribute class.

DATA CONVERSION FROM LEGACY DATABASES

According to another aspect of the invention, once the legacy schema is mapped into the frame model, the schema represented by the frame model can be used to generate a corresponding operative database. In a preferred implementation, the frame model is translated into a "frame model relational database" which is managed by a conventional relational database management system. An architecture for such a system is illustrated in FIG. 2. The RDBMS is a software platform which access the database files, preferably in a multi-user environment. The platform supports inputs and outputs, backups, recovery, concurrency control, security, and other database services. Specialized hardware can also be used.

The frame model RDB files are generated by extracting the classes, attributes, methods, and constraints which are stored in the frame model and then using the defined schema to create appropriate data structures in a form supported by the RDBMS. The particular method of implementing the schema is dependent on the specifications and limitations of the particular RDBMS being utilized. Various techniques for building a relational database having a schema that tracks a frame model schema will be known to one of ordinary skill in the art. It will also be apparent to one of skill in the art that such a generated RDB will have at least the power of the original legacy database, and will often be more powerful because the schema translation process will identify relationships which may have otherwise been unnoticed or were not fully supported by the legacy database system.

After the frame model RDB structure is established, the actual data stored in the legacy database is transferred into the frame model RDB. As shown in FIG. 12a, one method of transferring of data from a legacy database into the particular relations of the frame model RDB is comprised of three primary steps. First, the source legacy database 120 is unloaded into a set of intermediate sequential files 121. (Step 124). Next, if necessary, the intermediate files 121 are reformatted into a set of intermediate target files 122. (Step 125). Finally, the intermediate target files 122 (or the intermediate files 121 if no reformatting is required) are loaded into the relations of the target frame model RDB 123, i.e., by repeated use of the insert function of the frame model RDBMS. (Step 126).

The reformatting step is generally required only if the source database files have to be transferred to a different platform, for example, from a source mainframe database file to a target PC database file. In this situation, certain data types may need to be changed. A mapping "definition" is typically prepared to specify the differences between data types in the schemas before mapping. Data type conversion by customized program/software tools may be needed when the files are transferred to different platform. Pseudo code for accomplishing data unloading from an HDB is provided in FIG. 12b. The schema and data transfer procedure will now be illustrated with respect to sample HDB and RDB databases. Pseudo code for accomplishing data unloading from an NDB is provided in FIG. 12c.

FIG. 13a shows the schema of a sample HDB along with a set of sample data present in the legacy database. According to the methods discussed above, the HDB schema is captured and mapped into a frame model schema of the invention. The resulting frame model representation of the HDB illustrated in FIG. 13a is shown in FIG. 13b. The database schema which is stored in the frame model schema is then extracted and instantiated in an appropriate relational database environment to create a target frame model RDB. Such a translated relational schema is illustrated in FIG. 13c. Finally, after the frame model RDB is constructed in the frame model RDBMS, the data from the HDB in FIG. 13a is unloaded into sequential files. Each segment type data is then reloaded into the corresponding target relations in the frame model RDB using the sequential file as input data streams. The resulting translated frame model RDB is illustrated in FIG. 13d. A similar translation of a legacy network database is illustrated in FIGS. 14a–14d and pseudo code for unloading the data from a NDB into sequential files is presented in FIG. 14e.

LEGACY DATABASE PROGRAM CONVERSION

A further aspect of the present invention involves the translation of legacy database programs into embedded-SQL database programs which are suitable for use by a frame model RDBMS. In particular, existing HDB/NDB programs in a legacy database are translated into frame model RDB programs by emulating the database navigation statement of the HDB/NDB programs and translating them into embedded-SQL cursor statements. The data manipulation language ("DML") for HDB is generally DL/1, a linear keyword query language. The NDB DML is generally IDMS, a pictorial query language which is an extension of Sequel2, a precursor of SQL.

The segment/record pointers in an HDB/NDB are used by the legacy database management system to navigate the database. In an RDBMS, the SQL cursors are used for navigation. Database navigation statements of the HDB/NDB is translated into corresponding embedded-SQL cursor statements by translating the database pointers of the HDB/NDB into SQL cursors with a cursor template of the pointer. Each cursor of each relation in the frame model RDB program thus simulates the corresponding segment/record pointer in the HDB/NDB. For each DML transaction translation, there is a one-to-one mapping between the HDB/NDB segments/records and the RDB relations.

The major transaction operations of a DML which are translated include the retrieve, insert, delete and update operations. Each operation has a set of commands which are dependent on the particular DBMS at issue. Disclosed in the figures referenced below are pseudo code algorithms which provide general descriptions of how to replace the lower level procedural database pointers of HDB/NDB's DML with the higher level nonprocedural embedded SQL cursor of RDB's DML. The specific implementation is platform dependent and particular implementation details will be known to those of skill in the art. It will be recognized that the major transaction operations represent only principal samples of program logic, not a complete set of all program logic. However, the general methods disclosed can be extended as needed to translate other operations.

FIG. 13e is a graphical illustration of emulation of HDB embedded DL/1 database segments as embedded-SQL cursors in an RDB. To emulate the processing of a hierarchical database program by a translator which uses an RDBMS as a kernel system, the facilities of the hierarchical DBMS are emulated. Each relation is treated as a hierarchical segment and each SQL cursor is treated as a hierarchical segment pointer. A program area is added a cursor to store the database positioning of each "segment". The cursor pointing to the primary keys and foreign keys are used to navigate the relational relation. A corresponding program work area for the HDB database discussed above with respect to FIGS. 13a–13d is shown in FIG. 13e. The pre-processed source and target schemas are defined in the template in the translator. The embedded SQL of the frame model RDB program is the translated DMLs for the RDB.

FIGS. 13f–13i contain algorithms for extracting the appropriate segment from an HDB or record from an NDB and for creating a corresponding embedded SQL cursor for the Project (i.e., retrieve), Insert, Delete, and Update DML operations, respectively. The function "CBLTDL1" used in the HDB algorithms is a DL/1 statement for a Cobol program call which has 4 parameters: function call, program communication block, I-O -Area, and Segment search argument. For the NDB algorithms, the codes are from an IDMS, a network Database Management System. The operations Find, Obtain, Disconnect, Connect, Reconnect and Store are function calls. Return code checking must be done to verify the result of the call. For the RDB algorithms, each SQL cursor is prefixed with "c" and must be declared, opened, fetched, and closed.

UNIVERSAL INTEGRATED FRAME MODEL DATABASE

According to a further aspect of the invention, a universal database system is provided which integrates a plurality of frame model schemas representing respective legacy database into a single global frame model database. Schema integration provides a global view of multiple schemas using a bottom up approach to integrate existing database schemas into an integrated global schema.

As broadly illustrated in FIG. 3, a universal database is produced in three primary steps. First, a frame model schema is generated in the manner discussed above to represent the structure of each legacy database to be included in the universal database. Next, the frame models are merged according to the method discussed below to produce a global frame model. Finally, the data from each of the legacy databases is transferred into the global frame model.

Individual frame model schemas are merged into the universal frame model in pairs. First, for each pair of schemas A and B, the semantic conflicts between the frame models are resolved. Next, classes between frame model schema A and frame model schema B are merged. Finally, the relationships between frame model schema A and frame model schema B are merged. Each of these steps is discussed in turn, below.

Step 1: Resolve Semantic Conflicts

A number of semantical conflicts can exist between two schemas. These conflicts must be resolved when the schemas are merged. A variety of different conflict resolution procedures can be followed. Preferably, however, the semantic conflict resolution is done in six sub-steps which address potential conflicts which can exist involving (1) synonyms and homonyms, (2) data types, (3) keys, (4) cardinality, (5) subtype classes, and (6) weak classes. The semantic conflicts and resolutions are discussed below with reference to conceptual schema diagrams for clarity. Those of skill in the art will recognize that the schemas represented in the conceptual diagrams can be translated into a logical frame model in a manner similar to that discussed above, with respect to mapping a legacy database into the frame model.

Step 1.1: Resolve Conflicts with Synonyms and Homonyms

Figure 15B:
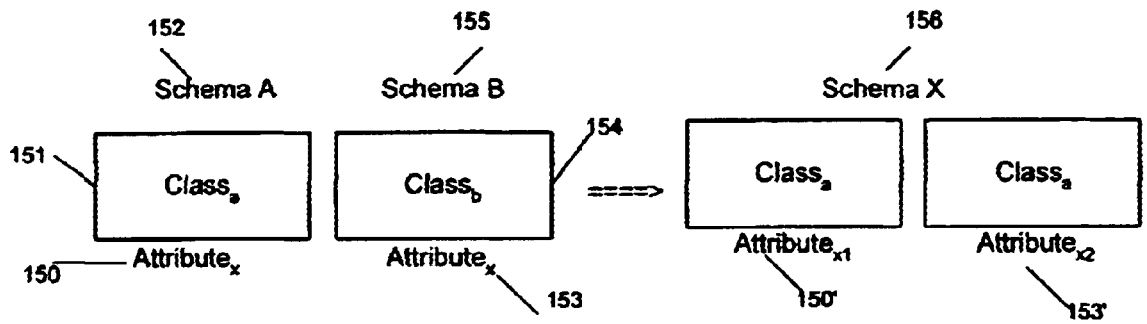

FIG. 15a illustrates a possible synonym conflict between attribute x 150 of class a 151 in schema A 152 and a similarly named attribute x 153 in class b 154 of schema B 155. If the data type or size for attribute x 150, 153 between the classes differs, attribute x is a homonym. Once a potential homonym conflict is identified, it is resolved, if necessary, by renaming the conflicting attributes 150, 153 such as shown in schema X 156. The integrated schema, the homonym is renamed as attributes x1 150' and x2 153' to avoid the overlap. Note that in this example, Class a in schema A and class 6 in schema B are synonyms. When they are mapped to schema X, they both become class a. As a result, class a is shown twice in schema X. In a subsequent step, the classes are integrated into a single class a.

Analogously, if Schema B 155 has an attribute y (not shown), which is differently named from attribute x 150 but has the same data type and size, attributes x and y may be synonyms. If so, y can be renamed as x and the attributes merged. Pseudo code representing a method of synonym/homonym conflict resolution is provided in FIG. 15b. These decisions are generally made according to user input. However, automated or semi-automated processing techniques can also be used, for example, to make suggestions in view of prior conflict resolution decisions made by a user.

Step 1.2 Resolve Conflicts on Data Types

Figure 16A:
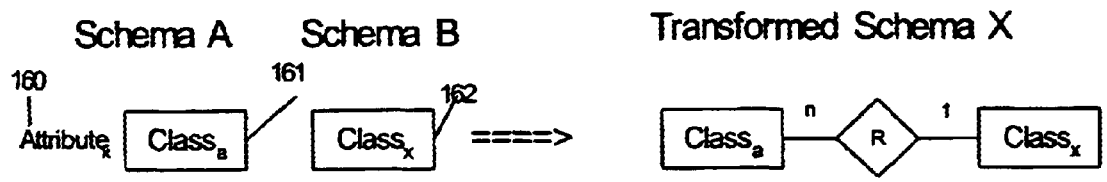
Figure 16B:
Figure 16C:
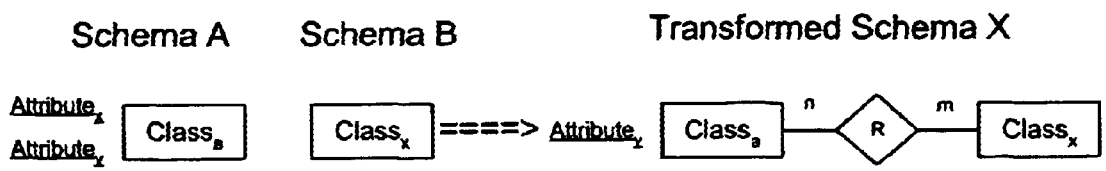

Data type conflicts occur when the name of an attribute 160 in a class a 161 of schema A conflicts with the name of a class x 162 in schema B. Three variations of this conflict are possible: the attribute x 160 is not a key, as shown in FIG. 16a, the attribute 160 is a key, as shown in FIG. 16b, and the attribute 160 is part of a compound key, as shown in FIG. 16c. To resolve this conflict in the transformed Schema X, the attribute x 160 is removed from class 161 of schema A and in its place, class 161 in schema A is related to class x 162. When attribute x 160 is not a key, the relationship is defined with 1:1 cardinality. When attribute x 160 is a key, the relationship is defined with 1:1 cardinality. When the attribute x 160 is part of a compound key, the relationship is defined with cardinality n:m. Pseudo code representing data type conflict by transformation is provided in FIG. 16d.

Sub-step 1.3 Resolve Conflicts on Key

Figure 17B:
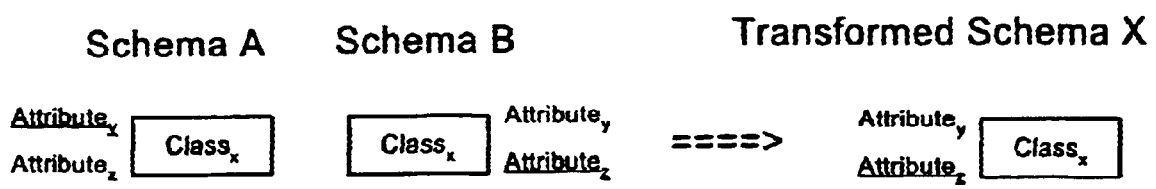

FIG. 17a illustrates a key conflict where two classes having the same class names and attribute names use different attributes as a key. To resolve this conflict, a decision is made as to which attribute to preserve as a key. Generally, the decision will be made by a user. However, an automated decision making process can also be used. A pseudo code representation of this conflict resolution is provided in FIG. 17b.

Sub-step 1.4 Resolve Conflicts on Cardinality

Conflicts in cardinality occur when two schemas have corresponding pairs of related classes, but where the cardinality of the relationship differs. Such a situation is illustrated in schemas A and B of FIG. 18a. To resolve this conflict, the pairs are transformed with the same classes, but using the largest cardinality present in either of the two pairs. Because the domain of the largest cardinality covers that of the smaller one, there is no loss of information. Pseudo code representing this transformation is provided in FIG. 18b.

Sub-step 1.5 Resolve Conflicts on Subtype Classes

Figure 19B:
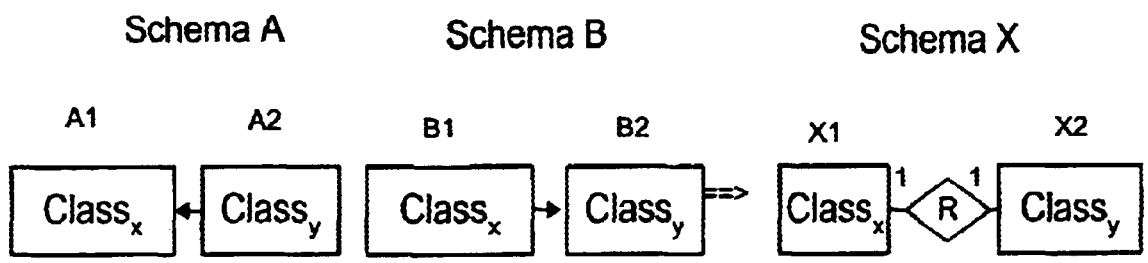

A subtype conflict occurs when the superclass/subclass relationships of corresponding classes in source schemas A and B are different. A subtype conflict is illustrated in FIG. 19a. To resolve this situation, the corresponding classes in the source schema are transformed into a corresponding pair of classes which are related with 1:1 cardinality. Because the cardinality does not imply a superclass or subclass relationship, it will not conflict with any of the more specific relationships in the source schemas. Pseudo code illustrating this subtype class transformation is provided in FIG. 19b.

Sub-step 1.6 Resolve Conflicts on Weak Classes

Finally, a weak class conflict exists when two classes in source schema A are related generally while the corresponding classes in source schema B are related via a weak entity relationship. This conflict is resolved by preserving the weak entity constraint in the integrated schema X to thereby preserve all the constraints which existed in the source schemas. This conflict and its resolution is illustrated in FIG.

Figure 20B:
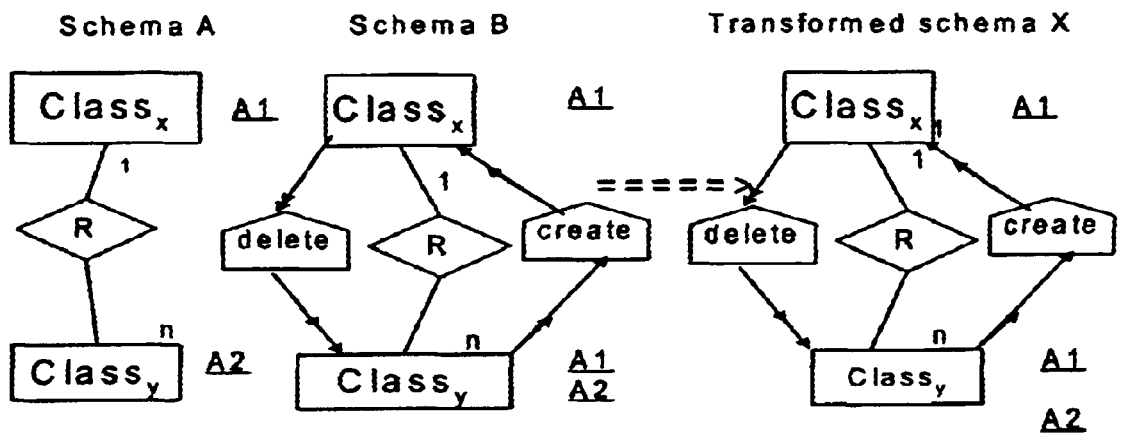

20a. Corresponding pseudo code for resolving this conflict is provided in FIG. 20b.

Step 2: Merge Classes

After any schema conflicts which may exist are resolved, the classes themselves are merged. Correspondingly, classes in the source schemas are merged in accordance with the particular type of relationship between the classes. Preferably, six different types of class merging are performed: (1) union, (2) generalization, (3) subtype relationship, (4) aggregation, (5) categorization, and (6) implied binary relationship. Each will be discussed below.

Sub-step 2.1: Merge Classes by Union

Figure 21B:
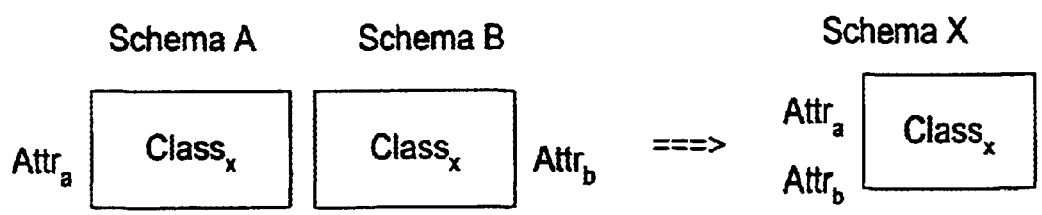

With reference to FIG. 21a, when source schemas A and B each have the same class x, but the classes have different attributes, the domain of attributes in the transformed class x in schema X is the union of the domain of attributes for class x in each of the source schemas A and B. In the example, class x of schema A has attribute a while class x of schema B has attribute b. The transformed schema X has class x with both attributes a and b. FIG. 21b provides a pseudo code implementation of merger by union.

Sub-step 2.2: Merge Classes by Generalization

Figure 22A:
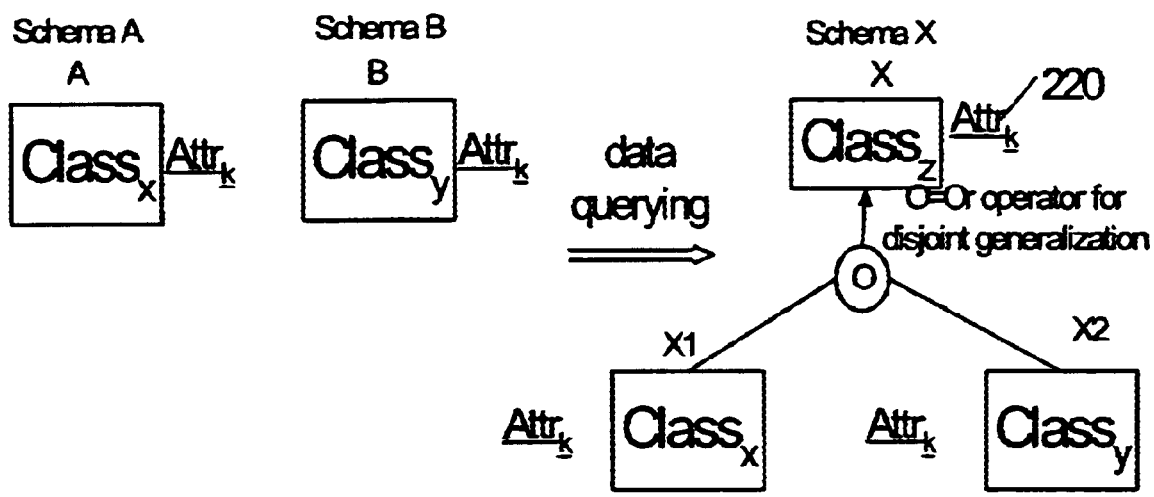

When a class X in source schema A and a different class Y in source schema B use the same attribute as a primary key, the two classes are merged by generalization. This situation is illustrated in FIGS. 22a and 22b. Merger by generalization is a two part process. First, a superclass Z is created in the transformed schema Z which includes the common attributes from the source classes A and B. Then, using data querying techniques known to those of skill in the art, actual data occurrences in the classes of the source schemas are examined to determine whether any object from one of the source schemas appears in the other. If there is no overlap, the two classes are mapped into corresponding subclasses in a disjoint generalization relationship 220, as shown in FIG. 22a. If there are common elements, the classes are mapped into corresponding subclasses in an overlap generalization relationship 221, as shown in FIG. 22b. A pseudo code implementation of generalization merging is provided in FIG. 22c.

Sub-step 2.3 Merge Classes by Subtype Relationship

With reference to FIG. 23a, if a class X 230 in source schema A has the same primary key attribute K as a class y 231 in source schema B, then classes X and Y may be related to each other in a super/subclass relationship. This relationship exists if the domain of one class X, Y is a subset of the domain of the other class Y, X.

The relationship between classes in two schemas is derived by data querying during which actual data instances in the source databases are examined to determine which class is a subset of the other, if at all. The class with fewer data occurrences is mapped as the subclass and the class with more data is mapped as the superclass using an isa relationship as shown in FIG. 23a. Pseudo code illustrating schema integration by merging subtype classes is provided in FIG. 23b.

Sub-step 2.4 Merge Classes by Aggregation

Classes in source schemas can also be integrated into the global schema X in an aggregation relationship. This is illustrated in FIG. 24a. Class X 240 is in schema A. Classes Y 241 and Z 242 are in schema B and are related to each other with a cardinality of 1:r. User input can be used to determine whether there is a multi-value dependency between class X 240 and the related classes Y and Z 241, 242.

A multi-valve dependency is based on the particular foreign key and cardinality. With reference to FIG. 24a, schema A has non-key attributes Y and Z which also appear as attributes in schema B. As shown, class relation R from schema B is mapped to R1 in schema X and A new class relation R2 is created to relate class X to R1. The relationships cardinality can be determined through data querying. Pseudo code illustrated this transformation is provided in FIG. 24b.

Sub-step 2.5 Merge Classes by Categorization

It may also be necessary to merge classes from source schemas by categorization when classes share the same primary key. With reference to FIG. 24a, schema A includes classes X and Y 250, 251 while schema B includes class Z 252. Using data querying of the actual data occurrences in the source databases, the relationship between the class are determined. For example, if class X is "Bank", class Y is "Company" and class Z is "car-owner", a categorization relationship exists if a car owner can be either a bank or a company, but not both.

If a categorization relationship exists, a superclass/subclass relationship is constructed in the global schema, as shown in FIG. 25a. First, the superclass' names are added to the parent attribute in the header class of the subclass. Then, the categorization constraints are enacted by adding the appropriate Condition and Method attributes to ensure that whenever a subclass object is created, it must appear in one of its superclasses. After the attributes are added, the two source schemas are integrated into the global frame model. Pseudo code representing this transformation and the associated data querying is provided in FIG. 25b.

Sub-step 2.6 Merge Classes by Implied Binary Relationship

Figure 26A:
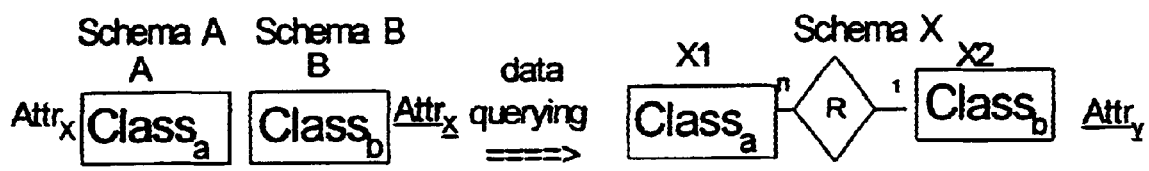
Figure 26B:
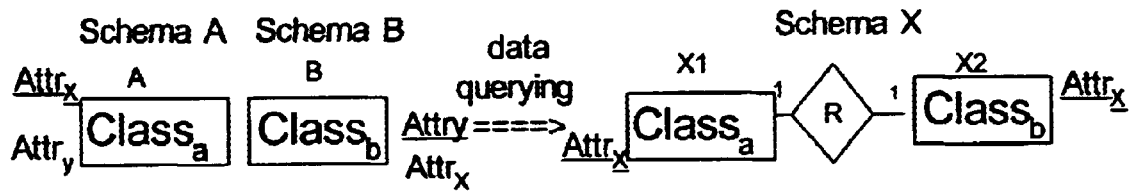

With reference to FIGS. 26a and 26b, when a class A in schema A and a class B in schema B have a common attribute, but where the attribute is a primary key for one class and a non-key for the other class, there may be an implied binary relationship which can be represented in the merged target schema.

The relationship between the two classes can be derived by the appearance in different schemas of a duplicate attribute. Then, the cardinality between the classes can be determined by data querying. If the common attribute is a non-key in one class and a key in the other, then the attribute is translated into a foreign key which refers to a primary key. If there is more than one foreign key which refers to the same primary key, then the two target classes are related to each other in 1:n cardinality using a binary relationship R. If there is only one foreign key which refers to the primary key, then the classes may be in 1:1 cardinality and a user determination will be required.

For example, in FIG. 26a, the duplicate attribute X is a non-key in schema A and a key in schema B. (The key attribute for schema A is not shown). For a given key value for attribute X in class B, there can be more than one object of class A with the same value in non-key attribute x. Thus, the cardinality is 1:n as shown in the integrated schema X. In FIG. 26b, there is a one-to-one correspondence between attribute x objects of class A and attribute x objects of class B, and therefore the cardinality is 1:1. Pseudo code illustrating these transformations and the associated data querying is provided in FIG. 26c.

Step 3: Merge Relationships

After conflicts are resolved and the classes merged, the relationships in the source frame model schemas are merged into the universal frame model schema. Two types of relationship merging are performed: subtype relationship merging and absorption of relationships.

Step 3.1: Merge Relationships by Subtype Relationship

With reference to FIG. 27(a), classes X and Y in source schemas A and B are related to each other by a duplicate relationship R. In schema A, as indicated by the cardinality relationship of 1:(1,n), classes X and Y are in total participation with each other, i.e., each object A2 of class Y must be related to an object A1 of class X. In schema B, as indicated by the cardinality relationship of 1:(0,n), the same classes X and Y are in partial participation with each other, i.e., not all the objects of class B2 must be related to an object of class B1.

To integrate a pair of classes having total participation in one source schema and partial participation in another source schema, such as shown in FIG. 27(a), the total participation class is mapped as a subclass to the partial participation class such that the domain value of the later includes the domain value of the former (i.e., for all partial participation objects, some of them are in total participation, but not vice versa).

In FIG. 27(a), class X in schemas A and B is the same (i.e., it has the same primary key and attributes). Class Y in schema A is a homonym of class Y in schema B. In mapping this to schema X, class X in schemas A and B is mapped to class X in schema X. Class Y in schema A is mapped into class Z in schema X with the appropriate total participation cardinality. Class Y in schema B (which is only partially participating) is mapped to a third class Y in schema X as a superclass of class Z.

With reference to FIG. 27b, the classes X and Y in schema A and schema B are related to each other with different relationships R1 and R2, but with the same cardinality. The two relationships are generalized as an overlap generalization in the integrated schema as shown in the figure (the "A" indicates an "And" operation), provided that they have the same domain value in definition, but not in actual object instance.

The merged relationships are mapped into the global frame schema by specifying the attribute Parent in a newly created class X2 in the global frame model schema, and also by adding attribute Condition and attribute Action in the Method class to enforce the overlap generation.

Pseudo code illustrating these types of transformations are provided in FIG. 27c. With reference to the code, the term "participation equals total" means the class in one end cannot exist by itself, and it must co-exist with an associated class by specifying the associated class name in the attribute associate_attribute. It has the same semantic as "weak entity". (They can be considered the same but with different interpretations).

Step 3.2: Merge Relationships by Absorption

Finally, relationship situations can exist where classes are part of relationships having different degree. For example, in FIG. 28a, classes X and Y of schema A are part of a ternary relationship which also includes class Z. In schema B, classes X and Y are part of a binary relationship. To merge relationships of different degree, the lower degree relationship is consolidated into the higher degree relationship. As shown in FIG. 28a, the binary relationship of schema B is consolidated with the ternary relationship of schema A to produce a ternary relationship between classes X, Y, and Z in the target schema X. Because the domain of the latter includes the domain of the former, there is no loss of information after integration. Pseudo code illustrating this type of transformation is provided in FIG. 28b.

FRAME MODEL APPLICATION PROGRAM INTERFACE

In a preferred embodiment of a frame model database system, an application program interface (API) is provided to support the use of SQL to access a frame model database. Generally, the API invokes the data operation stored in the frame model to manage the data semantics. The API also handles methods defined in the Constraint class during data modification. In a RDBMS system, the API is implemented by providing appropriate triggering events fired on the class. When an RDBMS process is invoked, it checks the Constraint class to see if there is an associated method. If a method is defined in the Constraint class, the method definition will be queried. The process then invokes the stored procedure defined by the queried method definition. An error message is provided if the result returned by the stored procedure violates the rule defined in the Constraint class. The architecture of such a frame model API is illustrated in FIG. 29(a). A flow diagram for a frame model API for use in a frame model RDBMS is shown in FIG. 29(b). The logic flow of SQL command execution is illustrated in FIG. 30. A more specific implementation of a method and system for providing database interoperability.

As discussed above, the frame model meta-data comprises two classes: static-classes and active classes. The static classes represent factual data entities while the active classes represent rule entities. An active class is event driven, obtaining data from the database when invoked by a certain event. The static class stores -data in its own database. The two classes can use the same structure. Combining these two types of objects within the inheritance hierarchy structure enables the frame model to represent heterogeneous knowledge. With the use of a database gateway to translate object oriented SQL ("OSQL") to SQL, OSQL can be used in conjunction with the frame model to access a heterogeneous RDB.

The frame model captures the semantics of heterogeneous relational schemas after schema translation. With the use of an object agent, frame model meta-data can be processed using an object-oriented view. The frame model is robust enough to handle complex data such as class, constraints, and methods. An object agent is provided to pre-compile methods and store the methods as stored procedures and also to invoke method and constraint classes in the frame model meta-data. The combination of users, the object agent, the frame model meta-data and the relational DBMS together form an Open Object Database Connectivity ("OODBC") wherein OSQL can be used to access a RDB via the OODBC. Several relational DBMS linked with an OODBC can interoperate with each other through OSQL.

Open Object Database Connectivity

The Frame model can be used as a solution to extend a relational DBMS to handle complex data, such as objects. Objects can be represented in the frame model as class, constraints, and methods. The implementation of an Object Frame Model Agent ("OFMA") incorporates a relational DBMS as a kernel, and uses an API as an interactive SQL and method command interpreter. In a preferred implementation, methods are pre-compiled and stored in a RDB as stored procedures. Methods can then be invoked directly through the API. The methods can also be invoked indirectly by the constraint class that is defined in the frame model when the associated interactive SQL is issued from the API.

FIG. 31 is an illustration showing the interoperability of various relational databases via OODBC. As illustrated a user 300A issues a OSQL query 302A which is received by the OODBC 304A. The OODBC is configured as a front end to the RDBMS 306A generated with use of a frame model representation of the underlying relational database 308A. The OODBC 304A converts the user's object-oriented SQL query into an SQL query which can be processed by the relational database system 308A. As further illustrated in FIG. 31, multiple relational databases can be connected to each other by a link between various OODBCs, such as OODBC 304A and 304B.

FIG. 32 is a more detailed illustration of the architecture and construction of the OODBC 304. The OODBC 304 comprises a query transaction translation object agent 310 which operates to receive OSQL queries from a user, convert these queries into appropriate SQL queries, and then forward the converted query to the RDBMS 306 for execution against the RDB 308. The object agent 310 performs its OSQL translations with reference to a frame model 320 representation of the relational database as well as a representation of the relational schema 312. Translation of OSQL is made with reference to a previously generated OODB schema 316 which can be stored in a schema repository 318 and which provides what is essentially an object-oriented view of the relational database. As discussed more fully below, The OODB schema is generated during a schema translation process 314 which operates on the relational schema 312 with additional data gathered from data mining the relational database 308 and perhaps with user oversight.

With reference to FIG. 33, the object agent 310 is divided into two primary processes: the server API process 322 and the RDBMS process 306. The server API process scans the incoming commands and identifies the command type. If the command is a Data Manipulation Language ("DML") command, the server API passes the DML command to the relational DBMS, and executes with error checking. If the incoming command is a Method, the stored procedure associated with the method is executed by the relational DBMS. This process will handle the constraint checking defined in the constraint class in the frame model. The OFMA 324 is comprised of three major parts: the command scanner, the method interpreter and the DML interpreter. The purpose of the command scanner is to identify the type of the input command, DML or Method. If the input command is DML, the DML interpreter is invoked. Otherwise, the command scanner extracts the input parameter for the method command.

Figure 34:
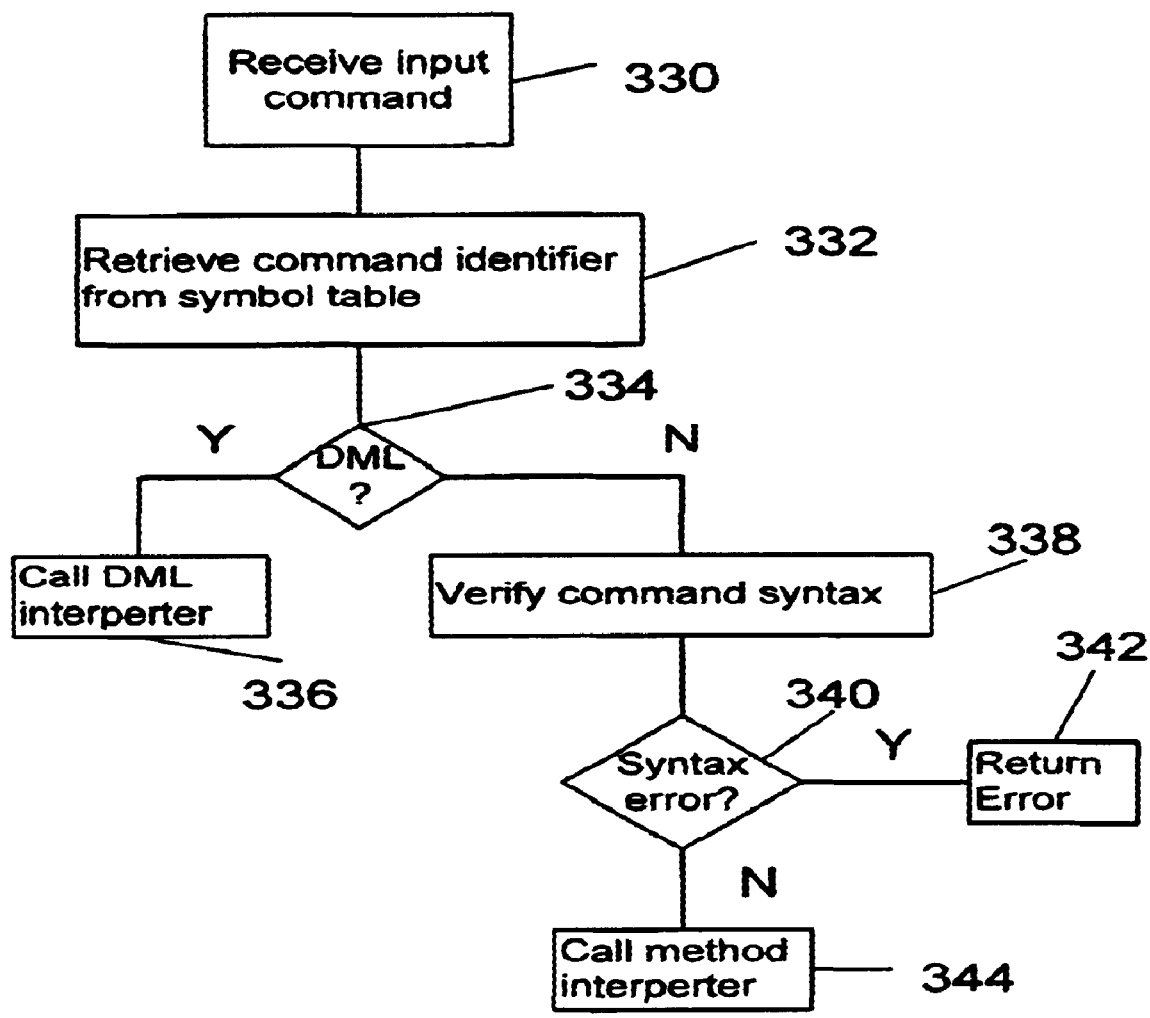
FIG. 34 is a flowchart showing the general three-part operation of the OFMA.

The general three-part operation of the OFMA is shown in the flowchart of FIG. 34. Initially, the OFMA receives an input command (step 320) and the command is scanned with reference to a command identifier retrieved from a symbol table and compared to the identifier (step 322). If the command is a DML command (step 334), than the DML interpreter is called (step 336). Otherwise, the command is assumed to be a method and the command syntax is verified (step 338). If an error is detected (step 340), an appropriate error code is returned (step 342). If the syntax is correct, then the method interpreter is called with the command (step 344).

Various DML interpreter schemes can be used. FIG. 35 contains pseudo code illustrating in more detail a preferred technique of passing DML commands to the DML interpreter, which technique also addresses data modification issues. As shown, if the DML command does not perform any data modification, the command is simply executed and the results or any error messages are returned. However, if the DML command will perform any data modification, the constraint and method classes of the frame model are invoked. In particular, for SQL commands performing data modification, the OFMA checks for any constraints defined in the constraint class, and executes the associated constraint method according to the triggered event and the sequence of firing and operation.

The OFMA is configured to interpret various object-oriented functions in a manner which permits their operating within the relational database environment. These functions include inheritance, encapsulation, polymorphism and overloading, class association, set values, and constraint rules. A discussion of a preferred implementation of these object-oriented functions by the OFMA with specific reference to the supporting data contained within the Frame model follows:

(a) Inheritance—The superclass of a class is defined in the Parent attribute of the header class in the Frame model. If there is more than one superclass, a list of class names is stored. The API decodes the class name from the list and the superclass attributes are retrieved according to the decoded classes. The process of determining inheritance is nested, starting from the requested class and continuing until there are no more defined parent attribute values.

(b) Encapsulation—The encapsulation definition is stored in the Action attribute of the Method class in the Frame model. The Parameter attribute of the Method class is used to specify the number of parameters passed. The parameters are provided either from input or passed from other method call. The Method Type attribute of the Method class is used to define the method as an SQL operation or a stored procedure.

(c) Polymorphism and Overloading—This functionality is provided by employing the unique key property of a relational DBMS on the Method class entity.

The unique key of the Method class is defined by the method_name, class_name, and parameters fields of the Method class. Polymorphism is implemented by passing the same method name to different classes. Function overloading is implemented by using the same method name on the same class, but passing different numbers of parameters.

(d) Class association—The association between classes is defined by specifying the associated class name in the Associate Attribute of the Attribute class.

(e) Set values—Multiple values for a class attribute are defined in the Cardinality attribute.

(f) Constraint rules—A constraint rule is implemented by an RDB trigger which is configured to be fired when there is a data modification process. Triggers can be set to execute before or after the associated event. When a trigger is fired, the process will qualify for any rules that have defined in the constraint class.

Translating Object-oriented Database Methods into Relational Database Routines

One aspect of the present invention which allows accessing an RDB using object-oriented techniques is the translation of an object-oriented database method into a relational database routine. FIG. 36 is a flow diagram illustrating the mapping of an object method to a PSM routine. The translation method is performed in a multi-step process. First, a schema translation is performed wherein the signature of the object oriented method is converted to a Persistent Storage Module ("PSM") signature. Second, the method itself is converted into a PSM routine. Finally, there is a method/routine invocation translation which can include translation of both procedure invocation and function invocation. Each of these translation steps will now be discussed.

Step 1: Method Signature to Persistent Storage Module Signature Translation (Schema Translation)

During mapping of the method, the various names and value definitions in the method are translated into a persistent storage model. The name of an OODB method is bound by a specific class. However, because a PSM routine is not bound by a specific relationship, mapping the name of a method requires avoiding potential name conflicts. It is also necessary to be able to rename the mapped PSM routines uniformly into the RDB system. A preferred implementation is to name a mapped PSM routine by combining the class name and the method name and assign an "action" name to the routine as well as to associated meta-data.

Mapping the parameters listed in a method requires that each data type of parameter which is related to a class be converted to a corresponding data type related to a relation which spans the same data content as the class. This mapping can be determined by observing the data type mapping from classes to relations. Mapping of return types is essentially the same as mapping the parameters. The return types of methods are stored in the "method" class as a meta-data. The relational types of return values are defined by mapping the object data types and the relational data types. The return types are specified in the meta-data as relational preferences.

In order to consolidate the target data, a class object can be constructed in a temporary repository where the class is defined for internal use. After method translation is complete, the target data will be translated to routines which can be executed in a relational DBMS. A sample temporary class definition is shown in FIG. 37. Various techniques can be used for performing the specific name translation steps. FIGS. 38A and 38B contain pseudo-code for an algorithm which performs the signature translation. As will be apparent to those of skill in the art, the data types must be modified in the target relational schema. However, these data types depend upon the specific schema used by the relational database implementation at issue. Since different products provide different data types, specific implementations will vary according to the particular database platforms at issue. FIG. 39 is generalized flow diagram illustrating the mapping of data types.

Step 2: Translating a Method to a PSM Routine

After the schema of the object-oriented method is converted into a PSM, the method itself is translated into a PSM routine. The second step can include several different translations, including path expression operand translation, set operand translation, query translation, update transaction translation, and host language data type translation (for non-volatile data). Each of these various translations are discussed below.

Step 2.1: Path Expression Operand Translation

An important aspect of a path expression is the address of a method or an attribute in the statement. During translation, the translator routine evaluates the appropriate path logic to locate the specific method or attribute at issue. The method can then be executed or the attribute retrieved. During this process, it is important to know how to interpret the path logic of an object oriented schema and how to reconstruct the logic within the relational schema.

The first step in path expression operand translation is to decompose the object path. The object path is generally comprised of attributes or other user-defined methods. A composite attribute returns its value to the operator in comparison with another value. A method performs its calculation and returns the result to the operator for doing the same comparison as the composite attribute. The path logic of a class is decomposed during the schema translation process. Relevant information is stored in the meta-data and in static tables. The second step organizes the path logic for the relational schema. Since the information and details of the class is stored in a data repository as meta-data, the path logic of the relational schema can be derived in a straight-forward manner.

In this implementation, the meta-data is a schema definition of the relational schema and the relational tables are static data. These two components can be used to construct the path logic and realize the relationship among tables. Further, the schema definition can provide a whole picture of the various linkages within the object model. The static data is used for actual data storage. Sample pseudo code of an algorithm to decompose a path expression of an OSQL statement is contained in FIG. 40.

Step 2.2 Set Operand Translation

The path logic of a set attribute involves forming a new individual table which contains the multiple values of the set attribute. The multiple values need to be decomposed into the new table. The new table is created for storing the multiple values of each set attribute. The connection between an existing table and the new table is formed by a primary key on the new table and a foreign key on the existing table. FIG. 41 contains sample pseudo code illustrating the specific steps for decomposing the set operand of an object-oriented SQL statement.

Step 2.3 Query Translation

A further aspect of method translation is translation of the query itself. Desired data can easily be obtained from relational query statement because the translation process is simple as these attributes are converted to relational tables during the schema translation. The composite attributes can be interpreted as an aggregation primitive. After finishing the definition of the aggregated attributes, mapping can be done to reform the path expressions. The multiple-value attribute can be interpreted as an association primitive. The new table contains set values for each record. The particular linkage or relationship depends on the identification primitive (i.e. foreign to primary key). An OODB query statement can be divided into three parts for scanning: a range part, a target part, and a qualification part. Pseudo code for translating an OSQL query statement into an SQL query statement is detailed in FIGS. 42A–42C.

Step 2.4 Update Transaction Translation

Translation of the update transaction is generally similar to the translation process for the query translation. This translation is needed to satisfy the qualification expression from the "where" clause, to find the attribute with multiple values or single value from the "set" clause, and to determine the tables related to the update-statement. An attribute with a single value can be located easily by the schema definition. For attributes with multiple values, the relations among the various tables on the meta-data can be identified by referencing the multiple-value attributes which are stored in subordinate tables. Once a multiple-value attribute is located, the updating process locates OID from the old table and updates new values to the new table. In this circumstance, two kinds of update-statements are formed. The first is for updating the single-value attribute, and the second is for updating the multiple-value attribute. Pseudo code illustrating a method of translation for the update transaction is detailed in FIGS. 43A–43C.

Step 2.5 Host Language Data Type Translation (for non-volatile data)

As will be appreciated, if the object method to PSM routine is to be translated, the host languages between the object and the relation must have the same structure.

However, statements dealing with nonvolatile data may need to be modified. To do this, a mapping table is created which contains all the object data types and all the relational data types. When a method wants to find an attribute from a relational table, a conversion process for data types is used which searches the mapping table of data types to find the corresponding relational data type. In the event of an error, and in particular, if the data type is not matched to the host language, an error procedure is started. Once a corresponding data type is found, the relational data type is mapped to the data type in host language automatically. As a result, the relational data will be compatible with the data type of the object model. Pseudo code for a specific algorithm for translating the data types in this manner is provided in FIG. 44.

Step 3: Method/Routine Invocation Translation

The third major step in translating object-oriented database methods into relational database routines is the translation of the method/routine invocations. A method invocation can be present in two different formats. The first format is an invocation statement, a statement which is similar to a procedure call. The format is as an operand in a scalar expression which is part of an OSQL statement, similar to a function call.

During mapping of a method invocation, the polymorphism feature must be considered. It is generally insufficient only to map a method invocation to a corresponding PSM routine invocation because a relational DBMS cannot dynamically resolve PSM routines in the same way that an object-oriented DBMS can do for methods at run time. Thus, a mapped target for a method invocation should involve dynamic resolution of a PSM routine as well as invocation of the routine. A preferred way to accomplish this is to use the mapped target case statement which lists all possible cases of binding conditions and calls of related PSM routines under each case.

Procedure invocation and function invocation will be discussed with reference to the below sample class definitions and relational definitions:

| Class definition | Relational definition |
| --- | --- |
| A (A1, A2, . . . , M1, M2) | A (A1, A2, . . .) with M1_A, M2_A |
| B (B1, B2, . . . , M1) subclass of A | B (B1, B2, . . .) with M1_B, M2_A |
| C (C1, C2, . . . , M1) subclass of A | C (C1, C2, . . .) with M1_C, M2_A |

Case 1—Procedure invocation. For the method invocation: a.M 1 (where a is a variable of class A) is a method with path expression. The interpreter does not know that the method is for A, B, or C relation. The case statement which distinguishes the owner of method is:

```
switch (a)
{   case a = A : M1_A
    case a = B : M1_B
    case a = C : M1_C}
```

Case 2—Function invocation. The Select statement: select A1 from all A a where a.M1>0 (select from class A and all its subclasses) can be mapped to the following case statement (where r is a variable of relation):

```
for (r = A, B, C ) do
{   switch (r)
    {   case r = A : select A1 from r where M1_A > 0
        case r = B : select A1 from r where M1_B > 0
        case r = C : select A1 from r where M1_C > 0
```

FIG. 45 contains pseudo code further illustrating the translation of the invocation from a method to a routine.

The overall data flow of method translation is illustrated in FIG. 46 with specific reference to a translation from an object-oriented method written in the Jasmine format to a target relational routine written in FoxPro format. FIG. 47 shows a before-and-after illustration of a sample Jasmine-format object-oriented method translated into a target FoxPro-format relational routine. The three steps of source signature translation, method translation, and invocation translation are each illustrated.

FRAME MODEL DATABASE ACCESS THROUGH THE INTERNET

A further aspect of the invention is a methodology for providing Frame model database access through the Internet. Many Internet applications provide for access to databases of various types. By using the Frame model, standardized functionality can be used to access the Frame model and thereby different types of underlying legacy database systems. Further, by providing a OSQL to SQL translation gateway into the frame model agent, such as disclosed above, object-oriented database access techniques and functions can be used to access an RDB system.

Internet-based documents accessible via the World Wide Web are generally written in a HyperText Markup Language. A user's Internet web browser in the client side interprets and presents the document. Documents are sourced via web servers operating using a HyperText Transfer Protocol ("HTTP") as the communication protocol. An "on-demand" or "on-the-fly" hypertext document can be created by using a Common Gateway Interface ("CGI"). When a request from Web client is made for the document, the server program will spawn a separate process to handle the communication. As will be apparent, CGI programs introduce overhead each time the CGI is started up or shut down. For each a request arrives from Web client, the CGI program is loaded from disk into memory and subsequently unloaded from memory when it is finished. To avoid this overhead, the SQL gateway is preferably implemented as an Internet Server API.

FIG. 48 is a flow diagram of an Internet-based Frame model database system. In operation, a web client 350 makes an HTTP request to the Information Server 352 via the Internet 354. Upon receiving a request, the server calls a Command Interpreter 356. As summarized in the flowchart of FIG. 49, the Command Interpreter scans the request from Web, client and determines if the request is either a standard SQL query or a method call from the OFMA 324, the main kernel of the object-relational DBMS and preferably implemented under a server, such as a Microsoft Transaction server 358. The request is parsed and sent to the OFMA. The OFMA performs database connection and constraint checking and calls the pre-compiled method which is stored in the SQL server. Results or messages returned from the SQL server are sent back to Web client.

The Command Interpreter and OFMA servers are preferably implemented as Dynamic Linked Libraries. When the Command Interpreter is loaded into memory, it becomes a part of server process and will not be unloaded until the Web server is shut down. As each new request arrives at the server, a new Command Interpreter thread is created to service the request. The new Command Interpreter thread calls the Microsoft Transaction server to create a new OFMA thread which ultimately processes the corresponding operation and method. This multi-thread access method is illustrated in FIG. 50.

More specifically, the Command Interpreter is designed to verify the type of the input command from Web client. If the input request is an SQL query or a specific HTML form method, the Command Interpreter calls the Microsoft Transaction server to create a new OMFA thread and sends the SQL query or HTML form parameters to this thread. However, if the input is a method type sent from Input Command Form directly, the Command Interpreter parses the command string and extracts the method name and parameters. The syntax of the command string is then verified. If an error is detected, an appropriate error message is sent from the Command Interpreter back to the Web client and the connection is closed immediately without calling Microsoft Transaction server. If the command string is valid, the command is processed in a similar manner as used for an SQL query.

The OFMA server program is configured to analyze a parsed command received from the Command Interpreter. If the command is not a method call, it is passed to the relational DBMS which will perform appropriate syntax and error checking relational DBMS, execute the command, and return the command results to the OFMA. The OFMA can then embed the command results into an HTML document which is subsequently returned to the user. If the parsed command is an OFMA method, method checking is performed. The method is passed to the relational DBMS which executes the method and returns the result. If the result contains records, they are preferably presented in the form of an HTML table. The OFMA can also retrieve constraint methods as a follow-up to the method execution if needed. Provided that any applicable constraint methods have not been violated, the constructed HTML document is sent back to Web client.

The overall program flow of the object frame model API discussed above is summarized in FIG. 51.

What is claimed is:

1. A system for providing access to a relational database using object-oriented structural query language ("OSQL") comprising:

a relational database;

a relational database management system ("RDBMS") providing access to the relational database via structural query language ("SQL");

an open object database connectivity ("OODBC") system connected to the RDBMS and configured to receive input from a user, the OODBC system comprising a frame model representation of the relational database; and an object frame model agent ("OFMA");

the OFMA configured to receive an OSQL query from a user;

convert the received OSQL query into an SQL query with reference to the frame model; and forward the SQL query to the RDBMS;

the relational database having data classes, the classes having attributes, including primary and foreign keys, the database further having procedural rules associated with the classes and constraints placed upon relationships between classes and values which can be assigned to the attributes, the frame model comprising:

a plurality of static frameworks including a header class framework for storing class definitions and an attribute class framework for storing attribute definitions for each defined class entity; and a plurality of active frameworks including a method class framework for storing method-based procedures associated with at least one of the classes and attributes defined by the static frameworks and a constraint class framework for storing value and relationship constraints on at least one of the classes and attributes defined by the static frameworks.

2. The system of claim 1, wherein the OFMA comprises:

a command scanner configured to determine a received command type;

a method interpreter configured to process a received method command; and a data manipulation language ("DML") interpreter configured to process a received DML command.

3. The system of claim 2, wherein the DML interpreter is configured to, upon a determination that the received DML command will perform data modification, (a) identify constraints defined in the constraint class of the frame model implicated by the data modification, and (b) execute associated constraint methods in accordance with a triggered event and a defined sequence of execution and operation.

4. The system of claim 3, wherein the OFMA is configured to process a plurality of object-oriented functions with reference to data in the frame model to permit the functions to operate on the relational database.

5. The system of claim 4, wherein the object-oriented functions comprise inheritance, encapsulation, polymorphism and overloading, class association, set values, and constraint rules.

6. The system of claim 1, wherein the OODBC system is implemented on a data server connected to the user via the Internet; the OFMA being implemented at least in part as an application program interface operating on the data server.

* * * * *

UNITED STATES PATENT AND TRADEMARK OFFICE
CERTIFICATE OF CORRECTION

PATENT NO. : 6,704,747 B1  
DATED : March 9, 2004  
INVENTOR(S) : Joseph S. Fong It is certified that error appears in the above-identified patent and that said Letters Patent is hereby corrected as shown below:

Title page
Please add Item:

-- [62]  Related U.S. Application Data

This Patent is a Continuation-In-Part of 09/268,987 filed 03/16/1999 --.

Signed and Sealed this

First Day of June, 2004

JON W. DUDAS  
*Acting Director of the United States Patent and Trademark Office*